(12) United States Patent
Ohashi

(10) Patent No.: US 7,864,054 B2
(45) Date of Patent: Jan. 4, 2011

(54) APPARATUS FOR COMMUNICATING WITH A RFID TAG AND CARTRIDGE FOR INCLUDING AT LEAST A RFID TAG

(75) Inventor: Tsuyoshi Ohashi, Hashima (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 399 days.

(21) Appl. No.: 12/125,813

(22) Filed: May 22, 2008

(65) Prior Publication Data
US 2008/0297318 A1 Dec. 4, 2008

Related U.S. Application Data

(63) Continuation-in-part of application No. PCT/JP2006/323303, filed on Nov. 22, 2006.

(30) Foreign Application Priority Data

| Nov. 22, 2005 | (JP) | ............................. 2005-336677 |
| Nov. 29, 2005 | (JP) | ............................. 2005-344244 |
| Nov. 30, 2005 | (JP) | ............................. 2005-345044 |

(51) Int. Cl.
*G08B 13/14* (2006.01)
(52) U.S. Cl. .............. 340/572.1; 340/572.4; 340/572.8; 340/10.1; 235/487; 400/611
(58) Field of Classification Search .............. 340/572.1, 340/10.1, 10.3, 572.8, 572.4, 572.7; 235/492, 235/494, 488, 375, 487, 462.43; 428/32.1, 428/448; 400/611, 613
See application file for complete search history.

(56) References Cited

U.S. PATENT DOCUMENTS

| 7,227,721 | B1 * | 6/2007 | Kientz et al. ................. 360/132 |
| 7,299,990 | B2 * | 11/2007 | Hoshina ..................... 235/492 |
| 2004/0141790 | A1 | 7/2004 | Waters | |

FOREIGN PATENT DOCUMENTS

| JP | 2001-030480 A | 2/2001 |
| JP | 2003-140548 A | 5/2003 |
| JP | 2004-082432 A | 3/2004 |
| JP | 2005-001764 A | 1/2005 |
| JP | 2005-165879 A | 6/2005 |
| JP | 2007-141118 A | 6/2007 |

OTHER PUBLICATIONS

Japanese Patent Office, International Search Report for Appliction No. PCT/JP2006/323303, filed Nov. 22, 2006, mailed Mar. 6, 2007.
International Bureau of WIPO, International Preliminary Report On Patentability for International Application No. PCT/JP2006/323303 (parent of above-captioned U.S. patent application), issued Jun. 11, 2008.

* cited by examiner

*Primary Examiner*—Toan N Pham
(74) *Attorney, Agent, or Firm*—Baker Botts L.L.P.

(57) ABSTRACT

An apparatus for communicating with a RFID tag comprises: a container holder configured to detachably attach a container for including at least a RFID tag which contains a tag medium on which a RFID circuit element is arranged; and an apparatus magnetic-path forming portion configured to form a magnetic path for a communication magnetic flux in a feeding path of said tag medium in said container for including at least a RFID tag when said container for including at least a RFID tag is attached to said container holder.

57 Claims, 34 Drawing Sheets

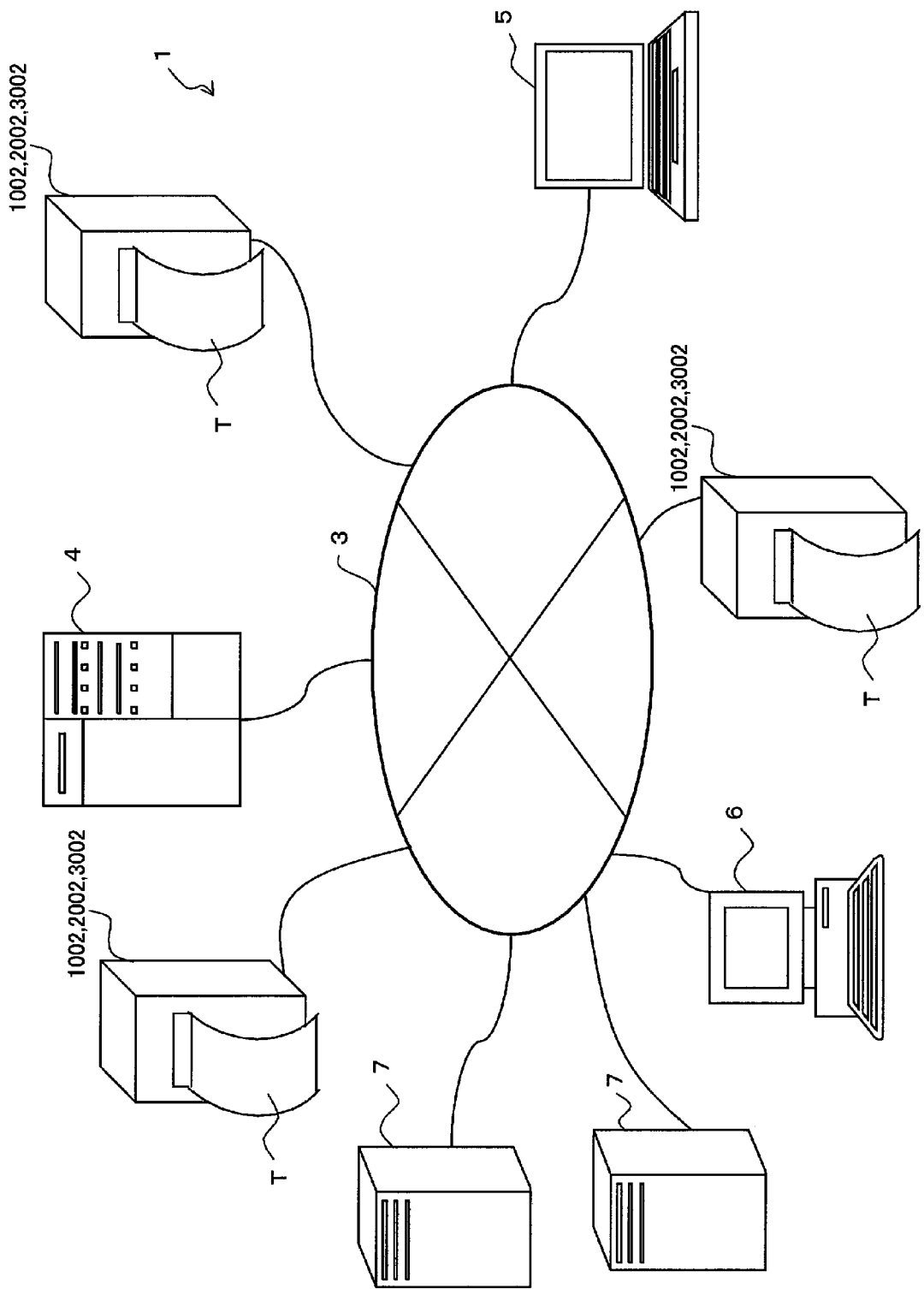
[FIG. 1]

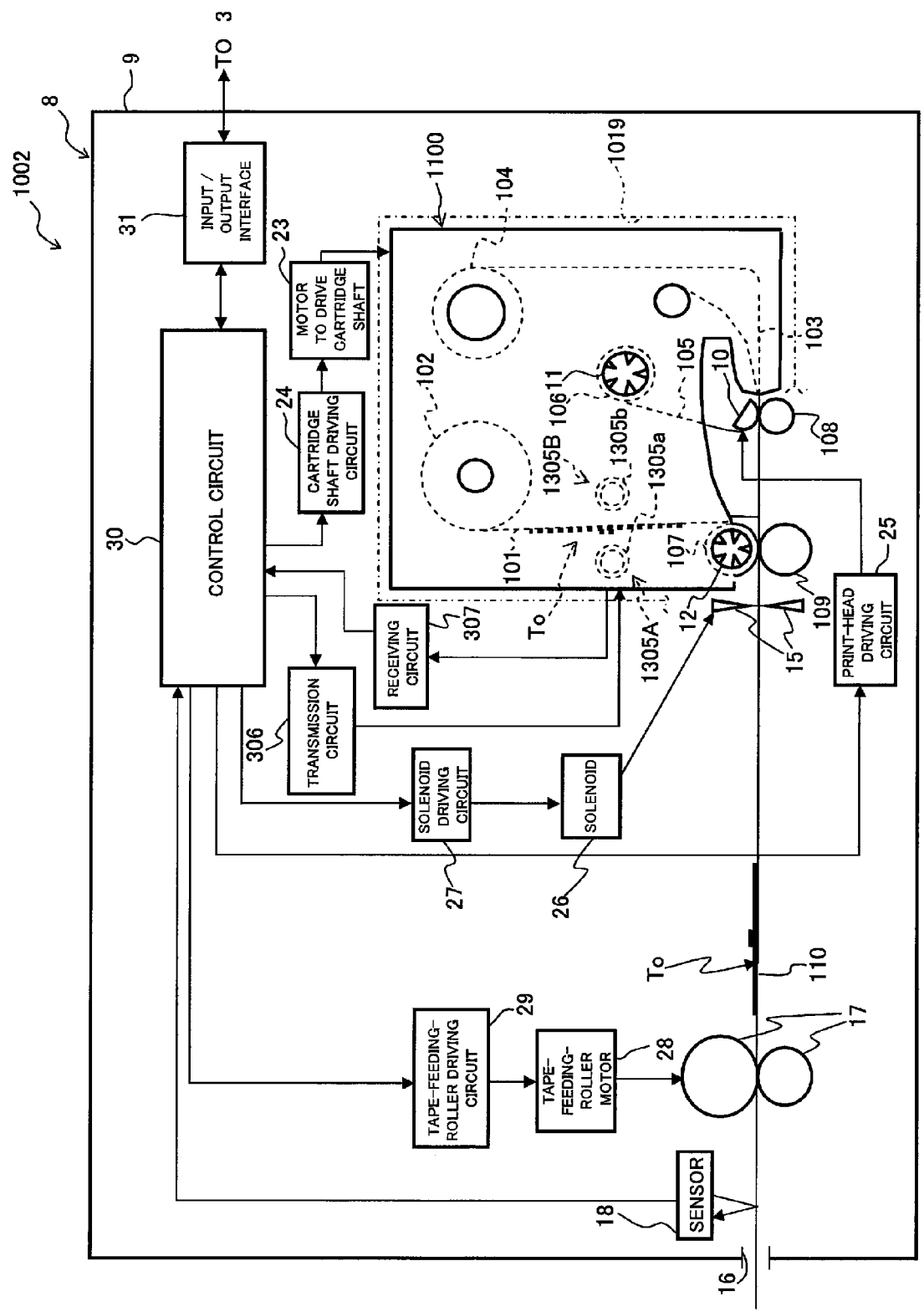
[FIG. 2]

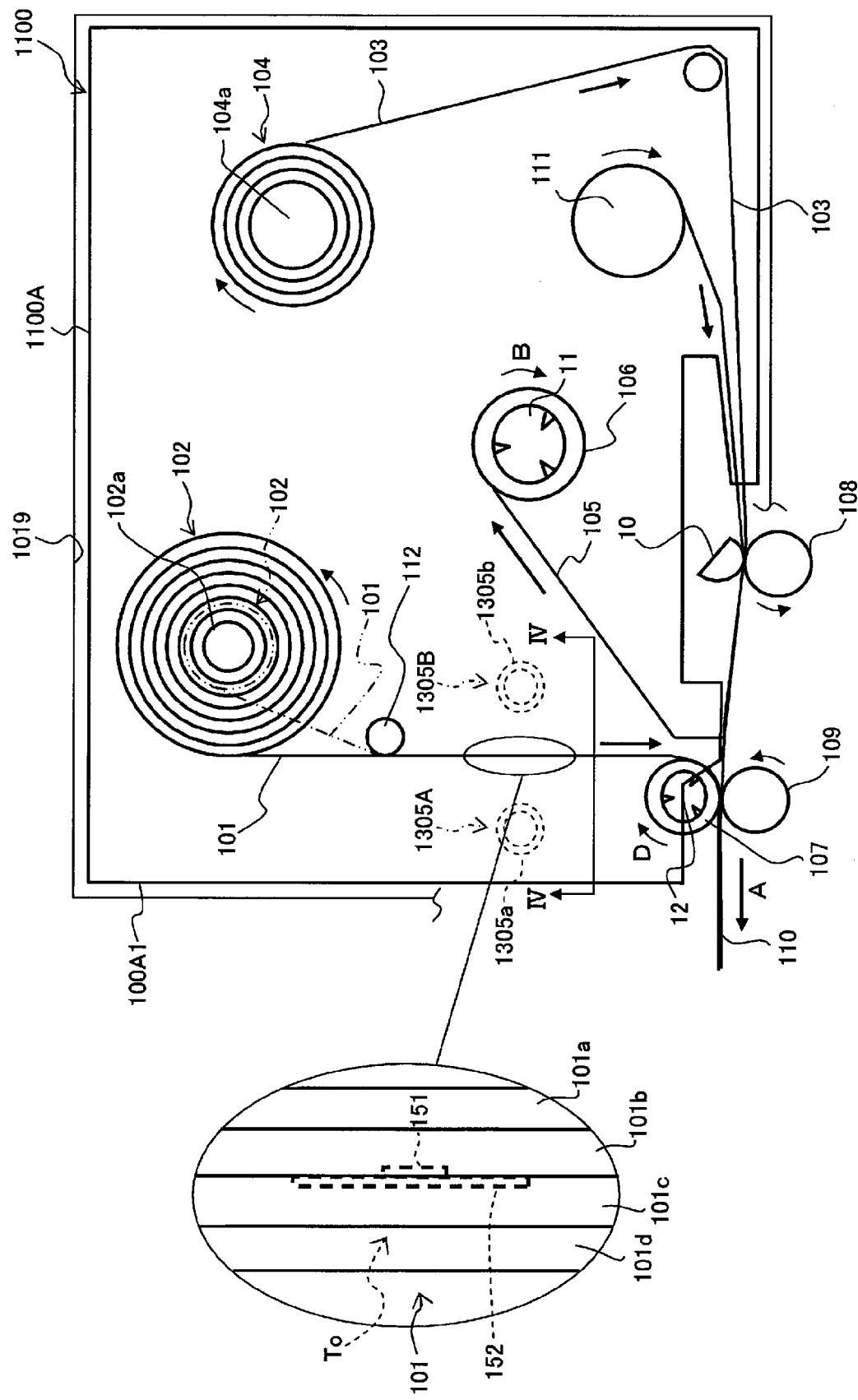

[FIG. 4]
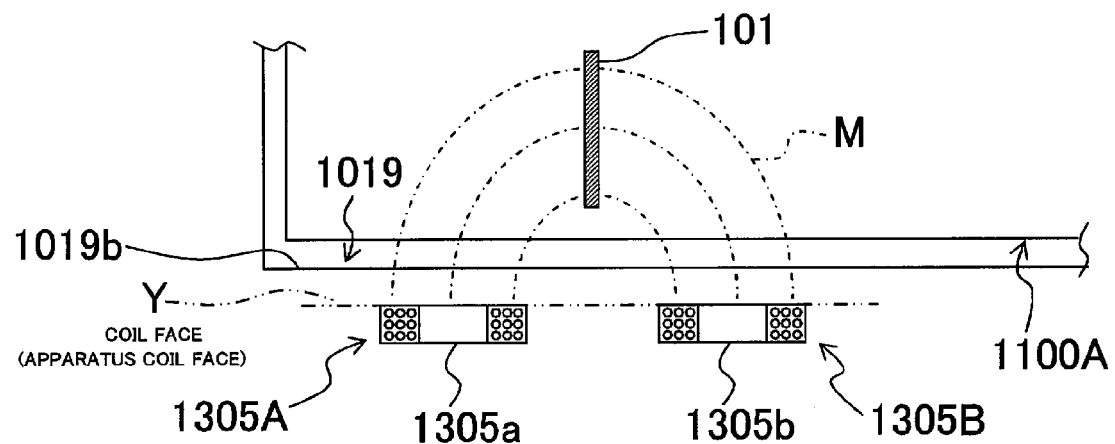
[FIG. 5A]
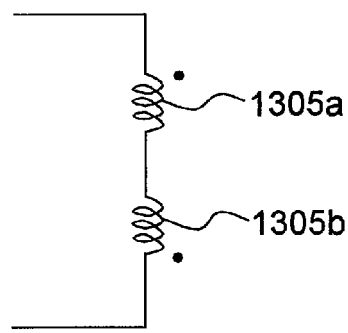
● : WINDING START
    POSITION
[FIG. 5B]
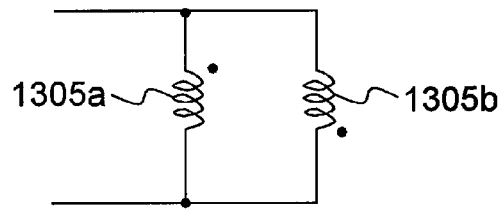
● : WINDING START
    POSITION

[FIG. 6]
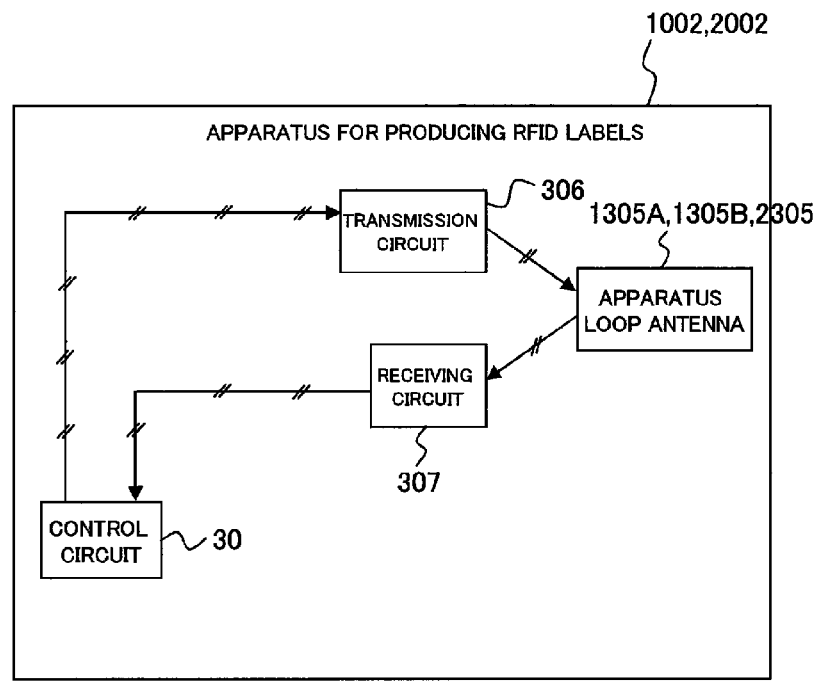
[FIG. 7]
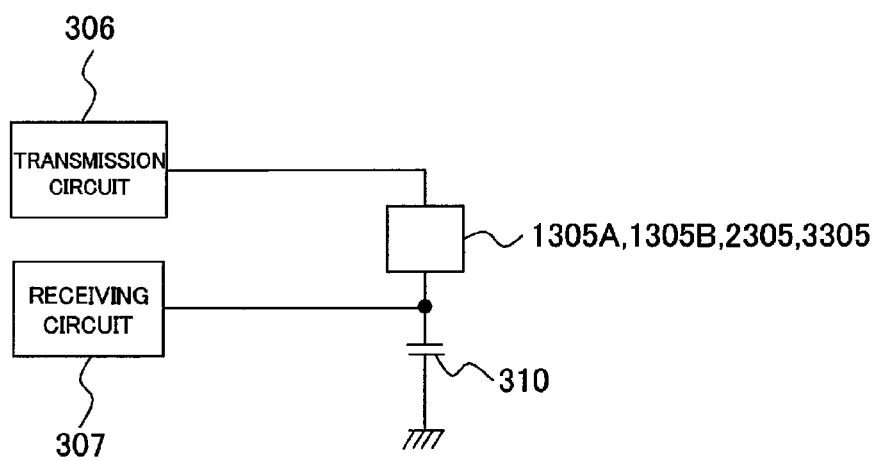

[FIG. 8]
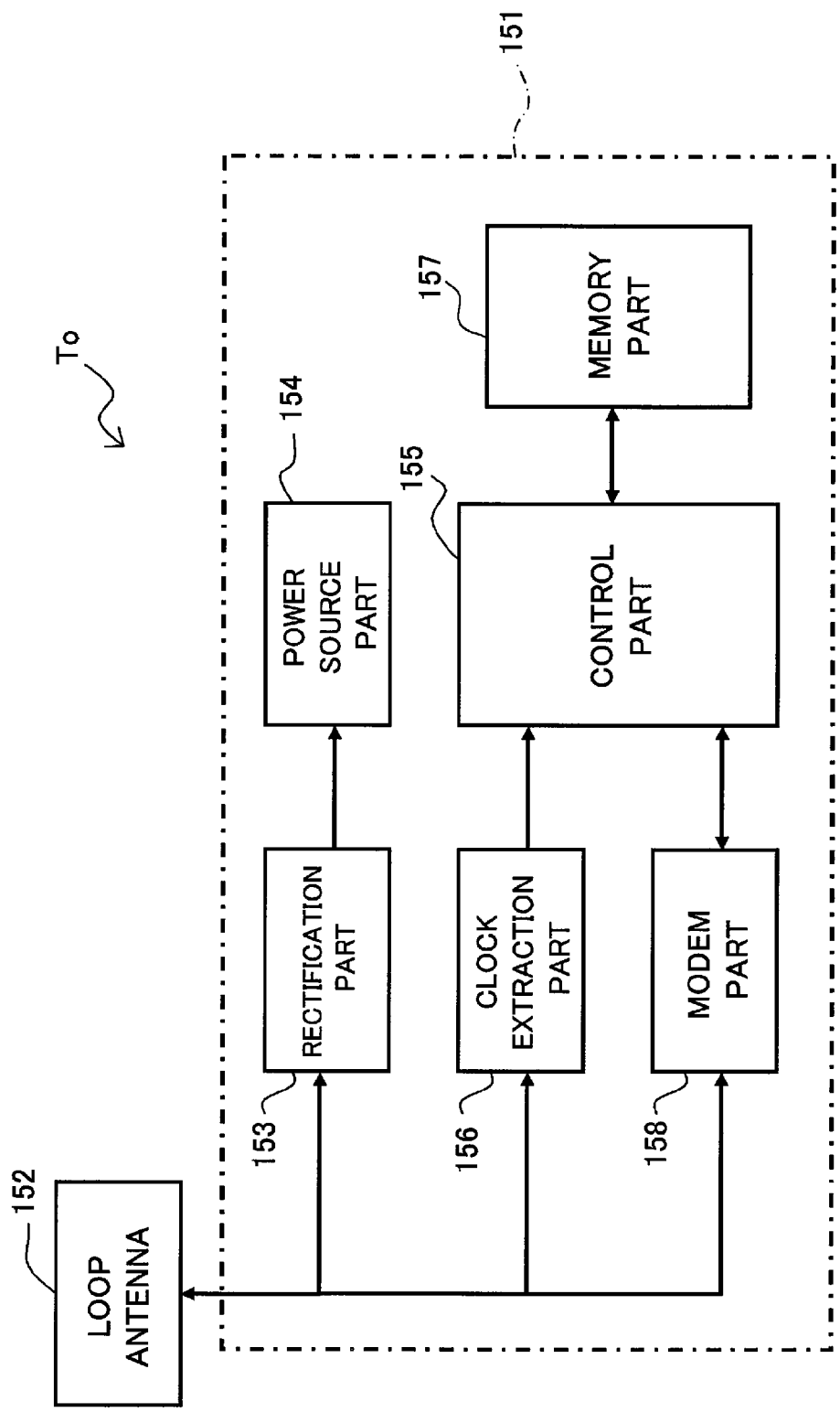

[FIG. 9A]
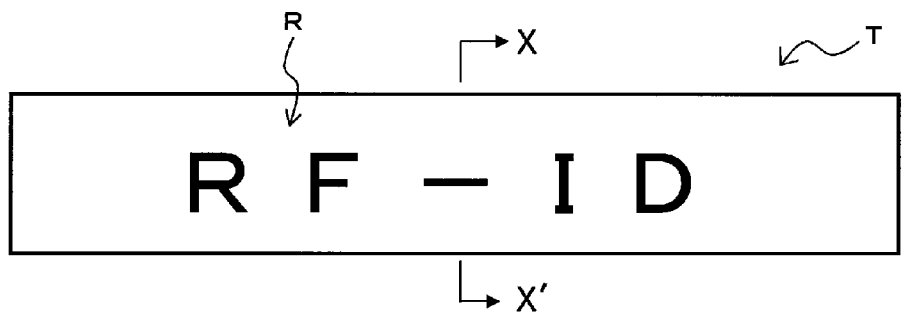
[FIG. 9B]
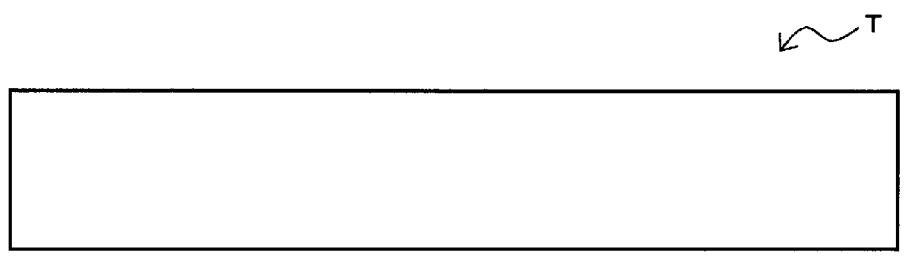

[FIG. 10A]
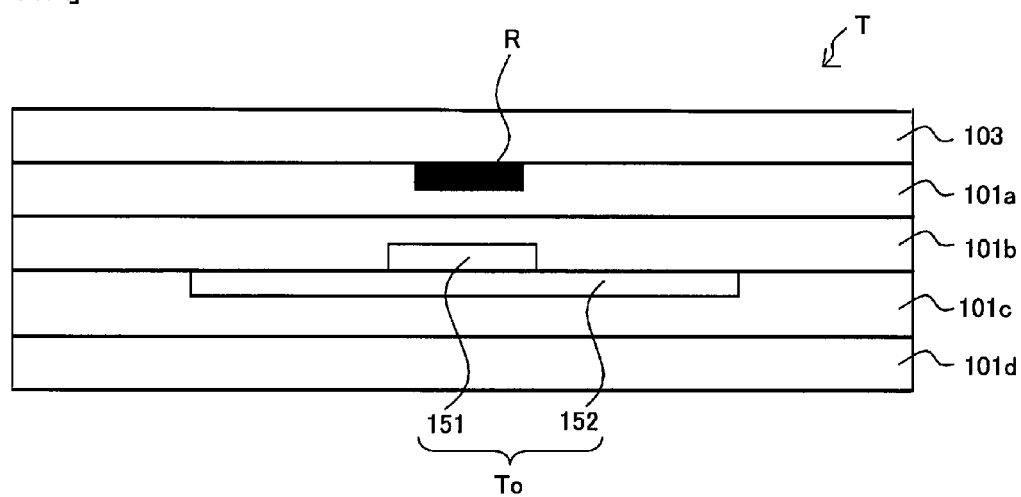
[FIG. 10B]
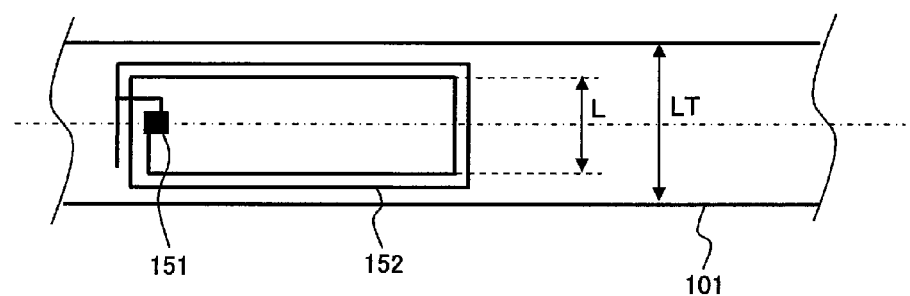

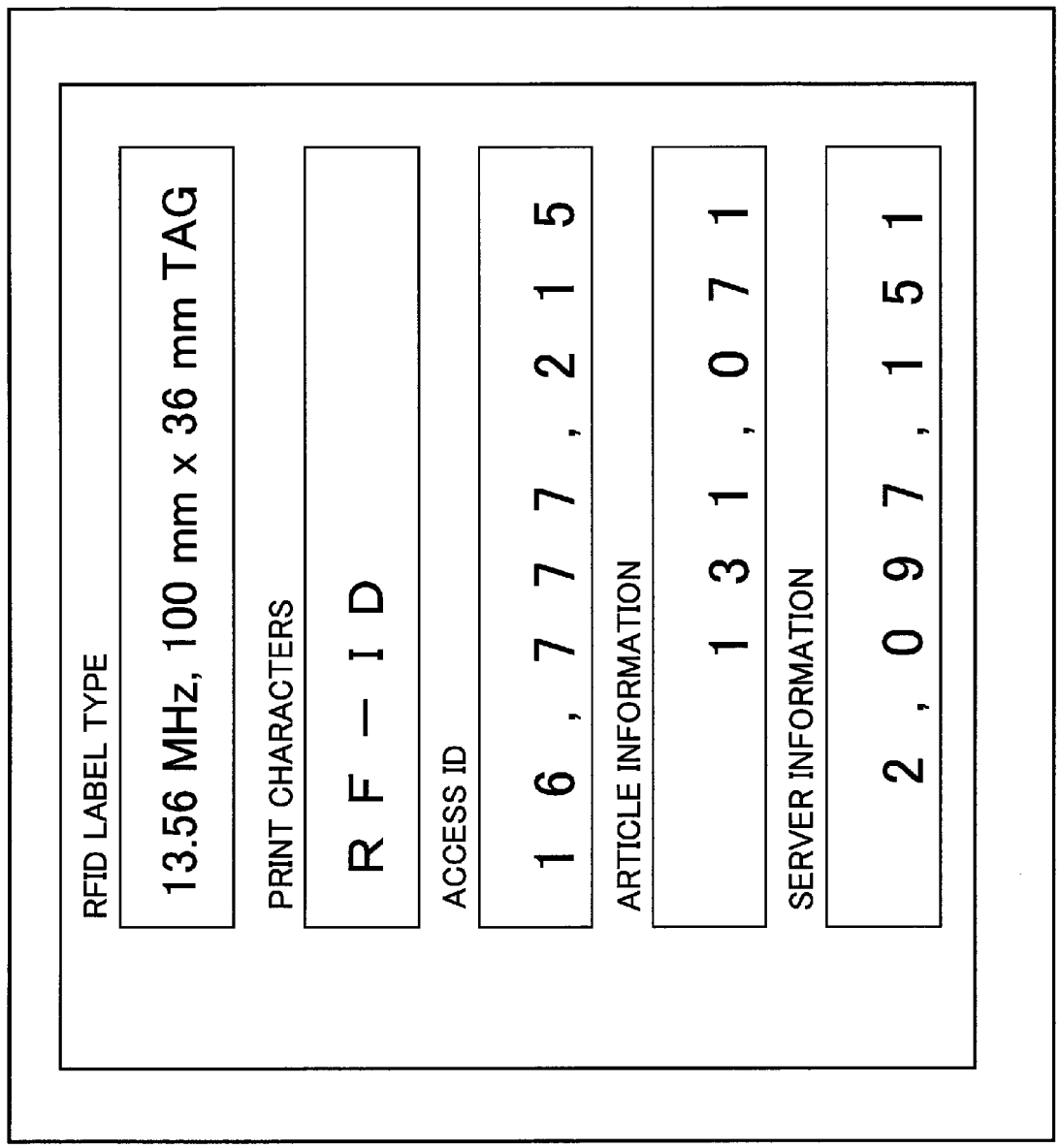
[FIG. 11]

[FIG. 12]
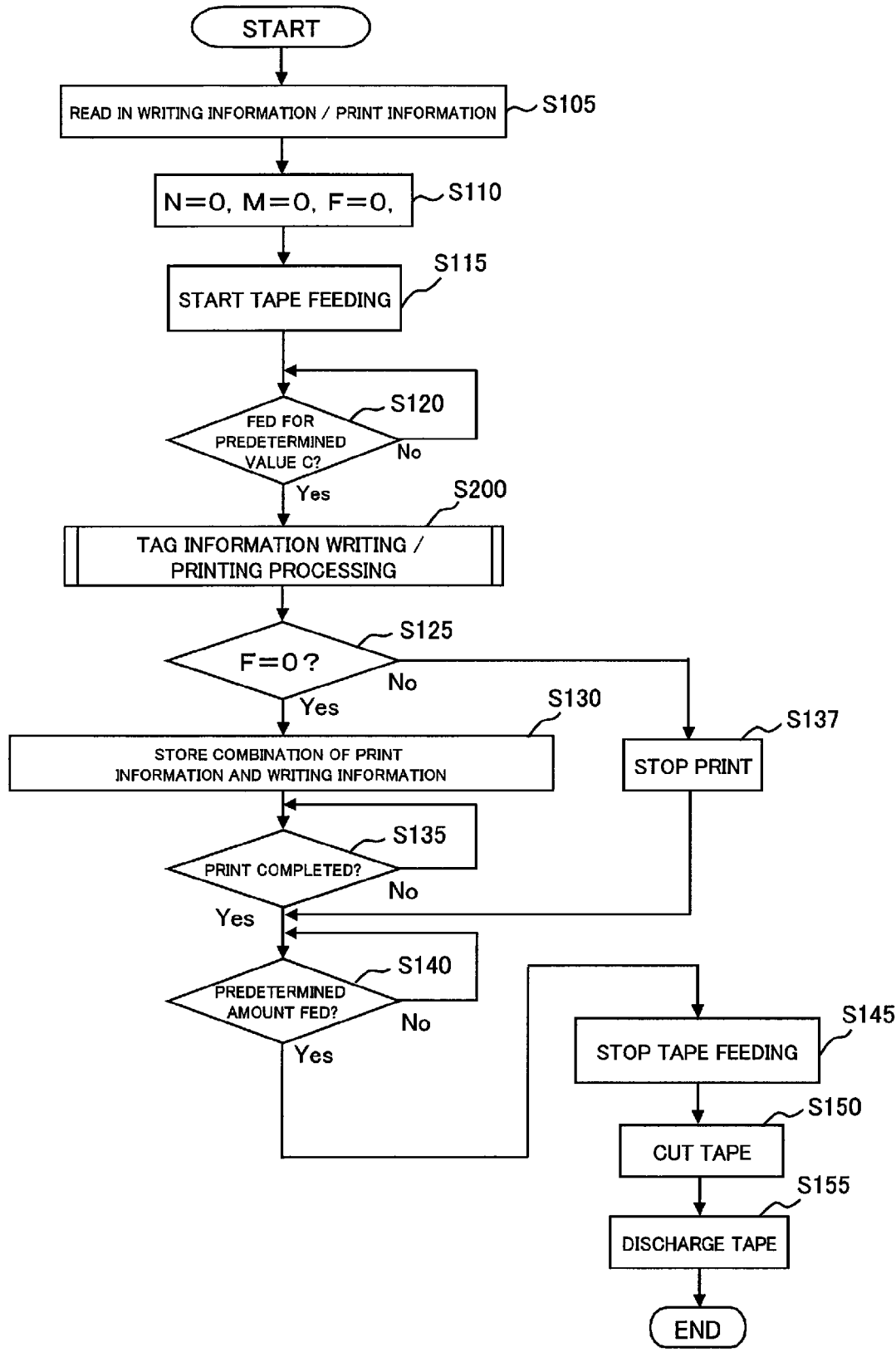

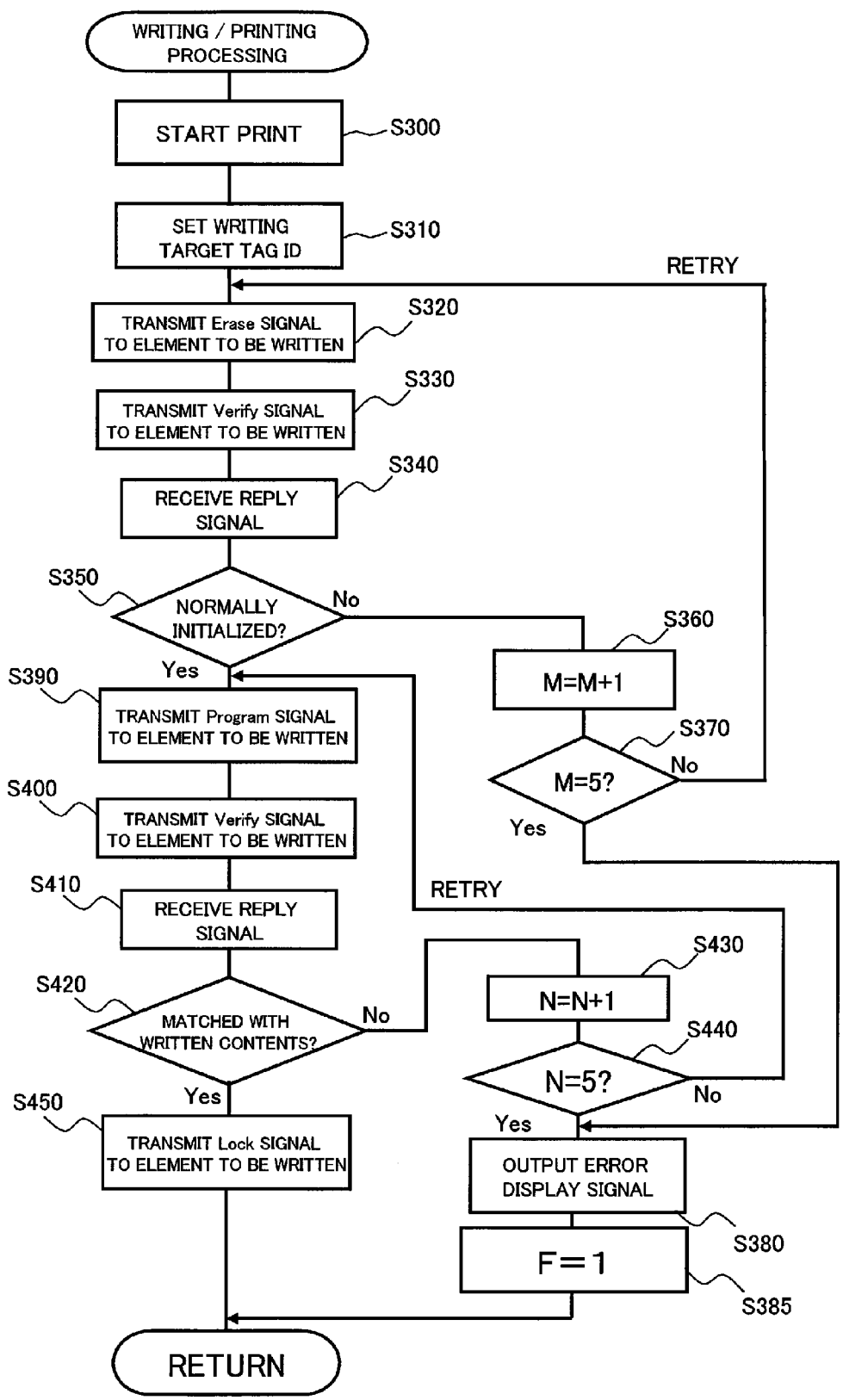
[FIG. 13]

[FIG. 14A]
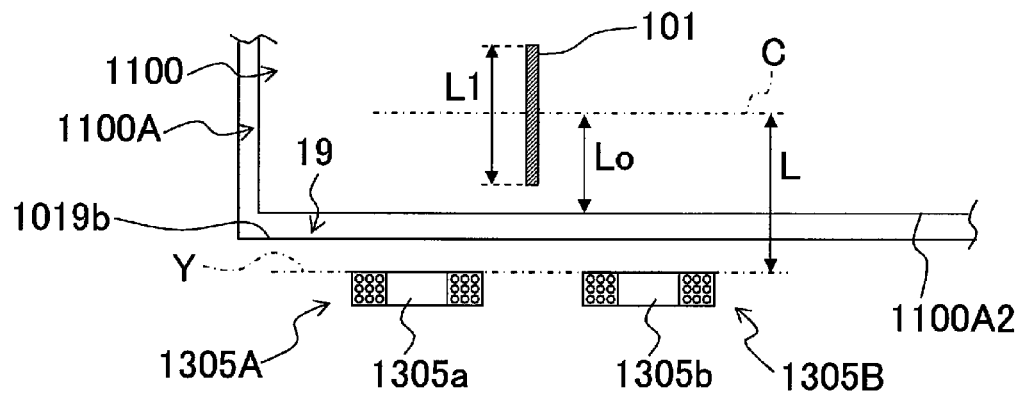
[FIG. 14B]
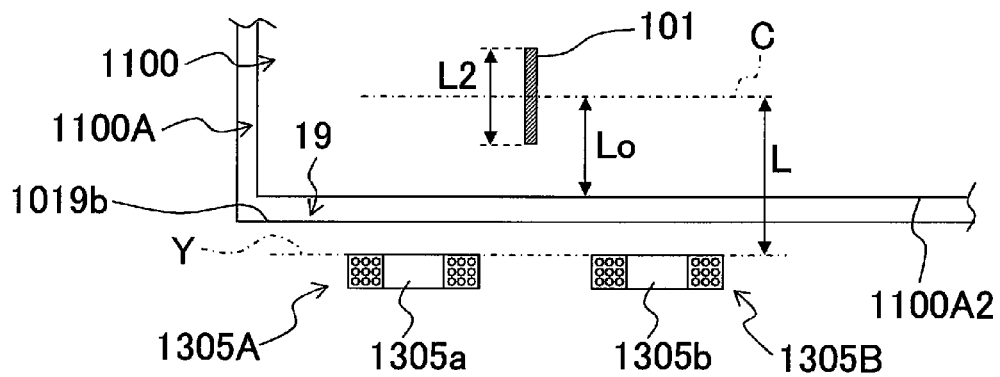
[FIG. 14C]
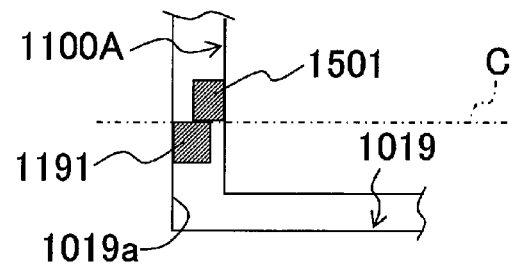

[FIG. 15A]
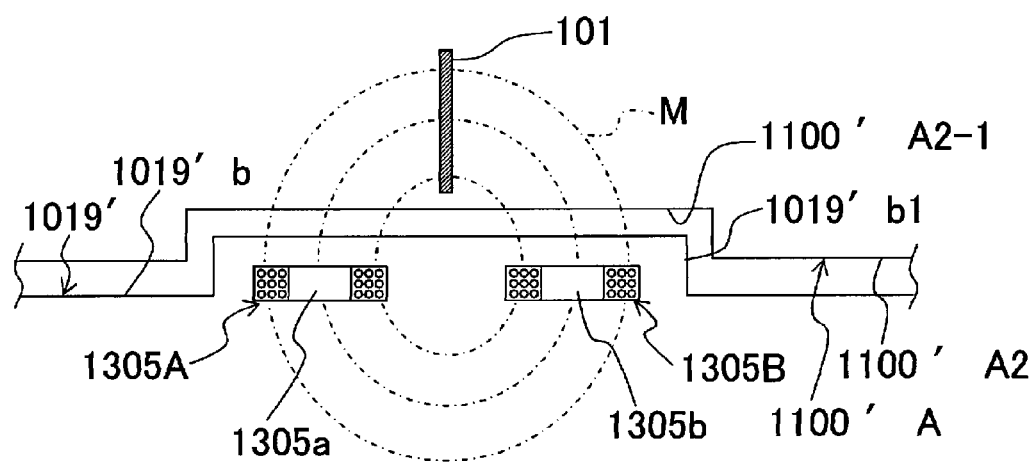
[FIG. 15B]
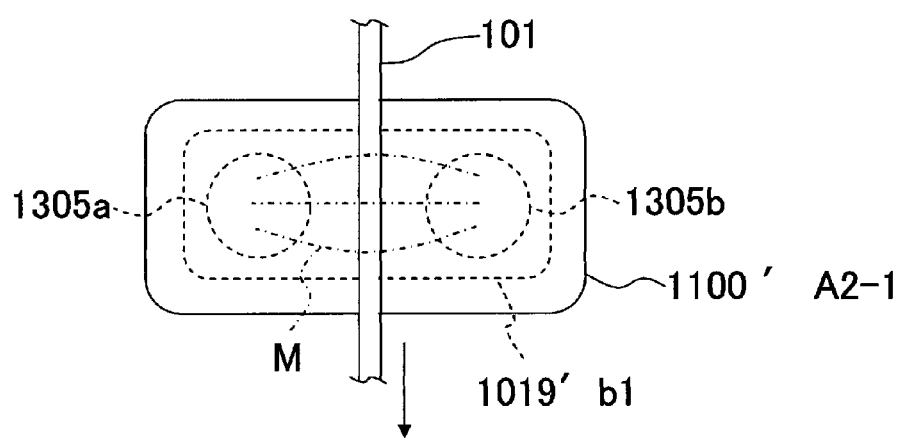

[FIG. 16A]
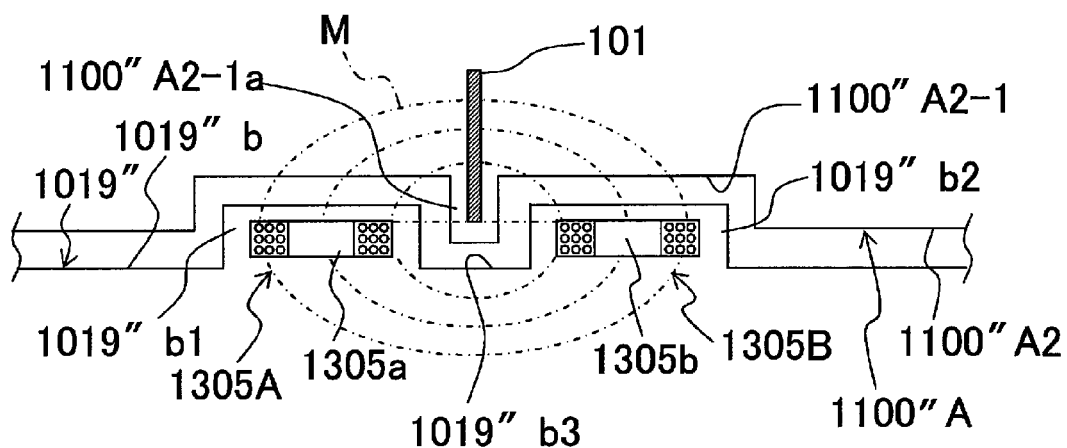
[FIG. 16B]
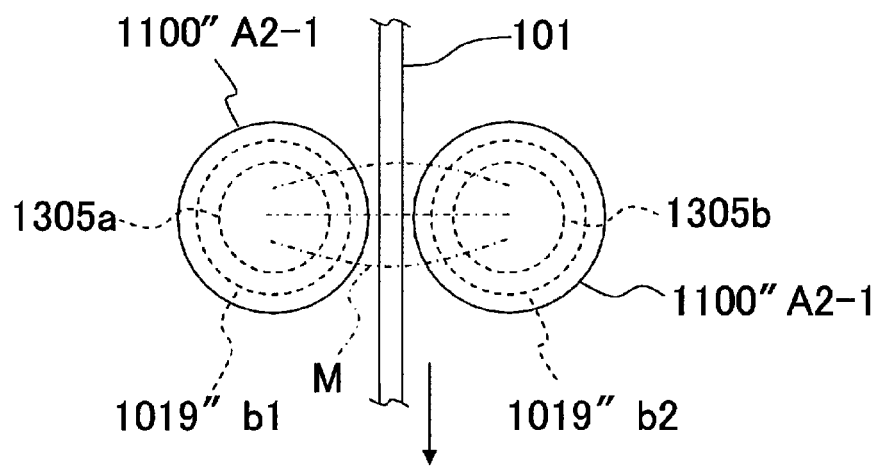

[FIG. 17]
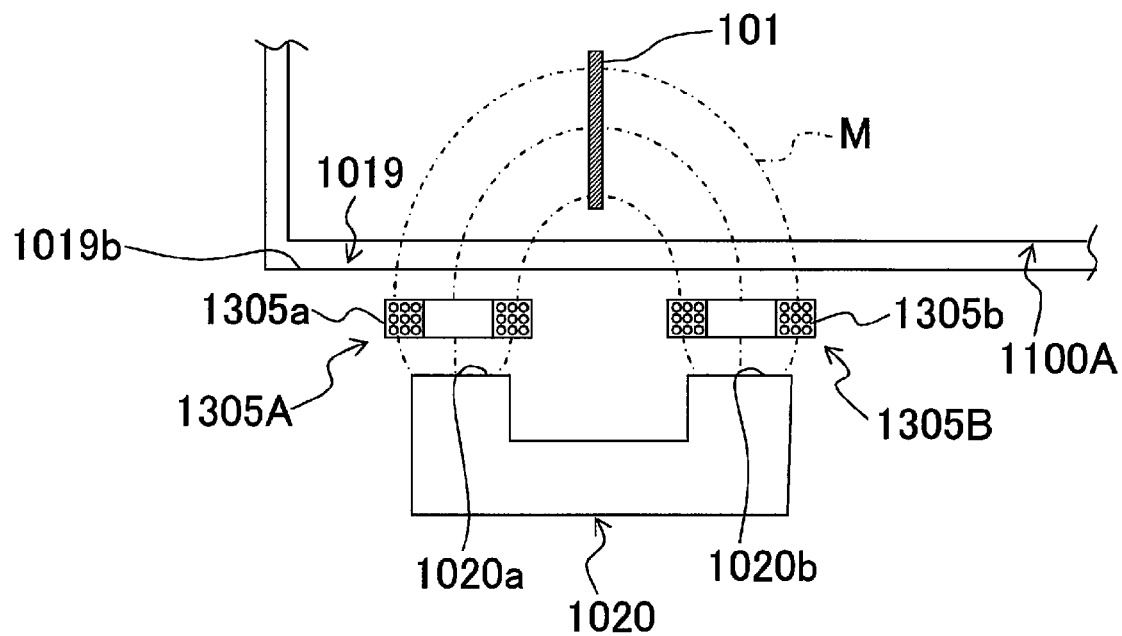
[FIG. 18]
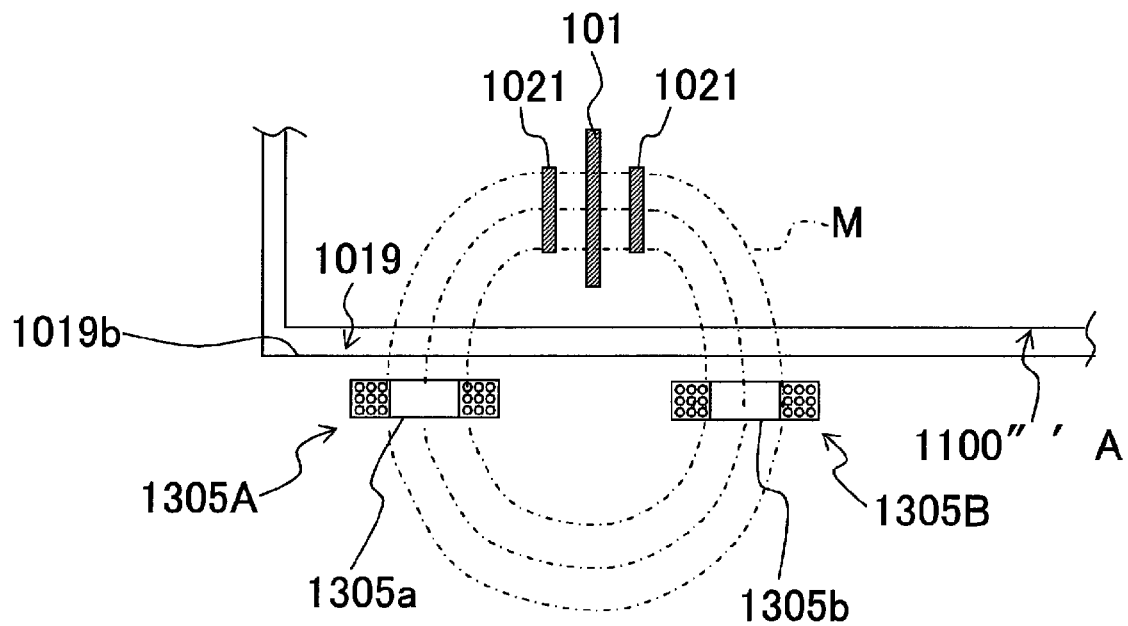

[FIG. 19]
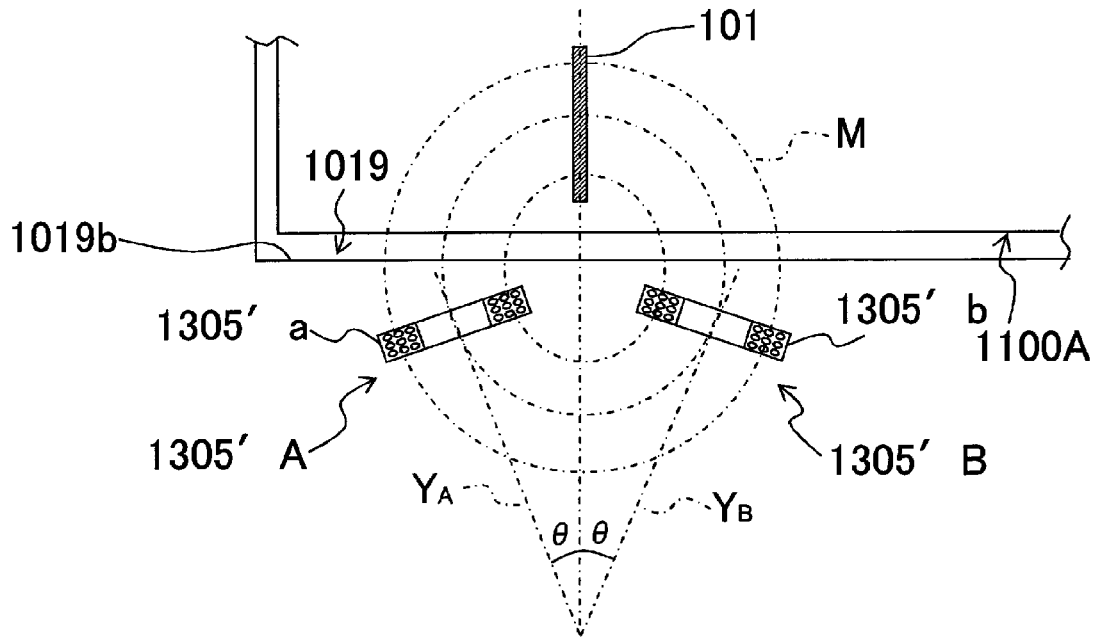
[FIG. 20A]
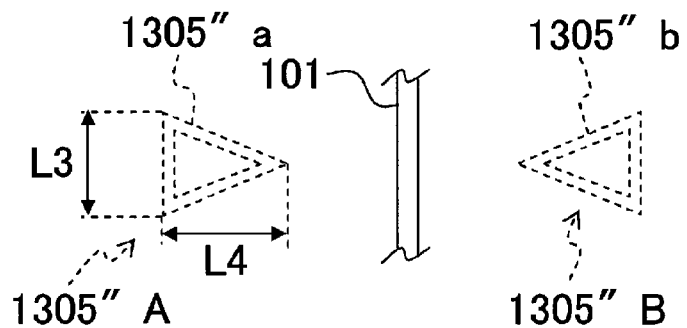
[FIG. 20B]
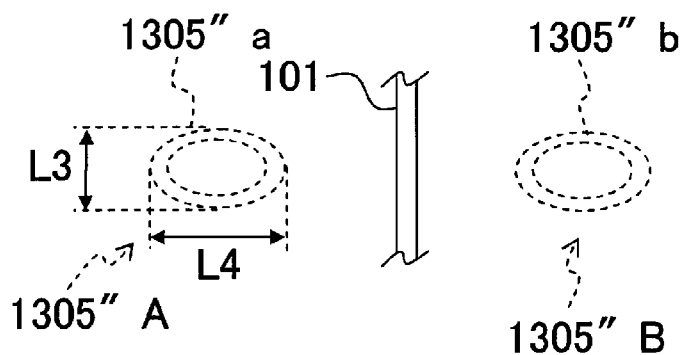

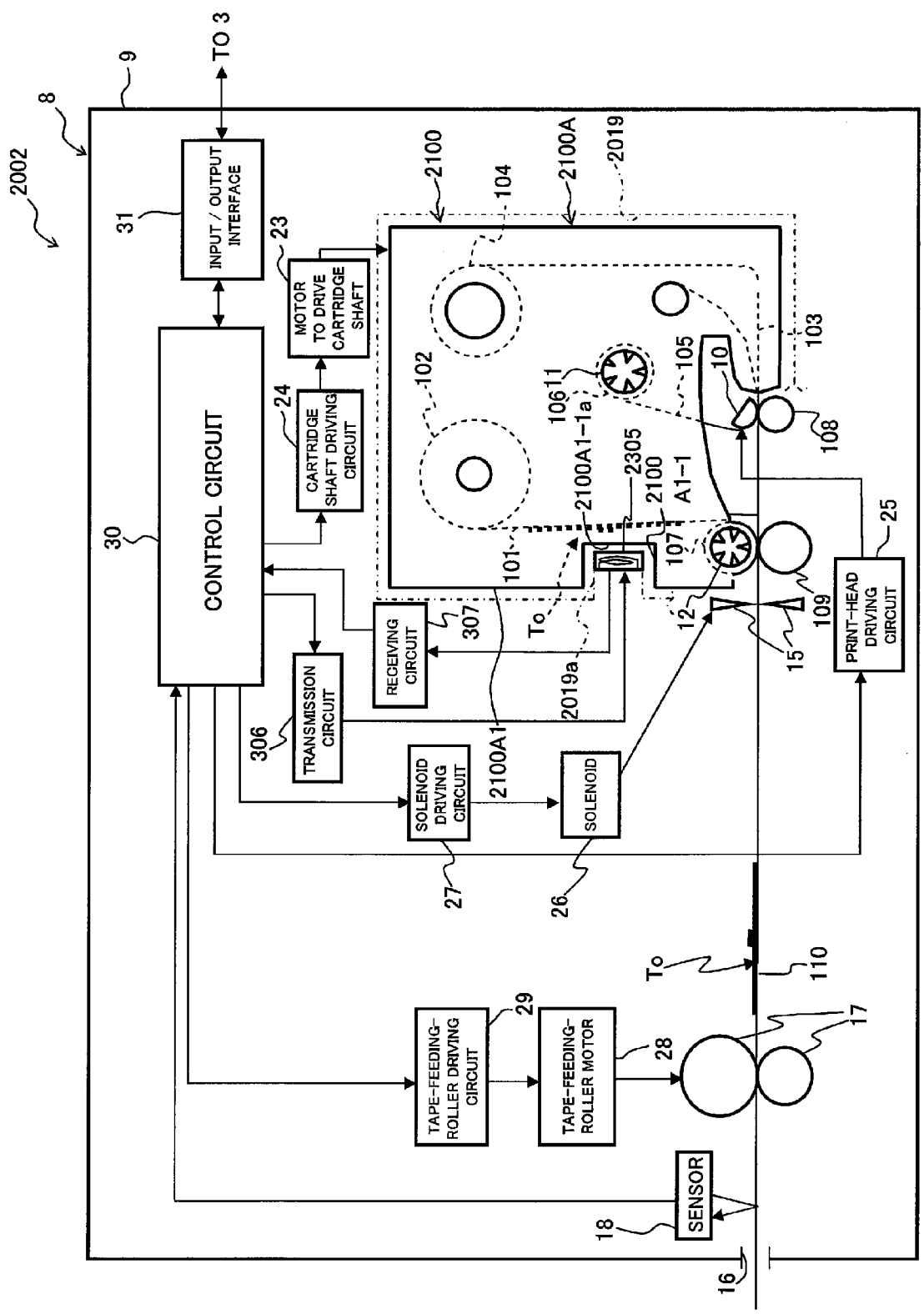
[FIG. 21]

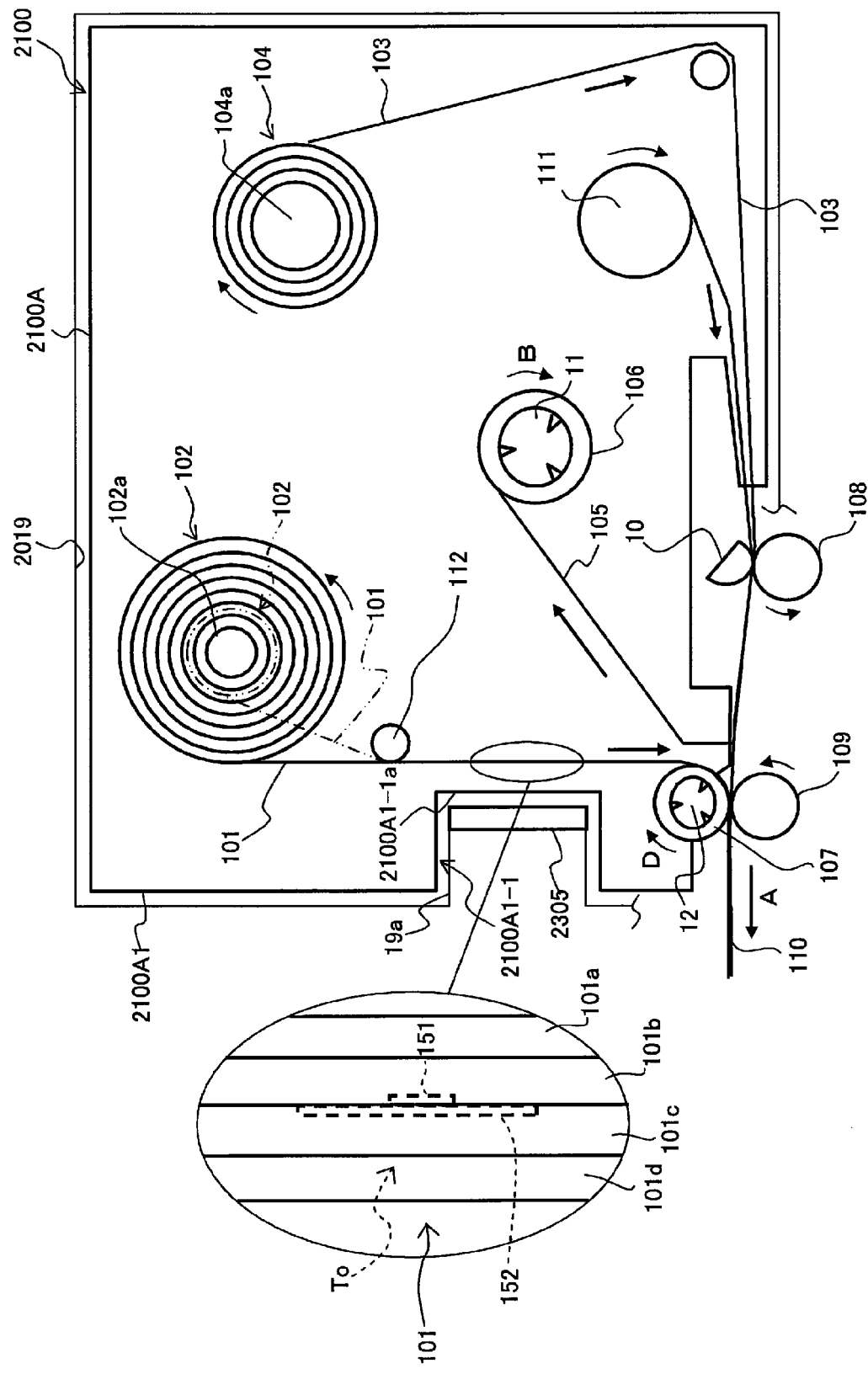
[FIG. 22]

[FIG. 23]
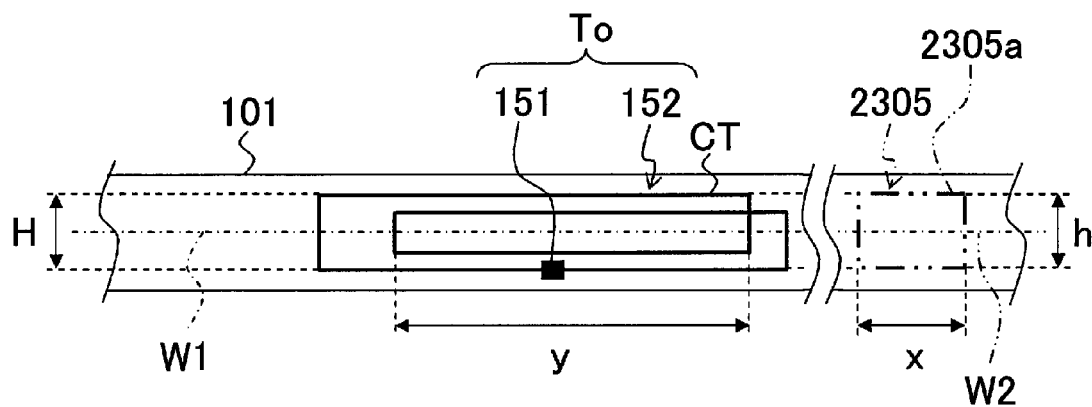
[FIG. 24A]
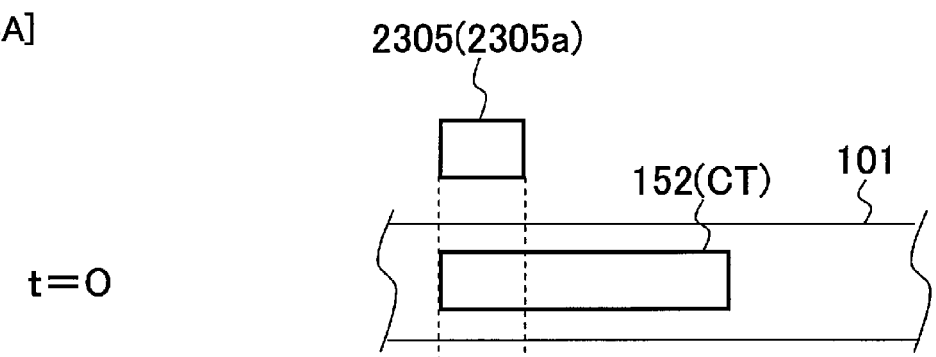
[FIG. 24B]
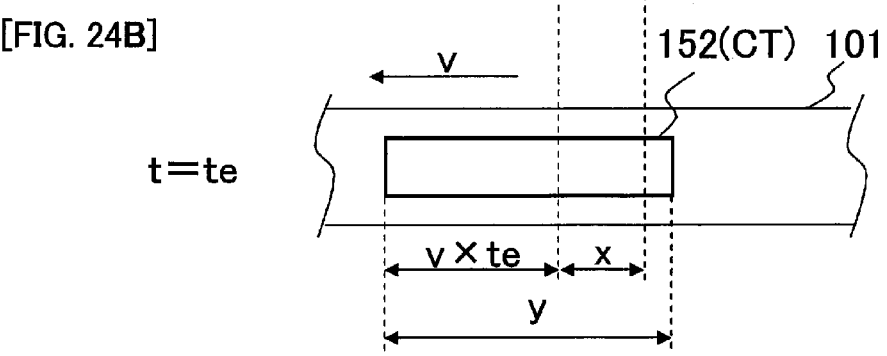

[FIG. 25]
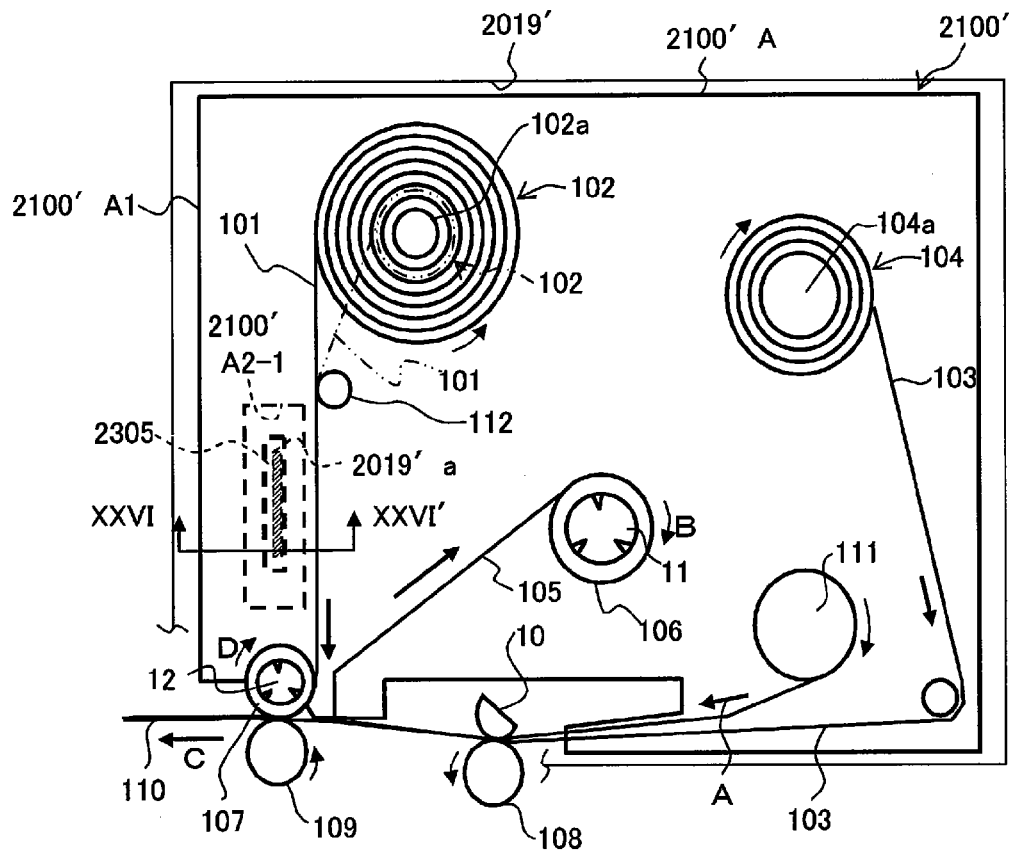
[FIG. 26]
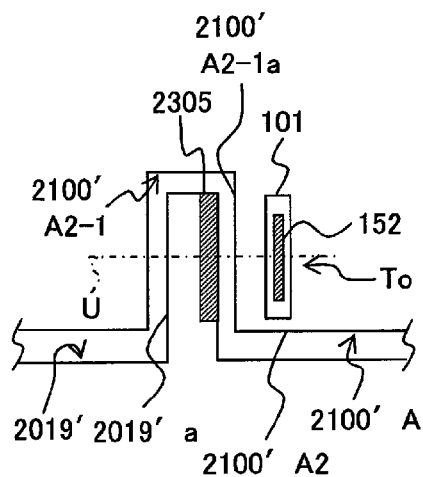

[FIG. 27]
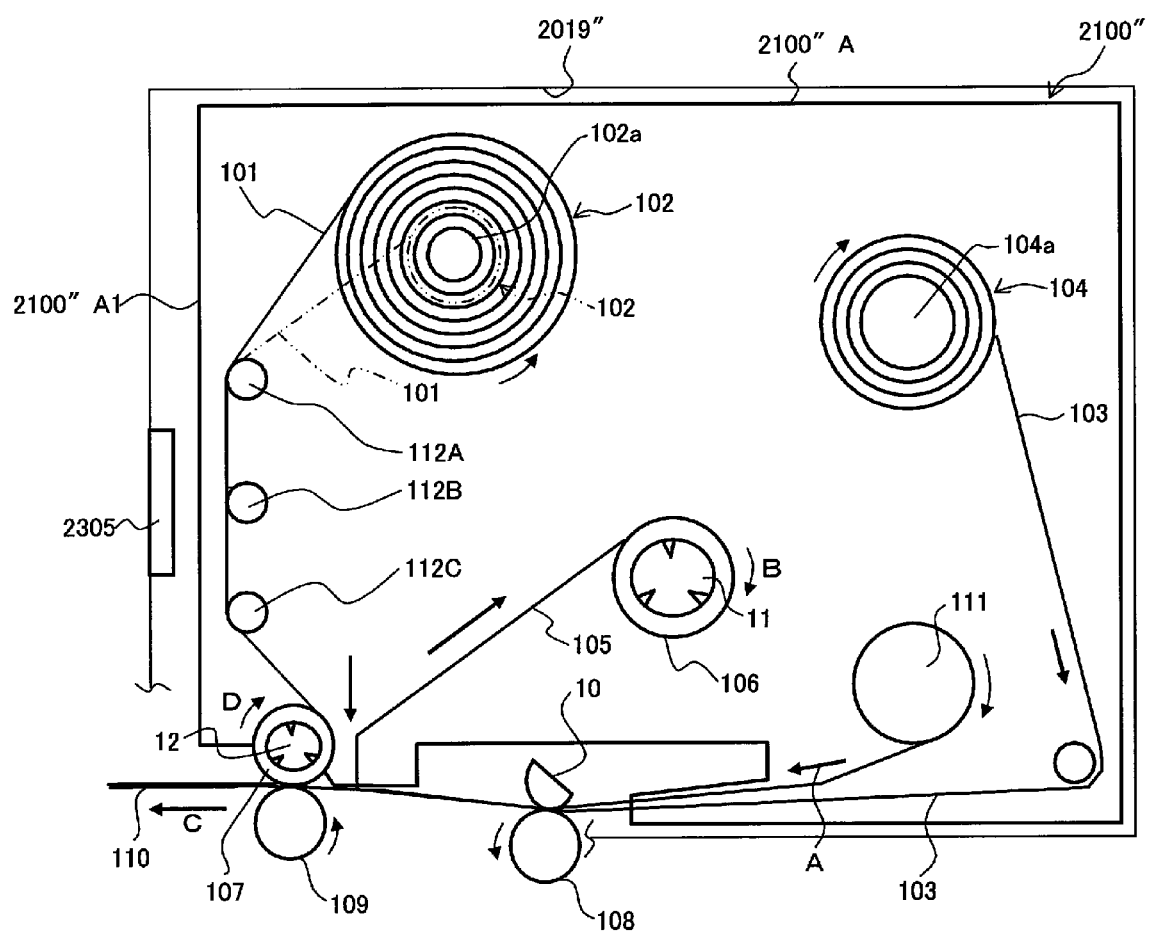

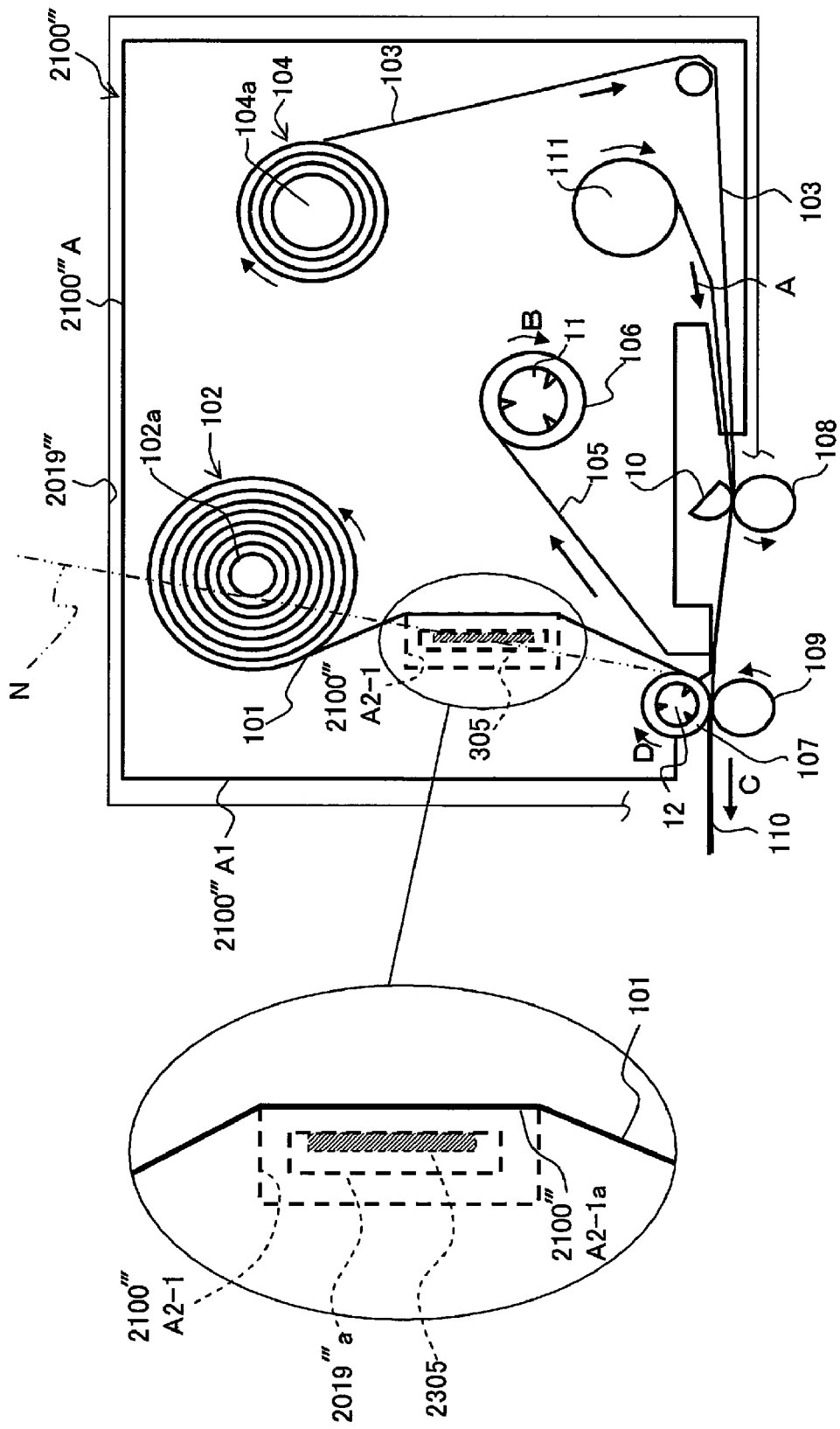
[FIG. 28]

[FIG. 29A]
TAG ANTENNA
MEDIUM WIDTH
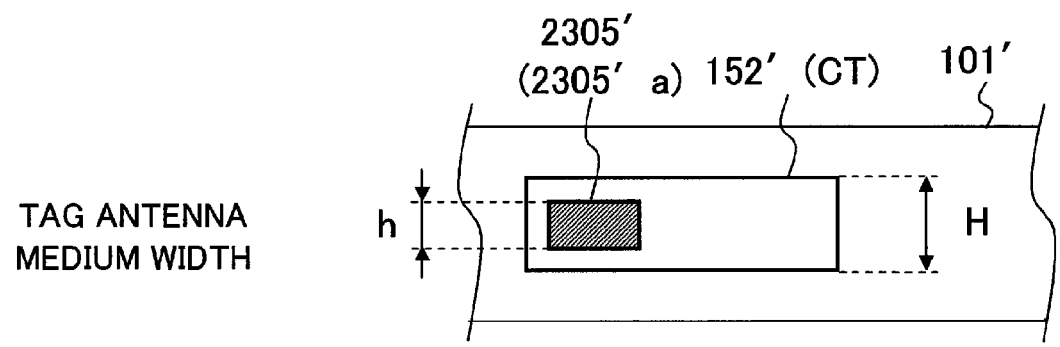
[FIG. 29B]
TAG ANTENNA
LARGE WIDTH
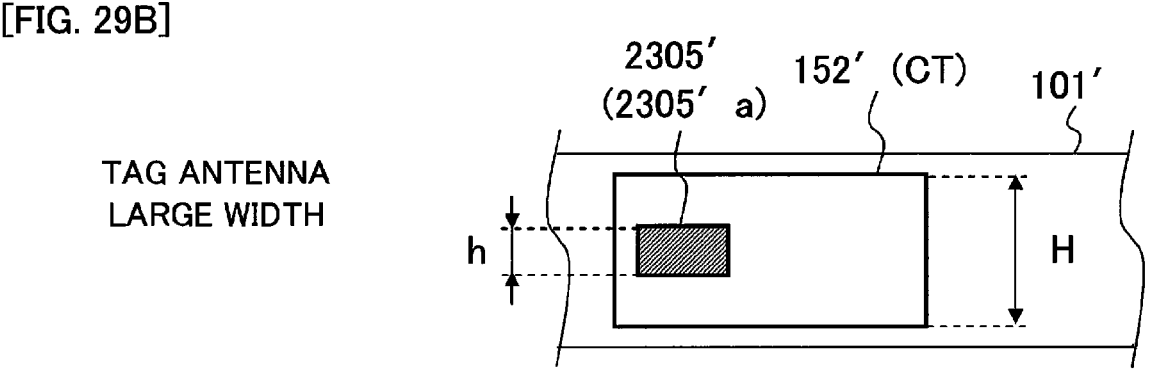

[FIG. 30A]
CENTER
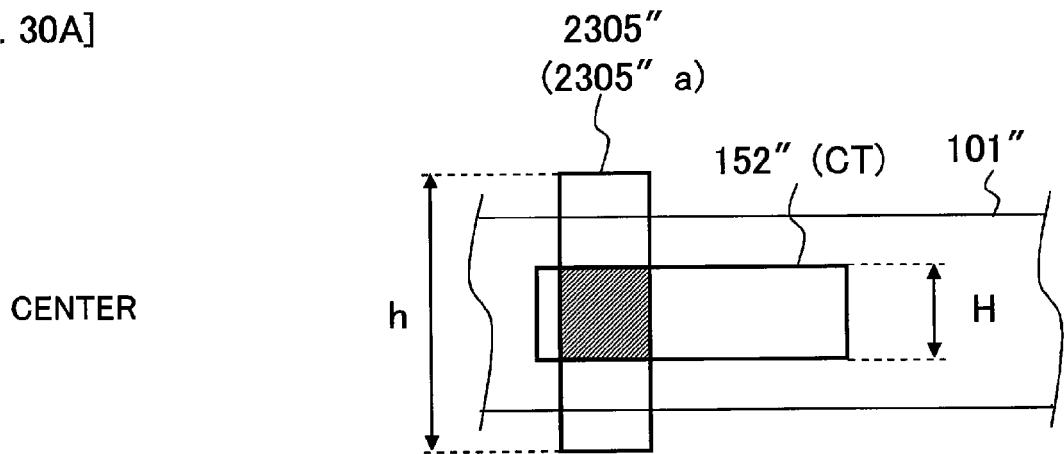
[FIG. 30B]
DISPLACED UPWARD
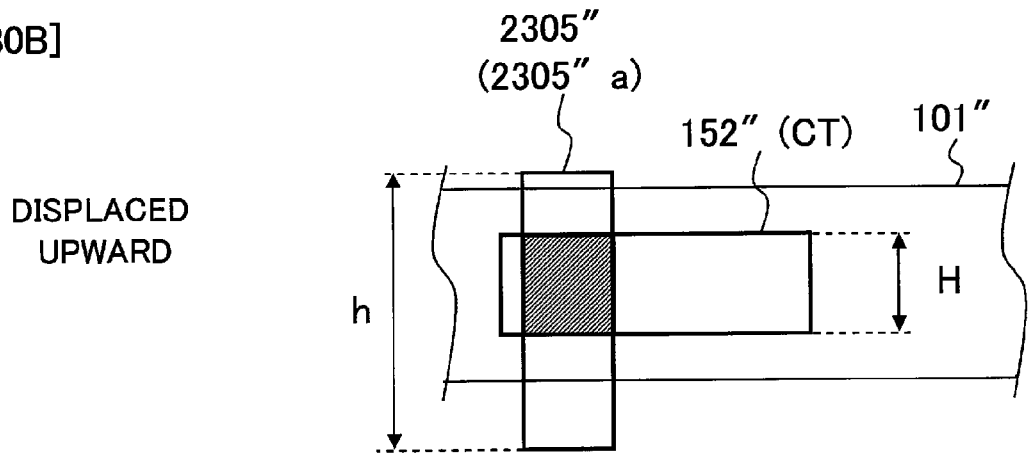
[FIG. 30C]
DISPLACED DOWNWARD
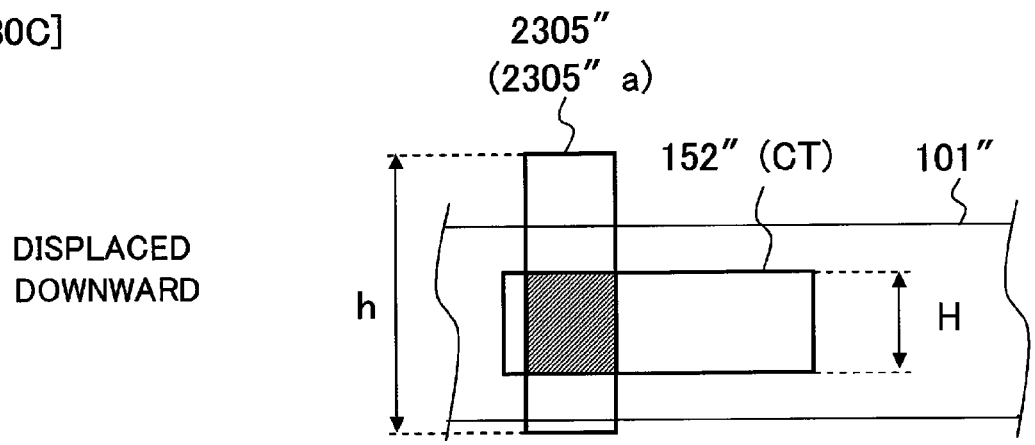

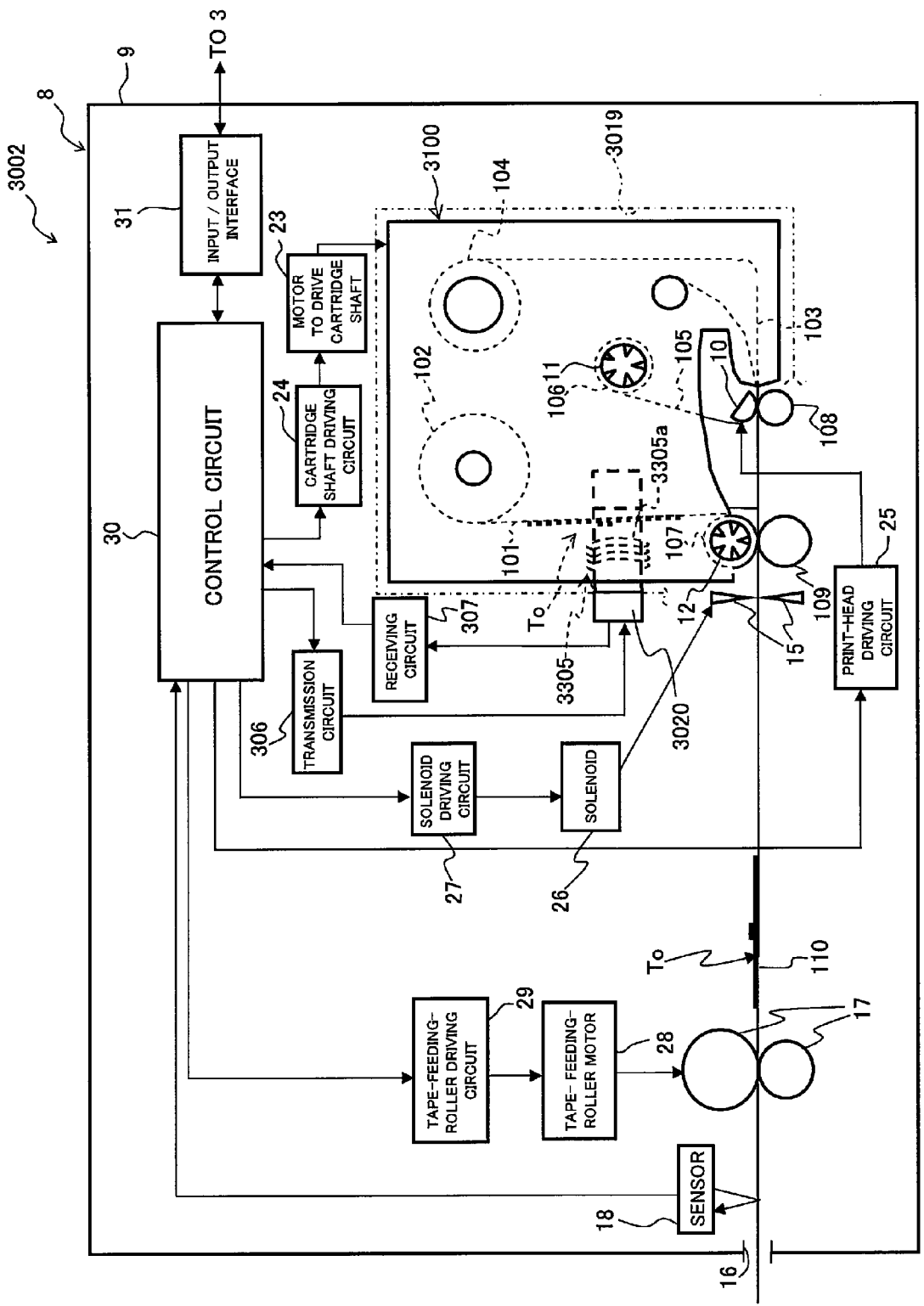
[FIG. 31]

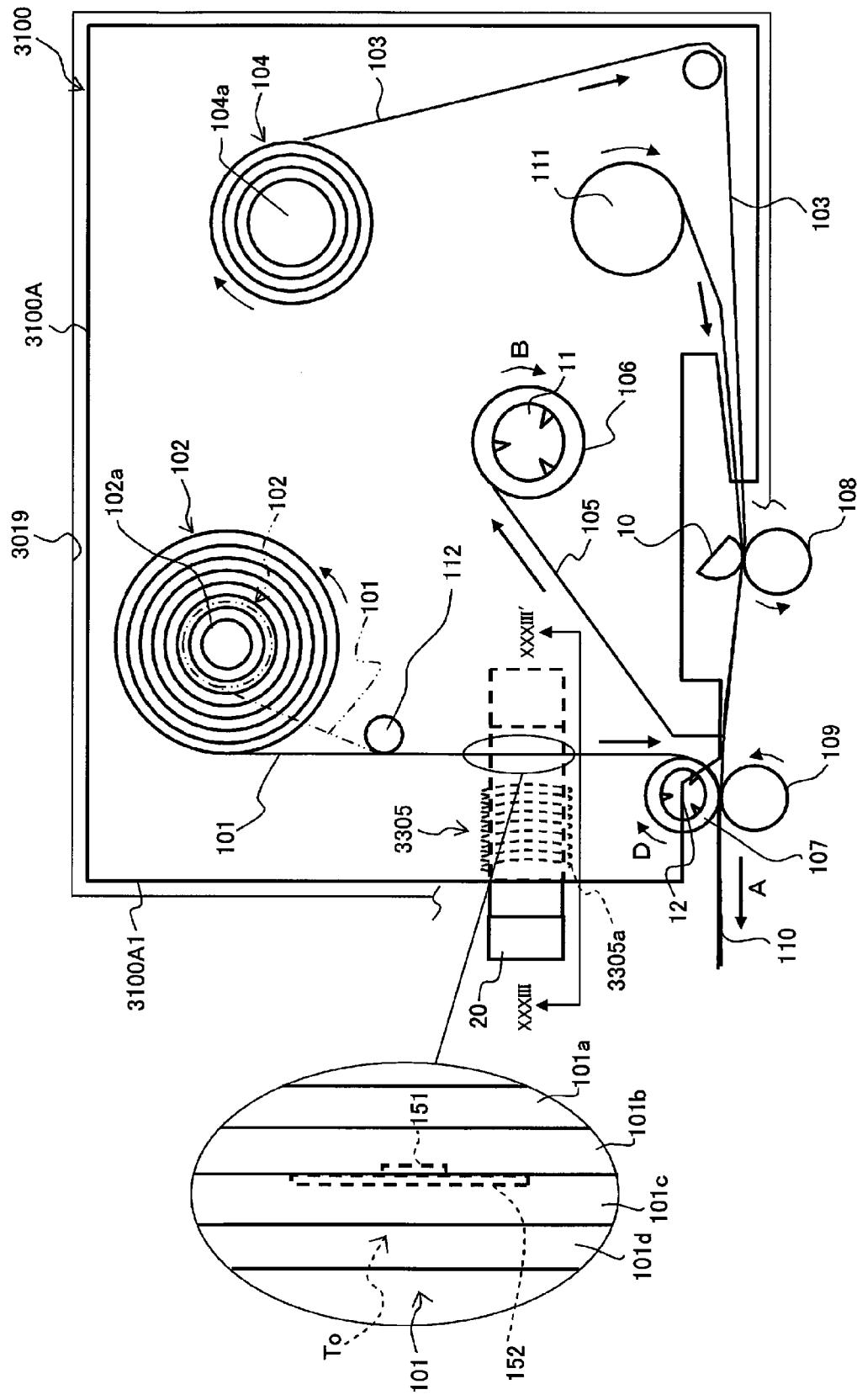
[FIG. 32]

[FIG. 33A]
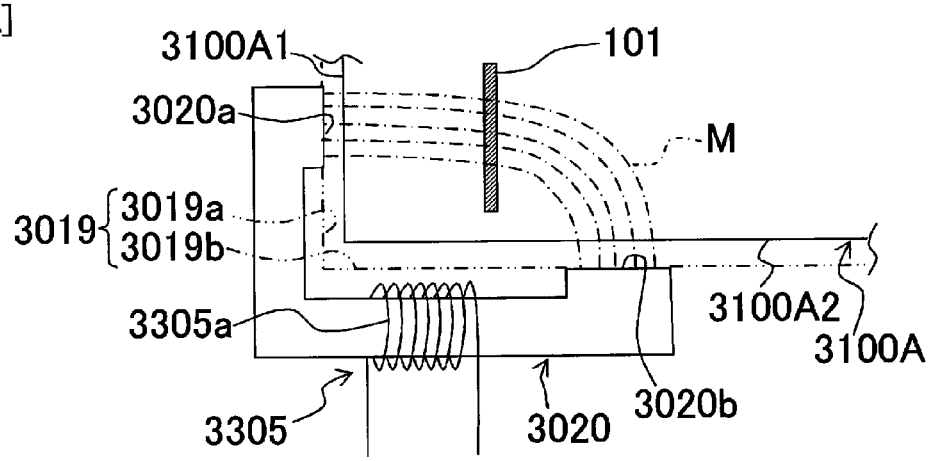
[FIG. 33B]
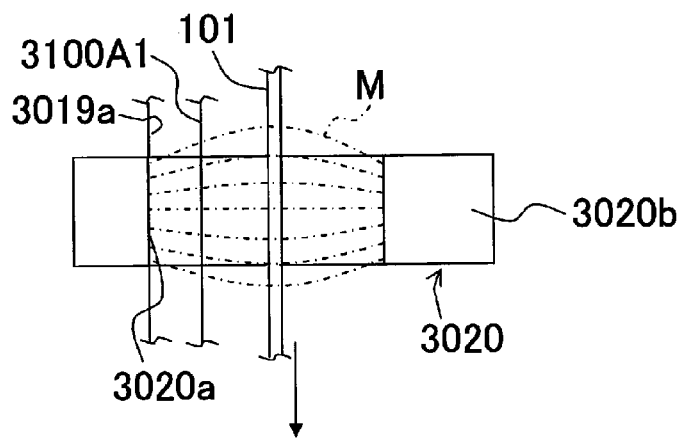
[FIG. 34]
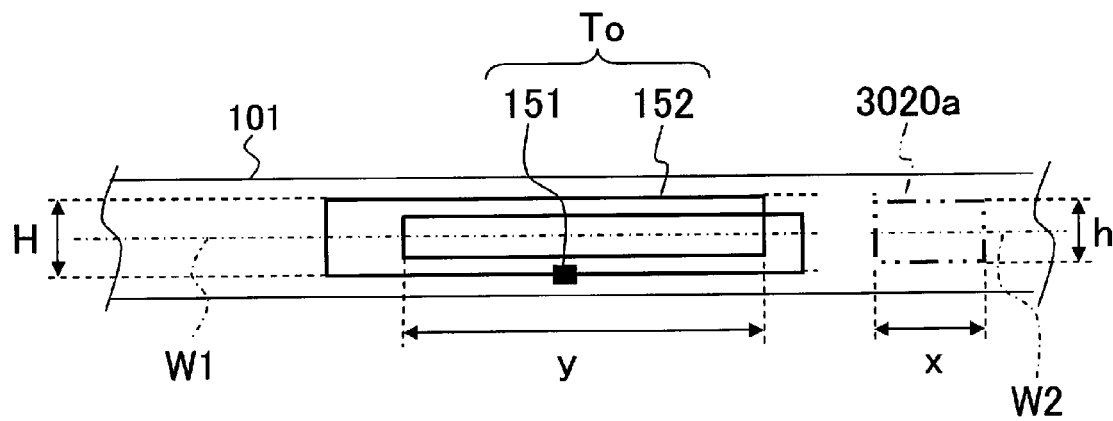

[FIG. 35]
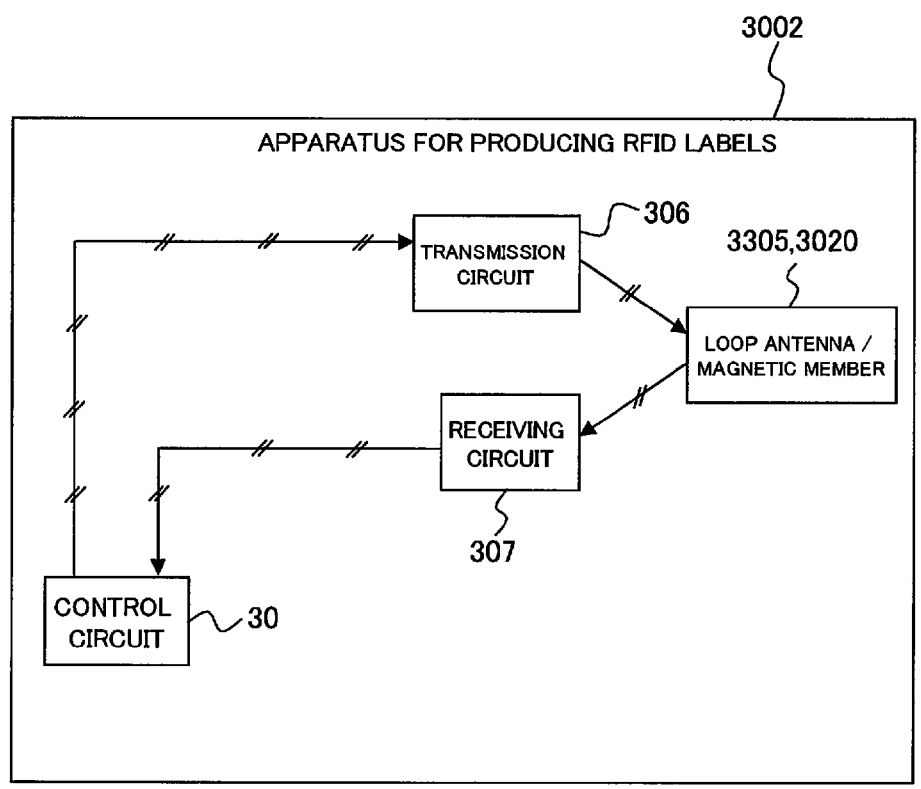

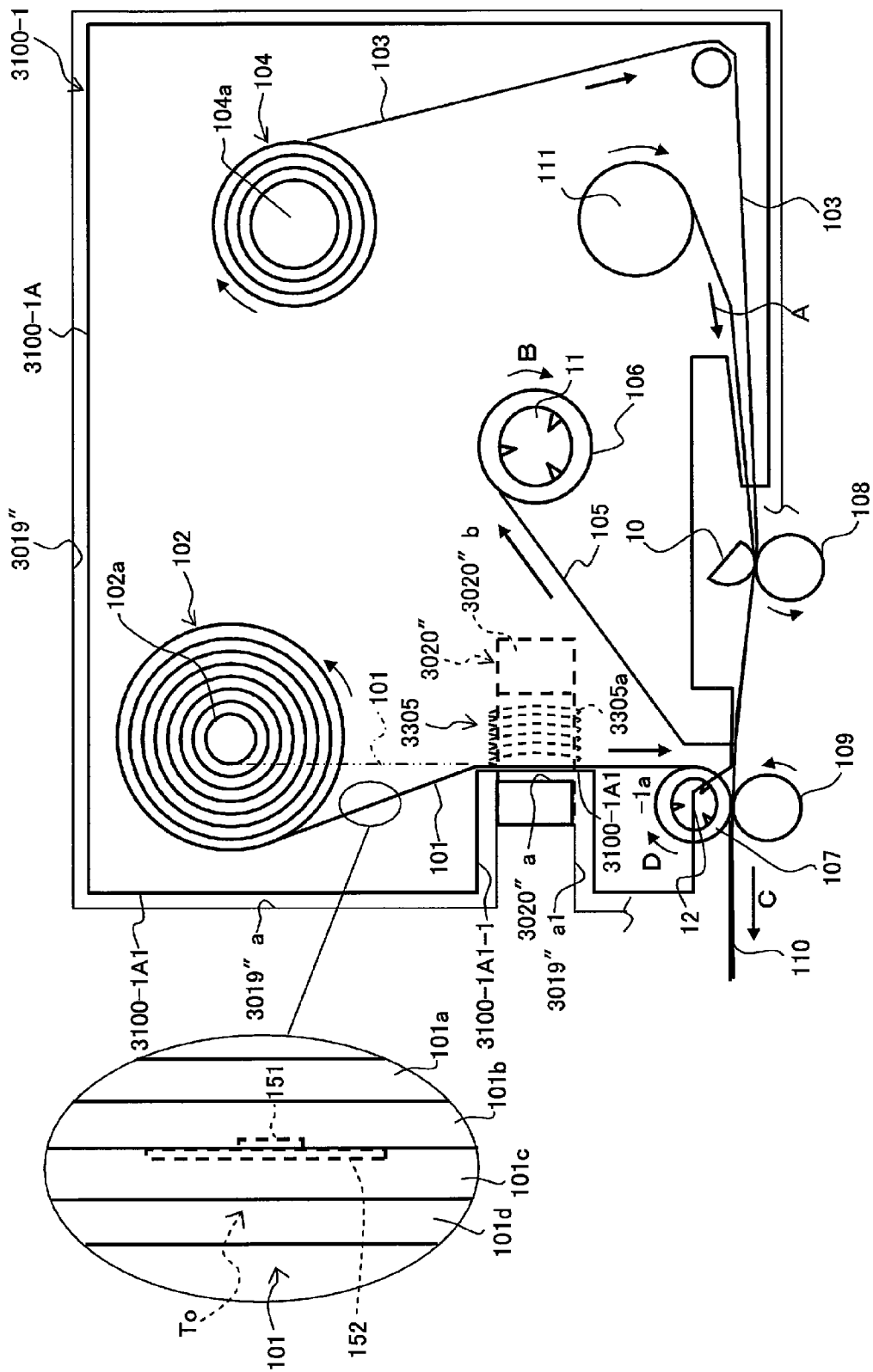
[FIG. 36]

[FIG. 37]
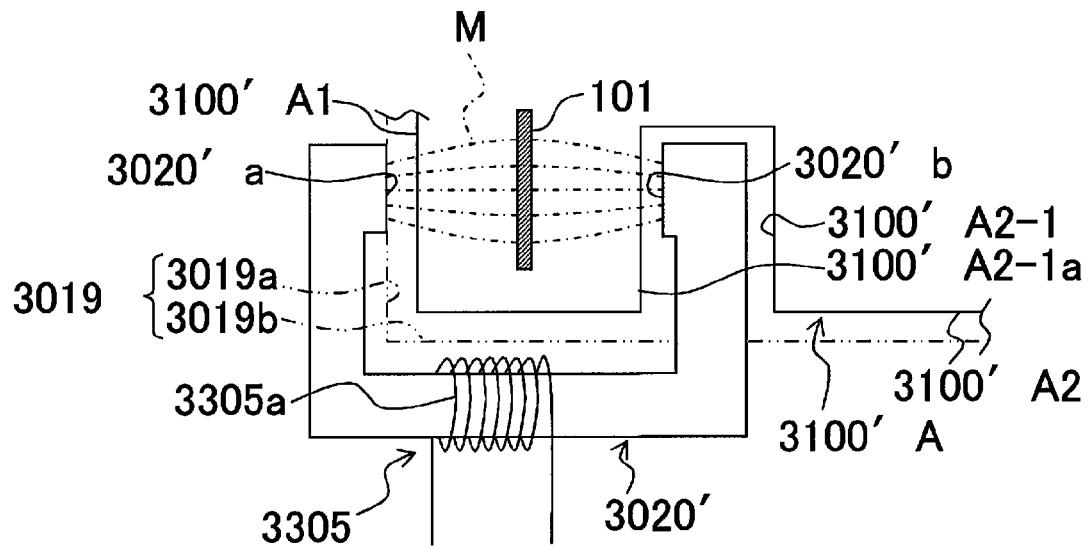
[FIG. 38]
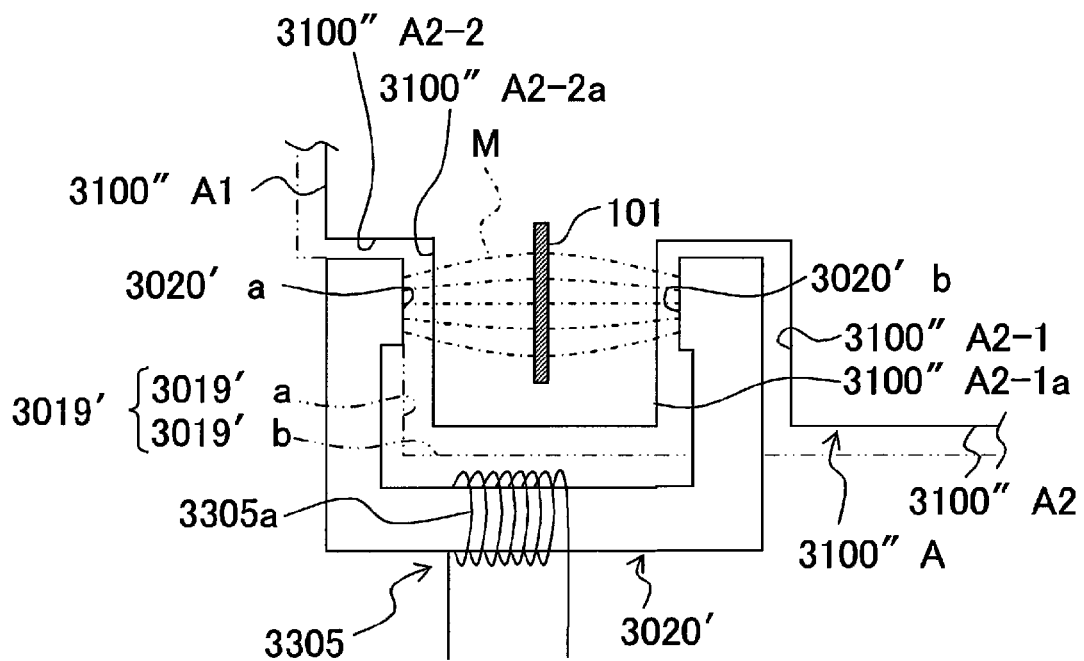

[FIG. 39]
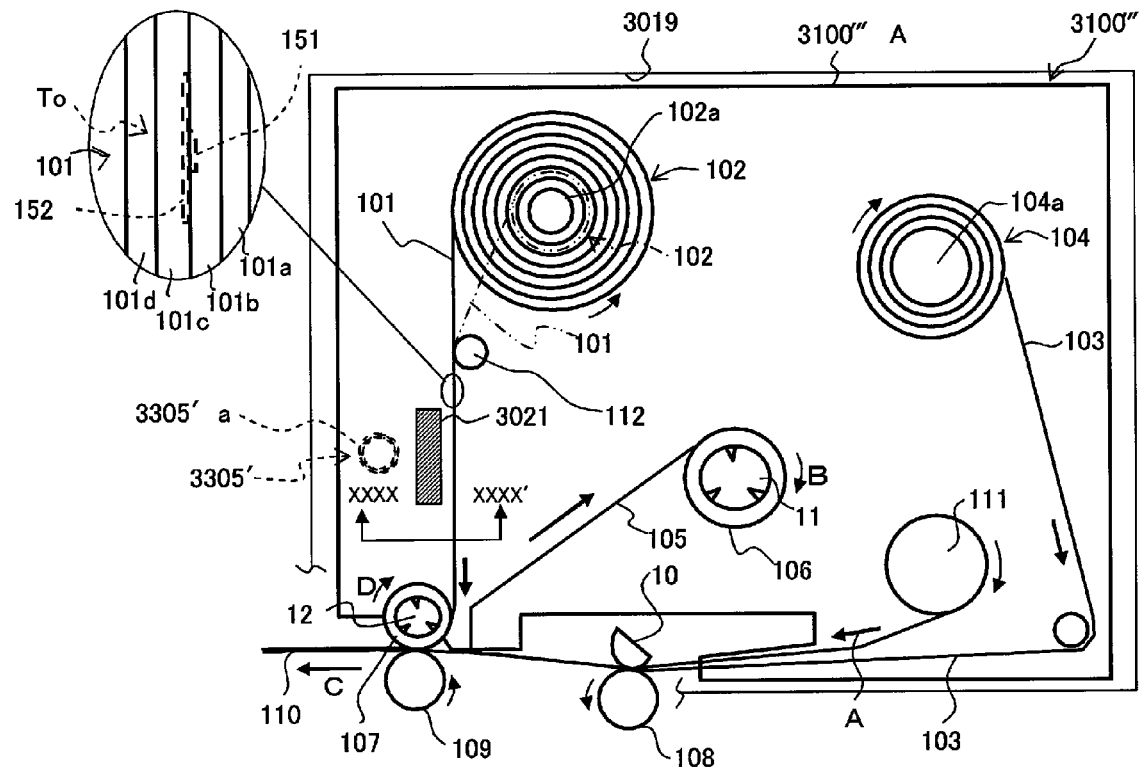
[FIG. 40]
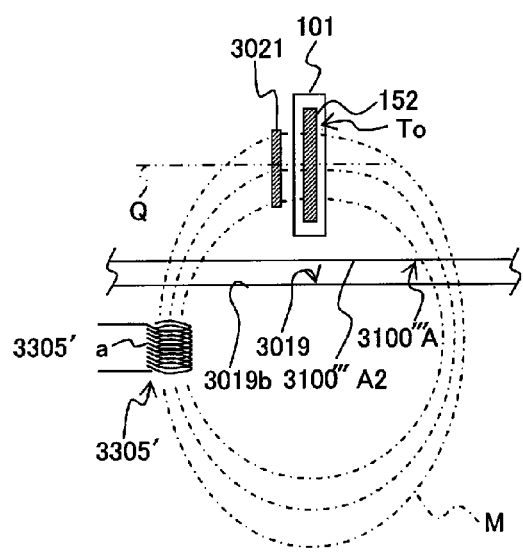

[FIG. 41A]
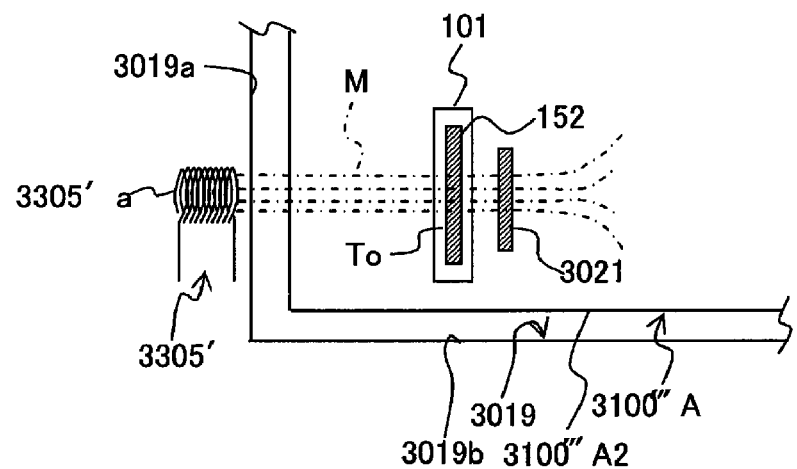
[FIG. 41B]
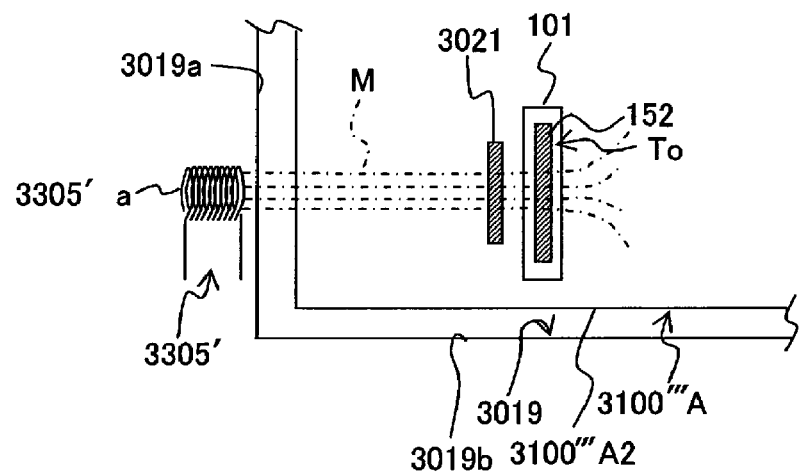

[FIG. 42]
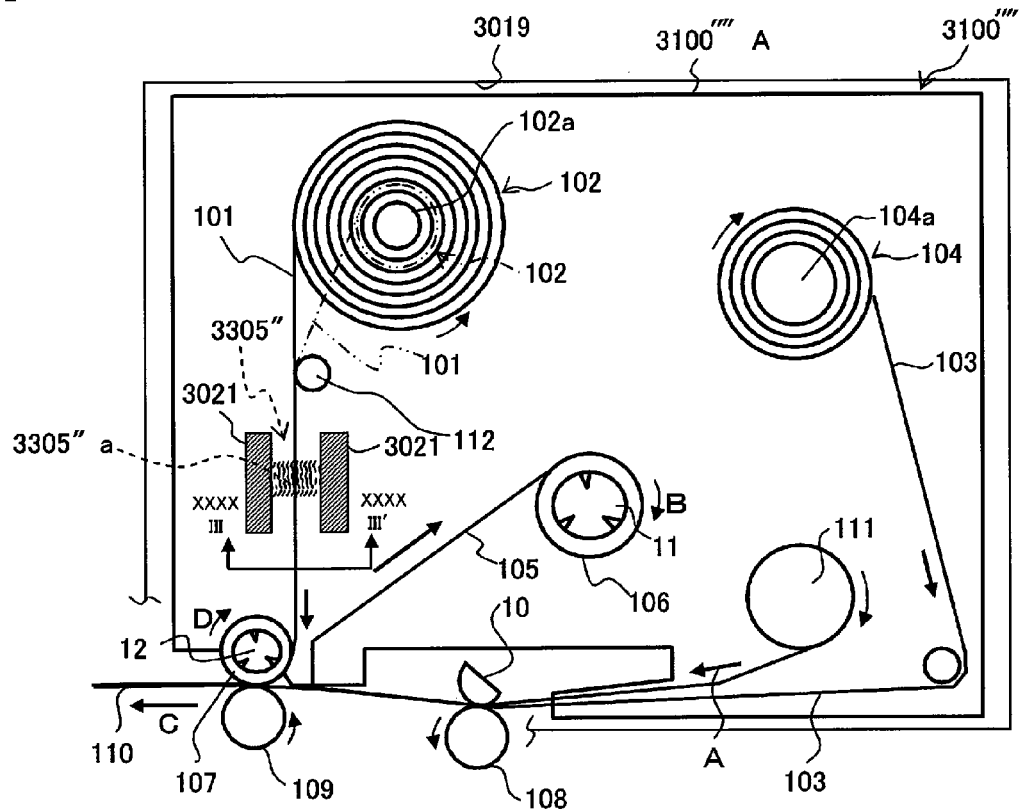
[FIG. 43]
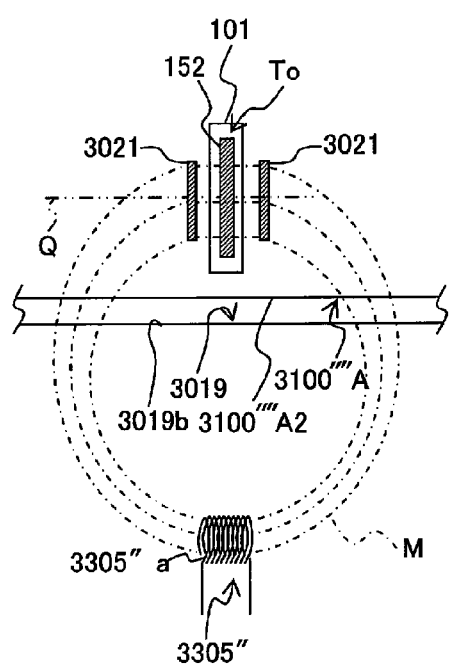

[FIG. 44]
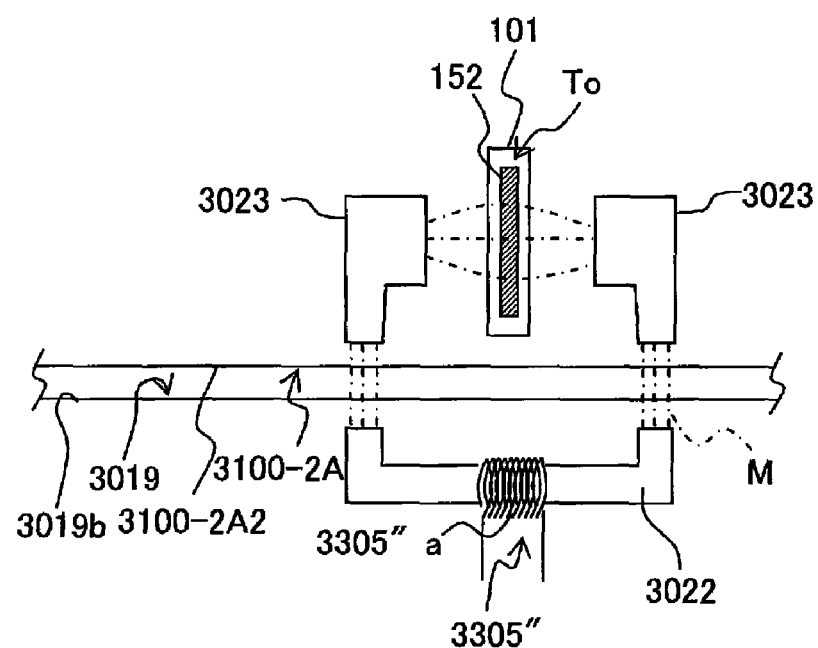

APPARATUS FOR COMMUNICATING WITH A RFID TAG AND CARTRIDGE FOR INCLUDING AT LEAST A RFID TAG

CROSS-REFERENCE TO RELATED APPLICATION

This is a CIP application PCT/JP2006/323303, filed Nov. 22, 2006, which was not published under PCT article 21(2) in English and claims the benefits of Japanese Patent application No. 2005-345044 filed Nov. 30, 2005, No. 2005-344244 filed Nov. 29, 2005, and No. 2005-336677 filed Nov. 22, 2005.

BACKGROUND OF THE INVENTION

1. Field of the Invention

The present invention relates to an apparatus for communicating with a RFID tag in which a cartridge for including at least a RFID tag provided with a RFID circuit element configured to transmit/receive information with outside is detachably arranged and the cartridge for including at least a RFID tag.

2. Description of the Related Art

In an apparatus for communicating with a RFID tag such as a reader/writer configured to write/read information with respect to a RFID circuit element storing information, many methods have been developed for transmission/reception of information with the RFID circuit element and widely put into practice. Method for transmission/reception of information include a contact method using a connector or the like, an electromagnetic coupling method using a coil, an electromagnetic induction method, an optical method or a contactless method such as electric-wave method.

In the above contactless method, a RFID (Radio Frequency Identification) system configured to read/write information contactlessly between a small-sized RFID tag and the apparatus for communicating with a RFID tag is known as employing the electromagnetic coupling method, the electromagnetic induction method or the electric wave method. The RFID circuit element provided at the RFID tag includes an IC circuit part storing predetermined RFID tag information and an antenna connected to the IC circuit part and configured to transmit/receive information, and even if the RFID tag is stained or arranged in a hidden position, the reader/writer can make an access (reading/writing of information) to RFID tag information of the IC circuit part from the side of the apparatus for communicating with a RFID tag, and practical use has already progressed in various fields including product management and inspection process.

The RFID tag as above is usually formed by providing the RFID circuit element on a label-state material, and this RFID label is often affixed onto a target article and the like for classification/organization of various documents/articles, for example. It is also extremely convenient if character information is additionally printed on the tag itself for management of the RFID tag. In response to the need, an apparatus for communicating with a RFID tag (apparatus for producing RFID label) configured not only to read/write information with respect to the RFID tag but to make a print on the tag has been already proposed.

In an apparatus described in JP, A, 2003-140548, for example, from a roll unit provided with a roll (roll paper) around which a base tape (continuous label sheet) having RFID circuit elements (antenna and IC chip) arranged in the tape longitudinal direction at an approximately equal interval is wound, the tag tape is fed out and a predetermined print is made on a predetermined position of the tag tape by a printing means and then, transmission/reception of RFID tag information is carried out with respect to the RFID circuit element provided on the tag tape through an apparatus antenna (communication antenna for RF-ID) so that a tag label with print is produced.

Though not described clearly in JP, A, 2003-140548, in radio communication between an apparatus for communicating with a RFID tag and a RFID circuit element in a RFID system in general, a short wave (13.56 MHz or the like) is used in many cases because of its high communication stability. However, in this case, since a communication distance is small, it is necessary to arrange the apparatus antenna and the RFID circuit element facing close to each other at transmission/reception of information.

At this time, since the apparatus for communicating with a RFID tag in the above related art is configured such that the apparatus antenna is provided in the neighborhood of a feeding path after a tag medium is fed out of the tag roll, and the apparatus antenna and the RFID circuit element are arranged close to each other for information transmission/reception, the size of the apparatus should become larger.

SUMMARY OF THE INVENTION

The present invention has an object to provide an apparatus for communicating with a RFID tag and a cartridge for including at least a RFID tag that can reduce the size of the apparatus.

BRIEF DESCRIPTION OF THE DRAWING

FIG. 1 is a system block diagram illustrating a RFID tag manufacturing system to which an apparatus for producing RFID labels of a first embodiment of the present invention is applied.

FIG. 2 is a conceptual block diagram illustrating a detailed structure of the apparatus for producing RFID labels in the first embodiment.

FIG. 3 is an explanatory diagram for illustrating a detailed structure of a cartridge for including at least a RFID tag.

FIG. 4 is a partial sectional view of a cartridge and a cartridge holder portion by a IV-IV section in FIG. 3.

FIGS. 5A and 5B are diagrams illustrating a winding start position and a connection mode of first and second apparatus coils provided at first and second apparatus loop antennas respectively, in which a serial connection and a parallel connection are shown.

FIG. 6 is a functional block diagram illustrating functional configuration relating to an access function to a RFID circuit element among the functions of the apparatus for producing RFID labels.

FIG. 7 is a circuit diagram schematically illustrating a circuit configuration of a connection portion among a transmission circuit, a receiving circuit, and a loop antenna.

FIG. 8 is a functional block diagram illustrating functional configuration of the RFID circuit element.

FIGS. 9A and 9B are top view and bottom view illustrating an example of an appearance of a RFID label formed by the apparatus for producing RFID labels.

FIGS. 10A and 10B are cross-sectional view and its top view by an X-X' section in FIG. 9A.

FIG. 11 is a view illustrating an example of a screen displayed on a terminal or a general-purpose computer at an access (for reading or writing) to RFID tag information of an IC circuit part of the RFID circuit element by the apparatus for producing RFID labels.

FIG. 12 is a flowchart illustrating a control procedure executed by a control circuit.

FIG. 13 is a flowchart illustrating a detailed procedure of Step S200 in FIG. 11.

FIGS. 14A to 14C are partial sectional views of the cartridge and the cartridge holder portion for explaining that a distance between a lower end of a base tape and a coil face of a first and second apparatus coils is constant when the cartridge is replaced.

FIGS. 15A and 15B are a partial sectional view and its top view respectively of the cartridge and the cartridge holder portion in the vicinity of an installation position of an apparatus loop antenna in a variation when a recess portion is provided on a bottom wall of a cartridge housing.

FIGS. 16A and 16B are a partial sectional view and its top view respectively of the cartridge and the cartridge holder portion in the vicinity of an installation position of an apparatus loop antenna in a variation when a projection portion is further provided at the recess portion provided on the bottom wall of the cartridge housing.

FIG. 17 is a partial sectional view of the cartridge and the cartridge holder portion in the vicinity of an installation position of an apparatus loop antenna in a variation when a magnetic member is provided at the cartridge holder portion.

FIG. 18 is a partial sectional view of the cartridge and the cartridge holder portion in the vicinity of an installation position of an apparatus loop antenna in a variation when a magnetic member is provided inside the cartridge.

FIG. 19 is a partial sectional view of the cartridge and the cartridge holder portion in the vicinity of an installation position of an apparatus loop antenna in a variation when the apparatus loop antenna is inclined.

FIGS. 20A and 20B are diagrams illustrating an example of coil shapes when a sectional profile shape is constructed in a shape other than a circle.

FIG. 21 is a conceptual block diagram illustrating s detailed structure of an apparatus for producing RFID label in a second embodiment of the present invention.

FIG. 22 is an explanatory diagram for illustrating a detailed structure of an embodiment of the cartridge.

FIG. 23 is a diagram illustrating size and positional relation between a loop antenna of the RFID circuit element provided at the base tape fed out of a first roll and a loop antenna provided so as to face a side wall of a cartridge-housing recess portion.

FIGS. 24A and 24B are diagrams for explaining that a dimension of a tag antenna in a transport direction is larger than a value obtained by multiplying time required for information transmission/reception by a feeding velocity of the base tape and adding a dimension of an apparatus antenna in the transport direction.

FIG. 25 is an explanatory diagram for illustrating a detailed structure of the cartridge in a variation when a recess portion is provided on a bottom wall of the cartridge housing.

FIG. 26 is a partial sectional view of the cartridge and the cartridge holder portion by a IIVI-IIVI' section in FIG. 25.

FIG. 27 is an explanatory diagram for illustrating a detailed structure of the cartridge in a variation when a regulating member that regulates the feeding path is provided.

FIG. 28 is an explanatory diagram for illustrating a detailed structure of the cartridge in a variation when the feeding path is regulated by a recess portion provided on the bottom wall of the cartridge housing.

FIGS. 29A and 29B are conceptual diagrams illustrating an example when a width of the tag antenna is larger than that of the apparatus antenna.

FIGS. 30A to 30C are conceptual diagrams illustrating an example when the width of the apparatus antenna is larger than that of the tag antenna.

FIG. 31 is a conceptual block diagram illustrating a detailed structure of an apparatus for producing RFID labels in a third embodiment of the present invention.

FIG. 32 is an explanatory diagram for illustrating a detailed structure of the cartridge.

FIGS. 33A and 33B are a partial sectional view and its top view of the cartridge and the cartridge holder portion by a XXXIII-XXXIII' section in FIG. 32.

FIG. 34 is a diagram illustrating size and positional relation between a loop antenna of the RFID circuit element provided at the base tape fed out of a first roll and an end portion of the apparatus magnetic member provided so as to face a side wall of the cartridge.

FIG. 35 is a functional block diagram illustrating a functional configuration relating to an access function to the RFID circuit element among the functions of the apparatus for producing RFID labels.

FIG. 36 is an explanatory diagram for illustrating a detailed structure of the cartridge in a variation when a recess portion is provided on a side wall of the cartridge housing.

FIG. 37 is a partial sectional view in the vicinity of an installation position of the apparatus magnetic member of the cartridge and the cartridge holder portion in a variation when a recess portion is provided on a bottom wall of the cartridge housing.

FIG. 38 is a partial sectional view in the vicinity of an installation position of the apparatus magnetic member of the cartridge and the cartridge holder portion in a variation when a recess portion is provided on a bottom wall and a side wall of the cartridge housing.

FIG. 39 is an explanatory diagram for illustrating a detailed structure of the cartridge in a variation when a magnetic member is provided in the cartridge.

FIG. 40 is a partial sectional view of the cartridge and the cartridge holder portion by a XXXX-XXXX' section in FIG. 39.

FIGS. 41A and 41B are partial sectional views of the cartridge and the cartridge holder portion when the apparatus antenna is arranged beside the cartridge in a variation in which a magnetic member is provided in the cartridge.

FIG. 42 is an explanatory diagram for illustrating a detailed structure of the cartridge in a variation when the magnetic member is provided on both sides of the base tape in the cartridge.

FIG. 43 is a partial sectional view of the cartridge and the cartridge holder portion by a XXXXIII-XXXXIII' section in FIG. 42.

FIG. 44 is a partial sectional view in the vicinity of an installation position of the magnetic member of the cartridge and the cartridge holder portion in a variation when a magnetic member is provided in and outside the cartridge.

DETAILED DESCRIPTION OF THE PREFERRED EMBODIMENTS

Embodiments of the present invention will be described below referring to the attached drawings.

A first embodiment of the present invention will be described referring to FIGS. 1 to 20.

FIG. 1 is a system block diagram illustrating a RFID tag manufacturing system to which an apparatus for producing RFID labels (apparatus for communicating with a RFID tag) of this embodiment is applied.

In a RFID tag manufacturing system 1 shown in FIG. 1, apparatuses 1002, 2002, 3002 for producing RFID labels according to this embodiment (apparatuses 2002, 3002 for producing RFID labels will be described later) are connected to a route server 4, a terminal 5, a general-purpose computer 6 and a plurality of information servers 7 through a wired or radio communication line 3.

FIG. 2 is a conceptual block diagram illustrating a detailed structure of the apparatus 1002 for producing RFID labels.

In FIG. 2, in an apparatus main body 8 of the apparatus 1002 for producing RFID labels, a cartridge holder portion 1019 (cartridge holder, container holder) as a recess portion is provided, and to this holder portion 1019, a cartridge 1100 (cartridge for including at least a RFID tag, container for including at least a RFID tag) is detachably attached.

The apparatus main body 8 has a print head (printing device, thermal head) 10 configured to make a predetermined print (printing) on a print-receiving tape 103 (print-receiving medium) fed out of a second roll 104, a ribbon take-up roller driving shaft 11 for driving an ink ribbon 105 having finished with print on the print-receiving tape 103, a tape-feeding roller driving shaft 12 configured to bond the print-receiving tape 103 and a base tape 101 (tag medium, tag tape) fed out of a first roll 102 (roll of tape with RFID tag) together and feed it out as a tag label tape 110 with print from the cartridge 1100, first and second device apparatus antennas 1305A, 1305B (apparatus-side magnetic-path forming portion) having first and second apparatus coils 1305a, 1305b (apparatus coils) configured with a substantially circular section (profile shape of a cross-sectional face is substantially circular) configured to transmit/receive a signal by magnetic induction (including electromagnetic induction, magnetic coupling, and other contactless methods performed through a magnetic field) with a RFID circuit element To (details will be described later) provided on the base tape 101, respectively, a cutter 15 configured to cut the tag label tape 110 with print to a predetermined length at a predetermined timing so as to produce a label-state RFID label T (details will be described later), a feeding roller 17 configured to feed and send out the RFID label T to a carry-out exit (discharge exit) 16, a tape end sensor 18 configured to detect presence of the RFID label T, provided in the vicinity of the carry-out exit 16, and a housing 9 constituting an outer shell so as to contain them and provided with the cartridge holder portion 1019 to detachably fit the cartridge 1100 and the carry-out exit 16.

The first and second apparatus loop antennas 1305A, 1305B are, when the cartridge 1100 is attached to the cartridge holder portion 1019, provided on one side and the other side of the base tape 101 while sandwiching a feeding path therebetween along a face direction substantially perpendicular to a face direction in the feeding path of the base tape 101 in the cartridge holder portion 1019. The first and second apparatus loop antennas 1305A, 1305B are excited and driven in phases opposite to each other, as will be described later, and as a result, a magnetic path intersecting with the feeding path of the base tape 101 is formed between the first apparatus loop antenna 1305A and the second apparatus loop antenna 1305B by a magnetic flux generated from the first and second apparatus coils 1305a, 1305b provided at each of them so that information is transmitted/received by magnetic induction with the RFID circuit element To provided at the base tape 101 (See FIG. 4, which will be described later).

On the other hand, the apparatus main body 8 has a transmission circuit 306 and a receiving circuit 307 configured to make an access (read or write) to the RFID circuit element To by the magnetic induction through the first and second apparatus loop antennas 1305A, 1305B, the ribbon take-up roller driving shaft 11, a motor 23 to drive cartridge shaft configured to drive the tape feeding roller driving shaft 12, a cartridge shaft driving circuit 24 configured to control driving of the motor 23 to drive cartridge shaft, a print-head driving circuit 25 configured to control electricity to the print head 10, a solenoid 26 configured to drive the cutter 15 to perform a cutting operation, a solenoid driving circuit 27 configured to control the solenoid 26, a tape-feeding-roller motor 28 configured to drive the feeding roller 17, and a control circuit 30 configured to control an entire operation of the apparatus 2 for producing RFID labels through the transmission circuit 306, receiving circuit 307, cartridge shaft driving circuit 24, print-head driving circuit 25, solenoid driving circuit 27, tape-feeding-roller driving circuit 29 and the like.

The control circuit 30 is a so-called microcomputer, though not shown in detail, and is constituted by a CPU, which is a central processing unit, ROM, RAM and the like and executes signal processing according to a program stored in the ROM in advance using the temporary storage function provided by the RAM. Also, the control circuit 30 is connected to a communication line, for example, via an input/output interface 31 and is capable of information exchange with the above-mentioned route server 4, other terminals 5, the general-purpose computer 6, the information server 7 and the like connected to the communication line.

FIG. 3 is an explanatory diagram for illustrating a detailed structure of the cartridge 1100.

In FIG. 3, the cartridge 1100 has a housing 1100A, the first roll 102 arranged in the housing 1100A and around which the base tape 101 is wound, the second roll 104 around which the transparent print-receiving tape 103 with substantially the same width as that of the base tape 101 is wound, a ribbon-supply-side roll 111 configured to feed out the ink ribbon 105 (thermal transfer ribbon, however, it is not necessary when the print-receiving tape is a thermal tape) the ribbon take-up roller 106 configured to take up the ribbon 105 after print, the tape feeding roller 107, and a guide roller 112 made of a non-adhesive material such as a fluorine resin material.

The tape feeding roller 107 presses and bonds the base tape 101 and the print-receiving tape 103 together to have the tag label tape with print and feeds the tape in a direction shown by an arrow A (=also functioning as a tape feeding roller). At this time, the first and second apparatus loop antennas 1305A, 1305B are located on the upstream side in the transport direction of the base tape 101 rather than the tape feeding roller 107 immediately after feeding out of the base tape 101, and at the upstream positions, an access (reading or writing) to the RFID circuit element To provided at the base tape 101 is carried out by magnetic induction through the first and second apparatus loop antennas 1305A, 1305B. The print head 10 is arranged on the upstream side in the transport direction of the print-receiving tape 103 rather than the tape feeding roller 107. A distance from the tape feeding roller 107 to a tag access position by the first and second apparatus loop antennas 1305A, 1305B is set such that it is longer than a distance from the tape feeding roller 107 to the print head 10.

The first roll 102 has the base tape 101 on which a plurality of the RFID circuit elements To is sequentially formed in the longitudinal direction at a predetermined equal interval wound around a reel member 102a.

The base tape 101 is in a four-layered structure in this example (See a partially enlarged diagram in FIG. 3), and the base tape 101 is constructed in lamination in the order of an adhesive layer 101a (adhesive layer) made of an appropriate adhesive, a colored base film 101b made of PET (polyethylene terephthalate) and the like, an adhesive layer 101c made of an appropriate adhesive, and a separation sheet (separation material) 101d from the side wound inside (right side in FIG. 3) toward the opposite side (left side in FIG. 3).

On the back side of the base film 101b (left side in FIG. 3), a loop antenna 152 (tag loop antenna) constructed in a loop-coil shape and configured to transmit/receive information is integrally provided, an IC circuit part 151 storing information is formed so as to be connected thereto, and the RFID circuit element To is constituted by them.

On the front side of the base film 101b (right side in FIG. 3), the adhesive layer 101a that bonds the print-receiving tape 103 later is formed, while on the back side of the base film 101b (left side in FIG. 3), the separation sheet 101d is bonded to the base film 101b by the adhesive layer 101c provided so as to include the RFID circuit element To. When the RFID label T finally completed in the label state is affixed to a predetermined article or the like, the label can be bonded to the article or the like by the adhesive layer 110c by peeling off the separation sheet 101d.

The second roll 104 has the print-receiving tape 103 wound around a reel member 104a. With regard to the print-receiving tape 103 fed out of the second roll 104, the ribbon 105 driven by the ribbon-supply-side roll 111 and the ribbon take-up roller 106 arranged on the back face side thereof (that is, the side to be bonded to the base tape 101) is brought into contact with the back face of the print-receiving tape 103 by being pressed by the print head 10.

The ribbon take-up roller 106 and the tape feeding roller 107 are rotated and driven by transmission of a driving force of the motor 23 to drive cartridge shaft (See FIG. 2), which is a pulse motor, for example, provided outside the cartridge 1100 to the ribbon take-up roller driving shaft 11 and the tape feeding roller driving shaft 12, respectively.

In the cartridge 1100 with the above configuration, the base tape 101 fed out of the first roll 102 is supplied to the tape feeding roller 107. On the other hand, with regard to the print-receiving tape 103 fed out of the second roll 104, the ribbon 105 driven by the ribbon-supply-side roll 111 and the ribbon take-up roller 106 arranged on the back face side thereof (that is, the side to be bonded to the base tape 101) is brought into contact with the back face of the print-receiving tape 103 by being pressed by the print head 10.

When the cartridge 1100 is attached to the cartridge holder portion 1019 of the apparatus main body 8 and a roll holder (not shown) is moved from a separated position to a contact position, the print-receiving tape 103 and the ink ribbon 105 are held between the print head 10 and a platen roller 108, and the base tape 101 and the print-receiving tape 103 are held between the tape feeding roller 107 and a sub roller 109. Then, the ribbon take-up roller 106 and the tape feeding roller 107 are rotated and driven by the driving force of the motor 23 to drive cartridge shaft in directions shown by an arrow B and an arrow D, respectively, in synchronization with each other. At this time, the tape feeding roller driving shaft 12, the sub roller 109, and the platen roller 108 are connected through the gear (not shown), and with the driving of the tape feeding roller driving shaft 12, the tape feeding roller 107, the sub roller 109, and the platen roller 108 are rotated. As a result, the base tape 101 is fed out of the first roll 102 and supplied to the tape feeding roller 107 as mentioned above. On the other hand, the print-receiving tape 103 is fed out of the second roll 104, and a plurality of heater elements of the print head 10 is electrified by the print-head driving circuit 25. As a result, a print R (See FIG. 9, which will be described later) corresponding to the RFID circuit element To on the base tape 101 to be an object to be bonded is printed on the back face of the print-receiving tape 103. Then, the base tape 101 and the print-receiving tape 103 having finished with printing are bonded by the tape feeding roller 107 and the sub-roller 109 and integrated and formed as the tag label tape with print and fed out of the cartridge 1100. The ink ribbon 105 having finished with the printing on the print-receiving tape 103 is taken up by the ribbon take-up roller 106 by the driving of the ribbon take-up roller driving shaft 11.

FIG. 4 is a partial sectional view of the cartridge and the cartridge holder portion by IV-IV section in FIG. 3.

In FIG. 4, as mentioned above, the first and second apparatus loop antennas 1305A, 1305B are disposed on one side and the other side of the base tape 101, respectively, with the feeding path between them along the face direction substantially perpendicular to the face direction of the base tape 101 in the feeding path in the cartridge holder portion 1019 when the cartridge 1100 is attached to the cartridge holder portion 1019. The first and second apparatus loop antennas 1305A, 1305B are installed in a bottom wall 1019b of the cartridge holder portion 1019 such that coil faces of the first and second apparatus coils 1305a, 1305b provided in the first and second apparatus loop antennas 1305A, 1305B, respectively, are in the same plane Y. As a result, by the magnetic flux generated from the first and second apparatus coils 1305a, 1305b, a magnetic path M substantially in a semicircular shape is formed originating from the first apparatus loop antenna 1305A to the second apparatus loop antenna 1305B after intersecting with (here, substantially perpendicular to each other) the feeding path of the base tape 101, and information is transmitted/received by magnetic induction with the RFID circuit element To provided at the base tape 101.

FIG. 5 is a diagram illustrating a winding start position and a connection mode of the first and second apparatus coils 1305a, 1305b provided at the first and second apparatus loop antennas 1305A, 1305B, respectively, in which FIG. 5A shows a serial connection and FIG. 5B shows a parallel connection.

In this embodiment, the first and second apparatus coils 1305a, 1305b are constituted in 10 to 12 turns, for example, and they may be connected in series as shown in FIG. 5A or may be connected in parallel as shown in FIG. 5B. In any case, the winding start positions are opposite to each other between the first and second apparatus coils 1305a, 1305b, and thereby the first and second apparatus loop antennas 1305A, 1305B are excited and driven in the phases opposite to each other.

FIG. 6 is a functional block diagram illustrating a functional configuration relating to an access (reading or writing) function to the RFID circuit element To among the functions of the apparatuses 1002, 2002 for producing RFID labels (the apparatus 2002 for producing RFID labels will be described later).

In FIG. 6, the apparatuses 1002, 2002 for producing RFID labels have the transmission circuit 306 configured to generate a carrier wave to make an access (for reading/writing) to the RFID circuit element To through the first and second apparatus loop antennas 1305A, 1305B (third apparatus loop antenna 2305 for the apparatus 2002 for producing RFID labels, which will be described later) and to modulate the carrier wave on the basis of a control signal input from the control circuit 30, the receiving circuit 307 configured to demodulate a reply signal received from the RFID circuit element To through the first and second apparatus loop antennas 1305A, 1305B, 2305 and to output it to the control circuit 30, and the control circuit 30 configured to carry out modulation control of the carrier wave at the transmission circuit 306 and processing of a signal demodulated at the receiving circuit 307.

FIG. 7 is a circuit diagram schematically illustrating a circuit configuration of a connection portion among the transmission circuit 306, receiving circuit 307, first and second apparatus loop antennas 1305A, 1305B, and the third apparatus loop antenna 2305 (fourth apparatus loop antenna 3305, which will be described later).

In FIG. 7, the transmission circuit 306 is connected to the apparatus loop antennas 1305A, 1305B, 2305, 3305, while the receiving circuit 307 is connected to a capacitor 310 connected in series with the apparatus loop antennas 1305A, 1305B, 2305, 3305.

FIG. 8 is a functional block diagram illustrating a functional configuration of the RFID circuit element To. In FIG. 8, the RFID circuit element To has the loop antenna 152 configured to transmit/receive a signal contactlessly by magnetic induction with the first and second apparatus loop antennas 1305A, 1305B (or the third apparatus loop antenna 2305 on the side of the apparatus 2002 for producing RFID labels, which will be described later or a fourth apparatus loop antenna 3305 on the side of the apparatus 3002 for producing RFID labels, which will be described later) on the side of the apparatus 1002 for producing RFID labels and the IC circuit part 151 connected to the loop antenna 152.

The loop antenna 152 is configured to have a width L smaller than a width LT of the base tape 101 as shown in FIG. 10B, which will be described later, and is provided such that the centers in the width direction of the base tape 101 and the loop antenna 152 coincide with each other.

The IC circuit part 151 includes a rectification part configured to rectify the carrier wave received by the loop antenna 152, a power source part 154 configured to accumulate energy of the carrier wave rectified by the rectification part 153 and to make it a driving power source, a clock extraction part 156 configured to extract a clock signal from the carrier wave received by the loop antenna and to supply it to a control part 155, a memory part that can store a predetermined information signal, a modem part 158 connected to the loop antenna 152, and the control part 155 configured to control operation of the RFID circuit element To through the rectification part 153, the clock extraction part 156, the modem part 158 and the like.

The modem part 158 demodulates a communication signal from the first and second apparatus loop antennas 1305A, 1305B (or the loop antennas 2305, 3305) of the apparatus 2 for producing RFID labels received at the loop antenna 152 and modulates and reflects the carrier wave received by the loop antenna 152 on the basis of a reply signal from the control part 155.

The control part 155 executes basic operation control such as interpretation of a received signal demodulated by the modem part 158, generation of a reply signal based on the information signal stored in the memory part 157, reply of it by the modem part 158 and the like.

FIGS. 9A and 9B are views illustrating an example of the appearance of the RFID label T formed after information writing (or reading) of the RFID circuit element To and cutting of the tag label tape 110 with print by the apparatus 1002 for producing RFID labels (or apparatuses 2002, 3002 for producing RFID labels, which will be described later) constructed as above have been finished, in which FIG. 9A is a top view and FIG. 9B is a bottom view. FIG. 10A is a cross-sectional view by X-X' section in FIG. 9A and FIG. 10B is its top view.

In FIGS. 9A, 9B, 10A, and 10B, the RFID label T is in the five-layered structure in which the print-receiving tape 103 is added to the four-layered structure shown in FIG. 3, of the print-receiving tape 103, the adhesive layer 101a, the base film 101b, the adhesive layer 101c, and the separation sheet 101d from the print-receiving tape 103 side (upper side in FIG. 10A) to the opposite side (lower side in FIG. 10A). Further, the RFID circuit element To including the loop antenna 152 provided on the back side of the base film 101b as mentioned above is provided in the adhesive layer 101c, and the print R (characters of "RF-ID" representing the type of the RFID label T in this embodiment) is printed on the back face of the print-receiving tape 103.

FIG. 11 is a view illustrating an example of a screen displayed on the above-mentioned terminal 5 or the general-purpose computer 6 at an access to the RFID tag information (reading or writing) of the IC circuit part 151 of the RFID circuit element To by the apparatus 1002 for producing RFID labels (or apparatuses 2002, 3002 for producing RFID labels, which will be described later) as mentioned above.

In FIG. 11, in this example, the type of the RFID label (access frequency and tape dimension), the print characters R printed corresponding to the RFID circuit element To, an access (writing or reading) ID, which is identification specific to the RFID circuit element To, an address of article information stored in the information server 7, storage destination address of the corresponding information in the route server 4 and the like can be displayed on the terminal 5 or the general-purpose computer 6. When the apparatus 2 for producing RFID label is operated by operation of the terminal 5 or the general-purpose computer 6, and the print characters R are printed on the base film 101c, the information such as the writing ID, article information and the like is written in the IC circuit part 151 (or the RFID tag information such as the article information and the like stored in advance in the IC circuit part 151 is read out).

At this writing or reading, correspondence between the ID of the produced RFID label T and information read out from the IC circuit part 151 of the RFID label T (or information written in the IC circuit part 151) is stored in the above-mentioned route server 4 to be referred to as needed.

FIG. 12 is a flowchart illustrating a control procedure for producing the RFID label T as mentioned above, that is, the control procedure executed by the control circuit 30 while the print-receiving tape 103 is fed and the predetermined print is made by the print head 10, the base tape 101 is fed, when the RFID tag control information is written, and the print-receiving tape 103 and the base tape 101 are bonded together to have the tag label tape 110 with print and then, the tag label tape 110 with print is cut for each RFID circuit element To have the RFID label T.

In FIG. 12, first, at Step S105, when a writing operation by the apparatus 1002 for producing RFID labels (or apparatuses 2002, 3002 for producing RFID labels, which will be described later) is performed, this flow is started. The RFID tag control information to be written in the RFID circuit element To and print information corresponding to the RFID tag control system to be printed on the RFID label T by the print head 10 input and operated through the terminal 5 or the general-purpose computer 6 is read in through the communication line 3 and the input/output interface 31.

Then, at Step S110, variables M N for counting the number of retry times (number of access retry times) when communication failure is suspected and a flag F indicating if the communication is favorable or defective are initialized to zero.

Then, at Step S115, a control signal is output to the cartridge shaft driving circuit 24, and the ribbon take-up roller 106 and the tape feeding roller 107 are rotated and driven by a driving force of the motor 23 to drive cartridge shaft. By this operation, the base tape 101 is fed out of the first roll 102 and supplied to the tape feeding roller 107, while the print-receiving tape 103 is fed out of the second roll 104. Moreover, a control signal is output to the tape-feeding-roller motor 28 through the tape-feeding-roller driving circuit 29 so as to rotate and drive the feeding roller 17. As a result, as mentioned above, the base tape 101 and the print-receiving tape 103 are bonded and integrated by the tape feeding roller 107 (and the sub roller 109) and fed out of the cartridge body 1100 as the tag label tape 110 with print.

After that, the routine goes to Step S120, it is determined whether or not the base tape 101 and the print-receiving tape 103 have been fed for a predetermined value C (a feeding distance, for example, that the RFID tag control information writing and printing on the preceding RFID circuit element To and the corresponding print-receiving tape 103 print region have been finished, and the subsequent RFID circuit element To has reached a position substantially facing the loop antenna 1305 (the loop antennas 23305, 3305 in the embodiment, which will be described later). The feeding distance determination at this time has only to be conducted by detecting an appropriate identification mark provided on the base tape 101 by a known separately provided tape sensor, for example. If the determination is satisfied, the routine goes to Step S200.

At Step S200, tag information writing/print processing is performed, and after memory is initialized (deleted) for writing, a transmission signal including the RFID tag control information is transmitted to the RFID circuit element To on the base tape 101 for writing, and printing of the print R is made on the corresponding region on the print-receiving tape 103 by the print head 10 (for detail, see FIG. 13, which will be described later). When Step S200 is finished, the routine goes to Step S125.

At Step S125, it is determined whether or not the flag F=0. If the writing processing is completed normally, it is still F=0 (See Step S385 in the flow shown in FIG. 13, which will be described later), and the determination is satisfied and the routine goes on to Step S130.

At Step S130, combination of the information written in the RFID circuit element To at Step S200 and the print information already printed by the print head 10 corresponding thereto is output via the input/output interface 31 and the communication line 3 through the terminal 5 or the general-purpose computer 6 and stored in the information server 7 and the route server 4. The stored data is stored and held in a database, for example, so that it can be referred to by the terminal 5 or the general-purpose computer 6 as needed.

After that, at Step S135, it is checked whether or not all the prints on the region corresponding to the RFID circuit element To be processed at this point of time in the print-receiving tape 103 have been completed, and the routine goes to Step S140.

If the writing processing has not been normally completed for some reason at above-mentioned Step S125, it becomes F=1 (See Step S385 in the flow shown in FIG. 13, which will be described later), and the determination at Step S125 is not satisfied and the routine goes on to Step S137, where a control signal is output to the print-head driving circuit 25 so as to stop electricity to the print head 10 and stop printing. It is apparently displayed that the RFID circuit element To is not a non-defective product by interruption of printing in this way. It may be a print in a special mode such as an alarm/attention drawing to that effect and the like instead of the interruption of printing.

After Step S137 is finished, the routine goes to Step S140.

At Step S140, it is determined whether or not the tag label tape 110 with print has been further fed for a predetermined amount (for example, a feeding distance that all the RFID circuit element To be a target and the print region of the corresponding print-receiving tape 103 exceed the cutter 15 by a predetermined length (margin amount). The feeding distance determination at this time has only to be also conducted by detecting marking, for example, by a tape sensor similarly to Step S120. If the determination is satisfied, the routine goes to Step S145.

At Step S145, a control signal is output to the cartridge shaft driving circuit 24 and the tape-feeding-roller driving circuit 29 so as to stop driving of the motor 23 to drive cartridge shaft and the tape-feeding-roller motor 28, and rotation of the ribbon take-up roller 106, tape feeding roller 107, and the feeding roller 17 is stopped. As a result, the feeding-out of the base tape 101 from the first roll 102, the feeding-out of the print-receiving tape 103 from the second roll 104, and the feeding of the tag label tape 110 with print by the feeding roller 17 are stopped.

After that, at the Step S150, a control signal is output to the solenoid driving circuit 27 so as to drive the solenoid 26 and the tag label tape 110 with print is cut off by the cutter 15. As mentioned above, all the tag label tape 110 with print in which the RFID circuit element To be processed and the print region of the corresponding print-receiving tape 103 are bonded together has sufficiently exceeded the cutter 15, and by the cutting with this cutter 15, the RFID tag control information is written in the RFID circuit element To and the label-state RFID label T on which a predetermined print corresponding thereto is made is produced.

After that, the routine goes to Step S155, where a control signal is output to the tape-feeding-roller driving circuit 29 so as to resume the driving of the tape-feeding-roller motor 28 and rotate the feeding roller 17. As a result, the feeding by the feeding roller 17 is resumed and the RFID label T produced in the label state at Step S150 is fed toward the carry-out exit 16 and discharged outside the apparatus 1002 (or 2002, 3002) for producing RFID labels through the carry-out exit 16.

FIG. 13 is a flowchart illustrating a detailed procedure of the above-mentioned Step S200.

In FIG. 13, first at Step S300, a control signal is output to the print-head driving circuit 25 so as to electrify the print head 10, and the print R such as characters, symbols, barcodes and the like read in at Step S105 in FIG. 12 is printed on a region (region to be bonded by the tape-feeding roller 107 on the back face of the RFID circuit element To) corresponding to the RFID circuit element To be processed in the print-receiving tape 103.

At Step S310, an identification number ID to be assigned to the RFID circuit element To be written is set by a known appropriate method.

After that, at Step S320, a control signal is output to the transmission circuit 306, and a carrier wave, subjected to predetermined modulation as an "Erase" signal that initializes information stored in the memory portion 157 of the RFID circuit element To, is sent to the RFID circuit element To be written through the first and second apparatus loop antennas 1305A, 1305B (2305, 3305 in the embodiment which will be described later. The same applies to the following). As a result, the memory portion 157 of the RFID circuit element To is initialized.

Next, at Step S330, a control signal is output to the transmission circuit 306, and a carrier wave subjected to predetermined modulation as a "Verify" signal that verifies contents of the memory portion 157, is sent to the RFID circuit element To be written through the first and second apparatus loop antennas 1305A, 1305B, and a reply is prompted.

After that, at Step S340, a reply signal transmitted from the RFID circuit element To be written in correspondence with the "Verify" signal is received through the first and second apparatus loop antennas 1305A, 1305B and taken in through the receiving circuit 307.

Next, at Step S350, on the basis of the received reply signal, information in the memory portion 157 of the RFID circuit element To is verified so as to determine if the memory portion 157 is normally initialized.

If the determination is not satisfied, the routine goes on to Step S360, where one is added to M, and it is determined whether or not M=5 at Step S370. In the case of M≦4, the determination is not satisfied but the routine returns to Step S320 and the same procedure is repeated. In the case of M=5, the routine goes on to Step S380, where an error display signal is output to the terminal 5 or general-purpose computer 6 through the input/output interface 31 and the communication line 3 so that corresponding writing failure (error) display is made and this flow is finished. In this way, even if initialization is not successful, retry is made up to five times. Even if the base tape 101 wound around the first roll 102 is all consumed, the reply signal is not received at S340 due to absence of the RFID circuit element To, and the determination at Step S350 is not satisfied and the above display is made at Step S380.

If the determination at Step S350 is satisfied, the routine goes on to step S390, where a control signal is output to the transmission circuit 306, and a carrier wave subjected to predetermined modulation as a "Program" signal to write desired data in the memory part 157 is transmitted to the RFID circuit element To for information to be written through the first and second apparatus loop antennas 1305A, 1305B, and the information is written.

After that, at Step S400, a control signal is output to the transmission circuit 306, and a carrier wave subjected to predetermined modulation as a "Verify" signal is transmitted to the RFID circuit element To be written through the first and second apparatus loop antennas 1305A, 1305B, and a reply is prompted. After that, at Step S410, the reply signal transmitted from the RFID circuit element To be written in correspondence with the "Verify" signal is received through the first and second apparatus loop antennas 1305A, 1305B and taken in through the receiving circuit 307.

Next, at Step S420, on the basis of the received reply signal, the information stored in the memory part 157 of the RFID circuit element To is checked, and it is determined whether or not the predetermined information transmitted as above has been normally stored in the memory part 157.

If the determination is not satisfied, the routine goes to Step S430, where one is added to N, and it is further determined at Step S440 if it is N=5 or not. In the case of N≦4, the determination is not satisfied and the routine returns to Step S390, where the same procedure is repeated. In the case of N=5, the routine goes on to Step S380, where a corresponding writing failure (error) display is made similarly on the terminal 5 or the general-purpose computer 6, the above-mentioned flag F=1 is set at step S385, and this routine is finished. In this way, even if information writing is not successful, retry is made up to five times.

If the determination at Step S420 is satisfied, the routine goes on to step S450, where a control signal is output to the transmission circuit 306, and a carrier wave subjected to predetermined modulation as a "Lock" command is transmitted to the RFID circuit element To for information to be written through the first and second apparatus loop antennas 1305A, 1305B so as to prohibit new information writing in the RFID circuit element To. As a result, writing of the RFID tag control information in the RFID circuit element To be written is completed, the RFID circuit element To is discharged as above, and this flow is finished.

In the above routine, in the cartridge 1100, the corresponding RFID tag control information is written in the RFID circuit element To be written on the base tape 101 and the print R corresponding to the RFID tag control information can be printed on the corresponding region on the print-receiving tape 103.

A case where the RFID tag information is transmitted to the RFID circuit element To, writing is made in the IC circuit part 151, and the RFID label T is produced has been described above, but not limited to that, there is a case where while the RFID tag information is read from the RFID circuit element To exclusively for reading-out in which predetermined RFID tag information is unrewritably stored and held in advance, the RFID label T is produced by making the corresponding print.

In this case, it is only necessary that only the print information is read in at Step S105 in FIG. 12 and reading/print processing of the RFID tag information is performed at Step S200. At Step S130 after that, combination of the print information and the read-in RFID tag information is stored.

Though not particularly described above, in the apparatus 1002 for producing RFID labels in this embodiment, even if the cartridge is replaced by the one storing the base tape with a different width, a distance between the lower end of the base tape and the coil face of the first and second apparatus coils is made substantially constant. This point will be described using FIGS. 14A to 14C.

FIGS. 14A to 14C are partial sectional views of the cartridge and the cartridge holder portion for explaining that the distance between the lower end of the base tape and the coil face of the first and second apparatus coils is constant when the cartridge is replaced.

FIG. 14A shows a case where the cartridge 1100 described above is attached to the cartridge holder portion 1019. In FIG. 14A, a tape width of the base tape 101 is L1, and a distance between a center line C of the base tape 101 and a bottom wall 1100A2 of a cartridge housing 1100A is set at Lo. As a result, the distance between the center line C of the base tape 101 and a coil face Y of the first and second apparatus coils 1305a, 1305b is set to be L when the cartridge 1100 is attached to the cartridge holder portion 1019.

On the other hand, FIG. 14B shows a case where the cartridge 1100 is replaced by another one and it is attached to the cartridge holder portion 1019. In FIG. 14B, the tape width of the base tape 101 is L2, which is smaller than L1. At this time, the distance between the center line C of the base tape 101 and the bottom wall 1100A2 of the cartridge housing 1100A is similarly set to Lo. As a result, the distance between the center line C of the base tape 101 and the coil face Y of the first and second apparatus coils 1305a, 1305b when the cartridge 1100 is attached to the cartridge holder portion 1019 becomes L as above.

At this time, as shown in FIG. 14C, when the cartridge 1100 is attached to the cartridge holder portion 1019, a apparatus projection portion 1191 provided in correspondence with a position, which will be described later, of the cartridge holder portion 1019 is brought into contact with a cartridge projection portion 1501 for positioning provided at a position corresponding to the center position (center line C) of the base tape 101 in the cartridge 1100 such that the distance L between the center line C of the base tape and the plane Y becomes constant.

The position of the apparatus projection portion 1191 is provided in correspondence with distribution of the magnetic flux generated from the first and second apparatus loop antennas 1305A, 1305B. Preferably, they are provided in correspondence with the position where the magnetic flux density at a feeding position is increased, but it is only necessary that the projection portion is at the position where it operates sufficiently by sensitivity of the RFID circuit element To. It is needless to say that the apparatus projection portion 191 and the cartridge projection portion 1501 are provided at different height positions with offset from each other by a predetermined amount.

As a result, even if the cartridge is replaced by a cartridge containing the base tape with a different tape width, since the distance Lo between the center position (center line C) of the base tape 101 and the cartridge housing bottom wall is constant, the distance L between the center position (center line C) of the base tape and the coil face X of the first and second apparatus coils 1305a, 1305b becomes substantially constant.

In the apparatus 1002 for producing RFID labels of this embodiment configured as above, the print-receiving tape 103 fed out of the second roll 104 and on which the predetermined print is made by the print head 10 and the base tape 101 fed out of the first roll 102 are bonded together by the tape-feeding roller 107 to become the tag label tape 110 with print, and the RFID label T is produced using this tag label tape 110 with print.

At this time, in this embodiment, in the cartridge holder 1109, the first and second apparatus loop antennas 1305A, 1305B are arranged on one side and the other side of the feeding path along the face direction substantially perpendicular to the feeding path of the base tape 101, respectively, as mentioned above. Then, when the first and second apparatus loop antennas 1305A, 1305B are excited and driven in the phases opposite to each other, the magnetic path M in substantially the semicircular shape intersecting with the feeding path of the base tape 101 is formed between their first and second apparatus coils 1305a, 1305b, and information is transmitted/received with the RFID circuit element To of the base tape 101 by magnetic induction.

As mentioned above, by realizing the structure that information is transmitted/received between the first and second apparatus loop antennas 1305A, 1305B and the RFID circuit element To at the position fed out of the first roll 102 in the feeding path of the base tape 101 in the cartridge 1100, the size of the apparatus 2 for producing RFID labels can be reduced.

Particularly in this embodiment, the first and second apparatus loop antennas 1305A, 1305B are provided on the bottom wall 1019b of the cartridge holder portion 1019 such that the coil face X of their first and second apparatus coils 1305a, 1305b is located substantially on the same plane. As a result, the magnetic path M in substantially the semicircular shape intersecting with (here, substantially perpendicular to each other) the face direction of the feeding path of the base tape 101 can be formed between the first apparatus loop antenna 1305A and the second apparatus loop antenna 1305B, and even if the first and second apparatus loop antennas 1305A, 1305B and the RFID circuit element To provided at the base tape 101 are not in parallel, information can be transmitted/received efficiently.

Particularly in this embodiment, the distance from the tape-feeding roller 107 to a tag access position by the first and second apparatus loop antennas 1305A, 1305B is set larger than the distance from the tape-feeding roller 107 to the print head 10. With this arrangement, information transmission/reception timing by the first and second apparatus loop antennas 1305A, 1305B can be made earlier than print timing. As a result, the print reflecting a good or bad result of the information transmission/reception or the like can be made such as indication of failure of the tag access due to interruption of print as in this embodiment, for example.

The above first embodiment is not limited to the above mode but is capable of various modifications in a range not departing from its gist and technical idea. The variations will be described below in order.

(1-1) Variation of the Cartridge Housing Shape (i) When a Recess Portion is Provided on the Bottom Wall of the Cartridge Housing:

FIGS. 15A and 15B are a partial sectional view and its top view of the cartridge and the cartridge holder portion in the vicinity of the reception loop antenna installation positions in this variation and substantially correspond to FIG. 4 in the first embodiment. In FIGS. 15A and 15B, the same reference numerals are given to those similar to FIG. 4 and the description will be omitted.

In this variation, the first and second reception loop antennas 1305A, 1305B are provided on a projection portion 1019'b1 (reception-side projection portion) projecting from a bottom wall 1019'b of a cartridge holder portion 1019'. On the other hand, at a position corresponding to the projection portion 1019'b1 in a bottom wall 1100'A2 of a housing 1100'A of a cartridge 1100' (cartridge for including at least a RFID tag, not shown), a recess portion 1100'A2-1 is provided. The recess portion 1100'A2-1 is provided substantially immediately below the feeding path of the base tape 101 in the cartridge 1100'. With this arrangement, when the cartridge 1100' is attached to the cartridge holder portion 1019', the projection portion 1019'b1 of the cartridge holder portion 1019' is fitted in the recess portion 1100'A2-1 of the cartridge housing, and the first and second apparatus loop antennas 1305A, 1305B provided at the projection portion 1019'b1 are arranged in the vicinity of the feeding path of the base tape 101 in the cartridge housing 1100'A. As a result, the magnetic flux generated between the coils 1305a, 1305b of the first and second apparatus loop antennas 1305A, 1305B intersects with the face direction of the base tape 101 so that information can be transmitted/received with the RFID circuit element To.

In the variation with the above configuration, too, in the feeding path of the base tape 101 in the cartridge housing 1100'A, information can be transmitted/received between the first and second apparatus loop antennas 1305A, 1305B and the RFID circuit element To, and the same effect as the first embodiment that the size of the apparatus 1002 for producing RFID labels can be reduced is obtained. Even if it is difficult to arrange the feeding path immediately close to the housing bottom wall 1100'A2 of the cartridge 1100' due to structural circumstances inside the cartridge, for example, by providing the first and second apparatus loop antennas 1305A, 1305B at the projection portion 1019'b1 of the cartridge holder portion 1019' for projection as in this variation, it becomes possible to bring the antennas 1305A, 1305B close to the side of the cartridge 1100 to reduce the distance to the feeding path so that efficiency in information transmission/receiving can be improved.

(ii) When a Projection Portion is Further Provided in the Recess Portion Provided in the Bottom Wall of the Cartridge Housing:

FIGS. 16A and 16B are a partial sectional view and its top view of the cartridge and the cartridge holder portion in the vicinity of the apparatus loop antenna installation positions in this variation and substantially correspond to FIG. 4 in the first embodiment. In FIGS. 16A and 16B, the same reference numerals are given to those similar to FIG. 4 and the description will be omitted.

In this variation, at a bottom wall 1019"b of a cartridge holder portion 1019", two projection portions 1019"b1, 1019"b2 and a recess portion 1019"b3 located between the projection portions 1019"b1, 1019"b2 are provided, and the first and second apparatus loop antennas 1305A, 1305B are provided at the projection portions 1019"b1, 1019"b2, respectively. On the other hand, at positions corresponding to the projection portions 1019"b1, 1019"b2 of a bottom wall 1100"A2 of a housing 1100"A of a cartridge 1100" (cartridge for including at least a RFID tag, not shown), two recess portions 1100"A2-1 are provided. Between the two recess portions 1100"A2-1, a projection portion 1100"A2-1a (cartridge projection portion) projecting toward the apparatus is provided in correspondence with the recess portion 1019"b3. Inside the projection portion 1100"A2-1a, at least a part of the base tape 101 is passed to become a part of the feeding path.

With this arrangement, when the cartridge 1100" is attached to the cartridge holder portion 1019", each of the two projection portions 1019"b1, 1019"b2 of the cartridge holder portion 1019" is fitted in the two cartridge housing recess portions 1100"A2-1, and the cartridge housing projection portion 1100"A2-1a is fitted to the recess portion 1019"b3 of the cartridge holder portion 1019", and the first and second apparatus loop antennas 1305A, 1305B provided at the projection portions 1019"b1, 1019"b2, respectively, are arranged immediately close to the feeding path of the base tape 101 in the cartridge housing 1100"A. At this time, the end face on the side of the cartridge holder (lower side in FIG. 16A) of the feeding path of the base tape 101 and the face connecting the end portions on the side of the cartridge (upper side in FIG. 16A) of the coils 1305a, 1305b of the first and second apparatus loop antennas 1305A, 1305B are substantially on the same plane (or in a positional relation close to that) (See a one-dot chain line in FIG. 16A). With this configuration, the magnetic path M generated between the coils 1305a, 1305b of the first and second apparatus loop antennas 1305A, 1305B intersects with the face direction of the base tape 101 so that information transmission/receiving is enabled with the RFID circuit element To.

In the variation with the above configuration, too, in the feeding path of the base tape 101 in the cartridge housing 1100"A, information can be transmitted/received between the first and second apparatus loop antennas 1305A, 1305B and the RFID circuit element To, and the same effect as the first embodiment that the size of the apparatus 1002 for producing RFID labels can be reduced is obtained. Even if it is difficult to arrange the feeding path of the base tape 101 immediately close to the housing bottom wall 1100"A2 of the cartridge 1100" due to structural circumstances inside the cartridge, for example, by having the structure in which only the apparatus loop antennas are projected as in this variation, it becomes possible to bring the first and second apparatus loop antennas 1305A, 1305B close to the side of the cartridge to reduce the distance to the feeding path so that efficiency in information transmission/reception can be improved.

(1-2) When a Magnetic Member is Provided:

(i) When a Magnetic Member is Provided at the Cartridge Holder Portion:

In the above embodiment, a magnetic member composed of a magnetic material is not provided in the configuration, but not limited to that, a magnetic member may be provided in the cartridge holder portion 1019, which is outside the cartridge, for example, in the configuration.

FIG. 17 is a partial sectional view of the cartridge and the cartridge holder portion in the vicinity of the apparatus loop antenna installation positions in this variation and substantially corresponds to FIG. 4 in the first embodiment. In FIG. 17, the same reference numerals are given to those similar to FIG. 4 and the description will be omitted.

In FIG. 17, on the bottom wall 1019b of the cartridge holder portion 1019, the first and second apparatus loop antennas 1305A, 1305B are provided, and inside the apparatus of the first and second apparatus loop antennas 1305A, 1305B (lower side in FIG. 17), an apparatus magnetic member 1020 (first apparatus magnetic member) composed of a magnetic material such as ferrite, for example, is provided. The apparatus magnetic member 1020 is substantially in the U-shape and an end portion 1020a on one side (left side in FIG. 17) faces the first apparatus loop antenna 1305A, while an end portion 1020b on the other side thereof (right side in FIG. 17) faces the second apparatus loop antenna 1305B. With this configuration, the magnetic path M substantially in the semicircular shape is formed between the coils 1305a, 1305b of the first and second apparatus loop antennas 1305A, 1305B so that information is transmitted/received with the RFID circuit element To provided at the base tape 101 by magnetic induction.

In the variation with the above configuration, too information can be transmitted/received between the first and second apparatus loop antennas 1305A, 1305B and the RFID circuit element To in the feeding path of the base tape 101 in the cartridge housing 1100A, and the same effect as the first embodiment that the size of the apparatus 2 for producing RFID labels can be reduced is obtained. By providing the apparatus magnetic member 1020, the magnetic flux density generated by the coils 1305a, 1305b of the apparatus loop antennas 1305A, 1305B is improved and the information can be transmitted/received in a narrower range.

(ii) When a Magnetic Member is Provided in the Cartridge:

In the first embodiment, the magnetic member is not particularly provided in the configuration, but not limited to that, the magnetic member may be provided inside the cartridge housing, for example, in the configuration.

FIG. 18 is a partial sectional view of the cartridge and the cartridge holder portion in the vicinity of the apparatus loop antenna installation positions in this variation and substantially corresponds to FIG. 4 in the first embodiment. In FIG. 18, the same reference numerals are given to those similar to FIG. 4 and the description will be omitted.

As shown in FIG. 18, in this variation, cartridge magnetic members 1021, 1021 (first cartridge magnetic member, cartridge magnetic-path forming portion) are provided on both sides of the base tape 101 such that they are substantially in parallel with the face direction of the feeding path of the base tape 101 in a housing 1100"'A. The cartridge magnetic members 1021, 1021 are provided so that they are located in the magnetic path M generated by the first and second apparatus loop antennas 1305A, 1305B provided on the bottom wall 1019b of the cartridge holder portion 1019, respectively, when being attached to the cartridge holder portion 1019 of the cartridge 1100'" (cartridge for including at least a RFID tag, not shown).

In the variation with the above configuration, too, since information can be transmitted/received between the first and second apparatus loop antennas 1305A, 1305B and the RFID circuit element To through the cartridge magnetic members 1021, 1021 in the feeding path of the base tape 101 in the cartridge housing 1100"'A, the magnetic flux density in the vicinity of the cartridge magnetic members 1021, 22 can be increased while the magnetic flux density in the other spots can be lowered. Thus, the same effect as the first embodiment is obtained that the size of the apparatus 1002 for producing RFID labels can be reduced. By providing the magnetic member on the side of the cartridge, the magnetic path M can be formed optimally for the loop antenna 152 and reliability of information transmission/reception can be improved by optimizing the size, shape, position and the like of the cartridge magnetic member 1021 according to the size, type, position and the like of the loop antenna 152 of the RFID circuit element To provided at the base tape 101.

The cartridge magnetic members 1021 are provided on both sides of the base tape 101 in the above, but not limited to that, the member may be provided only on one side of the base tape 101, for example. In this case, the member is preferably provided on the side of the separation sheet 101d (left side in FIG. 18) of the base tape 101, for example. With this arrangement, when the base tape 101 passes through the feeding path in the vicinity of the cartridge magnetic member 1021, wrong adhesion of the adhesive layer 101a of the base tape 101 to the cartridge magnetic member 1021 can be prevented.

(1-3) When the Apparatus Loop Antenna is Inclined:

In the first embodiment, the first and second apparatus loop antennas 1305A, 1305B are installed such that the coil faces of their first and second apparatus coils 1305a, 1305b are substantially in parallel with each other (substantially coinciding with each other), but not limited to that, but the first and second apparatus loop antennas 1305A, 1305B may be provided with their coil axis lines inclined with respect to the feeding path face direction of the base tape 101 in configuration, for example.

FIG. 19 is a partial sectional view of the cartridge and the cartridge holder portion in the vicinity of the apparatus loop antenna installation position in this variation.

In FIG. 19, on the bottom wall 1019b of the cartridge holder portion 1019, first and the second apparatus loop antennas 1305'A, 1305'B (apparatus magnetic-path forming portion) are provided obliquely such that axis lines $Y_A, Y_B$ of their first and second apparatus coils 1305'a, 1305'b have an outward angle θ with respect to the face direction in the feeding path of the base tape 101. The angle θ is set in a range of 15 to 45 degrees, for example. Further, the magnetic path M generated between the coils 1305'a, 1305'b of the first and second apparatus loop antennas 1305'A, 1305'B provided obliquely intersects with the face direction of the base tape 101 and information can be transmitted/received with the RFID circuit element To.

In the variation with the above configuration, too, information can be transmitted/received between the first and second apparatus loop antennas 1305'A, 1305'B and the RFID circuit element To in the feeding path of the base tape 101 in the cartridge housing 1100A, and the same effect as the first embodiment that the size of the apparatus 1002 for producing RFID labels can be reduced is obtained. By providing the first and second apparatus loop antennas 1305'A, 1305'B obliquely, if the inclination angle θ is optimized according to the characteristics such as size of the loop antenna 152 of the RFID circuit element To provided at the base tape 101, the magnetic path M can be formed efficiently and reliability in information transmission/reception can be improved. Moreover, by providing the first and second apparatus loop antennas 1305'A, 1305'B obliquely, freedom in layout inside the apparatus of the cartridge holder portion 1019 can be improved.

(1-4) Variation of the Coil Shape

In the first embodiment, the coils 1305a, 1305b of the first and second apparatus loop antennas 1305A, 1305B are configured such that the sectional face profile shape is substantially circular, but the coil sectional shape is not limited to a circle but other shapes will do.

FIGS. 20A and 20B are diagrams illustrating examples of other coil shapes. As shown in FIG. 20A, the first and second apparatus loop antennas 1305"A, 1305"B having the first and second apparatus coil 1305"a, 1305"b configured such that the profile shape of the sectional faces forms a substantially polygonal shape (substantially triangular shape, here) may be used or as shown in FIG. 20B, the first and second apparatus loop antennas 1305"A, 1305"B having the first and second apparatus coils 1305"a, 1305"b configured such that the profile shape of the sectional faces forms an oval shape may be used as the apparatus magnetic-path forming portion.

At this time, the first and second apparatus coils 1305"a, 1305"b are configured such that a dimension L3 in the base tape transport direction is smaller than a dimension L4 in a direction perpendicular to the transport direction.

According to the variation of the above configuration, by setting the dimension L3 in the base tape transport direction of the coil smaller than the dimension L4 in the direction perpendicular to the transport direction, a dimension in the transport direction of a sectional face shape of the magnetic path M formed by the coils can be made relatively smaller. With this arrangement, the magnetic flux density can be increased at the tag coil position (position of the loop antenna 152 of the RFID circuit element To), and thereby time of the magnetic flux passing through the RFID circuit element To of the base tape 101 fed at a predetermined speed can be increased.

A second embodiment of the present invention will be described referring to FIGS. 21 to 30. In this embodiment, the apparatus loop antenna faces a side wall of the cartridge or a recess-portion side wall provided substantially in parallel with the side wall. The same reference numerals are given to those similar to the first embodiment and the description will be omitted or simplified as appropriate.

FIG. 21 is a conceptual block diagram illustrating a detailed structure of the apparatus 2002 for producing RFID labels of this embodiment and corresponds to FIG. 2 in the first embodiment.

In FIG. 21, in the apparatus main body 8 of the apparatus 2002 for producing RFID labels, a cartridge holder portion 2019 (cartridge holder, container holder) as a recess portion is provided, and to this holder portion 2019, a cartridge 2100 (cartridge for including at least a RFID tag, container for including at least a RFID tag) is detachably attached.

At the apparatus main body 8, a loop antenna (third apparatus loop antenna, apparatus magnetic-path forming portion) 2305 configured to transmit/receive a signal with the RFID circuit element To provided at the tag label tape 110 with print by magnetic induction (electromagnetic induction, magnetic coupling, and other contactless methods carried out through a magnetic field) and the transmission circuit 306 and the receiving circuit 307 (See also FIGS. 6 and 7 above) configured to make an access (for reading or writing) to the RFID circuit element To by the magnetic induction through the loop antenna 2305.

The loop antenna 2305 is an antenna constructed in a loop coil shape and is provided at a projection portion 2019a of the cartridge holder portion 2019. On the other hand, at a position corresponding to the loop antenna 2305 in a side wall 2100A1 in a housing 2100A of the cartridge 2100, a recess portion 2100A1-1 is provided. With this arrangement, when the cartridge 2100 is attached to the cartridge holder portion 2019, the projection portion 2019a of the cartridge holder portion 2019 is fitted in the cartridge housing recess portion 2100A1-1, and the loop antenna 2305 provided at the projection portion 2019a faces a side wall 2100A1-1a (recess-portion side wall, cartridge magnetic-path forming portion) of the cartridge housing recess portion 2100A1-1. "Facing" here means that the loop antenna 2305 and the side wall 2100A1-

1a do not have to face each other in a fully parallel state but they may face in a slightly inclined state (the same applies to the following). As a result, the loop antenna 2305 is arranged in the vicinity of the feeding path (from a feeding-out position from the roll to the tape feeding roller driving shaft 12) of the base tape 101 so that the magnetic path of the magnetic flux generated at a coil of the loop antenna 2305 intersects with (substantially at a right angle in this example) the face direction of the base tape 101.

FIG. 22 is an explanatory diagram for illustrating a detailed structure of the cartridge 2100.

In FIG. 22, the cartridge 2100 has the first roll 102, the second roll 104, the ribbon-supply-side roll 111, the ribbon take-up roller 106, the tape feeding roller 107, the guide roller 112 (feeding position regulating device) configured in a non-adhesive manner using a fluorine resin and the like in the housing 2100A.

The tape feeding roller 107 presses and bonds the base tape 101 and the print-receiving tape 103 together to have the tag label tape with print and feeds the tape in a direction shown by an arrow A (=also functioning as a tape feeding roller) as mentioned above. At this time, the above-mentioned side wall 2100A1-1a of the cartridge housing recess portion 2100A1-1 is located on the upstream side in the transport direction of the base tape 101 rather than the tape feeding roller 107, and at the upstream positions, an access (reading or writing) to the RFID circuit element To provided at the base tape 101 is carried out by magnetic induction through the loop antenna 2305. The print head 10 is arranged on the upstream side in the transport direction of the print-receiving tape 103 rather than the tape feeding roller 107. A distance from the tape feeding roller 107 to a tag access position by the loop antenna 2305 is set such that it is longer than a distance from the tape feeding roller 107 to the print head 10.

The operation and behavior in the cartridge 2100 with the above configuration is substantially the same as that in the cartridge 100 and the like in the first embodiment, in which the base tape 101 is fed out of the first roll 102 and supplied to the tape feeding roller 107, while the print-receiving tape 103 is fed out of the second roll 104, and the print R (See FIG. 9, which will be described later) corresponding to the RFID circuit element To on the base tape 101 to be bonded is printed on the back face of the print-receiving tape 103. Then, the base tape 101 and the print-receiving tape 103 having finished with the printing are bonded and integrated by the tape feeding roller 107 and the sub roller 109 and formed as the tag label tape with print and fed out of the cartridge 2100.

FIG. 23 is a diagram illustrating the size and positional relation of the loop antenna 152 of the RFID circuit element To provided at the base tape 101 fed out of the first roll 102 and the loop antenna 2305 provided so as to face the side wall 2100A1-1a of the cartridge housing recess portion 2100A1-1.

As mentioned above, the RFID circuit element To includes the loop antenna 152 constructed in the loop coil shape and configured to transmit/receive information and the IC circuit part 151 connected thereto and configured to store the information. Then, the loop antenna 152 (hereinafter described as "tag antenna 152" as appropriate) of the RFID circuit element To and the apparatus loop antenna 2305 (hereinafter described as "apparatus antenna 2305" as appropriate) are, as shown in FIG. 23, configured such that a dimension H of a loop coil CT (tag coil) constituting the tag antenna 152 in the width direction of the base tape 101 feeding path and a dimension h of the loop coil 2305a (apparatus coil) constituting the apparatus antenna 2305 in the width direction of the tape feeding path are substantially equal to each other.

On the other hand, a dimension y of the tag antenna 152 in the transport direction of the base tape 101 feeding path is, as shown in FIGS. 24A and 24B, set such that it is larger than a value obtained by multiplying a feeding velocity v of the base tape 101 by time te required for information transmission/reception with the RFID circuit element To by the control circuit 30 and the transmission and receiving circuits 306, 307 of the apparatus main body 8 via the apparatus antenna 2305 and adding a dimension x of the apparatus antenna 2305 in the transport direction of the feeding path (that is, v×te+x).

The tag antenna 152 and the apparatus antenna 2305 in such a size relation are arranged, as shown in FIG. 23, such that their center axes (center axes W1 and W2 in this case) substantially coincide with each other in the width direction in the feeding path. In order that both the center axes of the antennas 152, 2305 substantially coincide with each other, in this embodiment, though not described in illustration, a cartridge projection portion for positioning is provided at an appropriate position of the cartridge housing 2100A, and an apparatus projection portion is installed at a corresponding position of the cartridge holder portion 2019 on the apparatus main body 8. When the cartridge 2100 is attached to the cartridge holder portion 2019, the apparatus projection portion is brought into contact with the cartridge projection portion, and thereby the cartridge height becomes a predetermined value and the centers of the tag coil and the device coil in the width direction coincide with each other. On the housing of a cartridge containing a base tape with a different width (or the base tape provided with the RFID circuit element To with the different width of the tag antenna), the cartridge projection portion formed with a corresponding thickness is provided, and when being replaced by the cartridge, the cartridge height thus attached to the cartridge holder portion 2019 is adjusted as appropriate so that the center axes of the both antennas 152, 2305 substantially coincide with each other.

The appearance of the RFID label T formed by completing information writing (or reading) of the RFID circuit element To and cutting of the tag label tape 110 with print by the apparatus 2002 for producing RFID labels with the above configuration is similar to that described in the above first embodiment using FIGS. 9A, 9B, 10 and the like and the description will be omitted.

At the access (reading or writing) to the RFID tag information of the IC circuit part 151 on the RFID circuit element To by the apparatus 2002 for producing RFID labels, the screen similar to FIG. 11 above is also displayed on the terminal 5 or the general-purpose computer 6. When the RFID label T is produced, that is, the print-receiving tape 103 is fed, the predetermined print is made with the print head 10, while the base tape 101 is fed and the RFID tag control information is written in and the print-receiving tape 103 and the base tape 101 are bonded together to have the tag label tape 110 with print and then, the tag label tape 110 with print is cut for each RFID circuit element To have the RFID label T, similar to the above, the control procedure equivalent to FIGS. 12 and 13 is executed by the control circuit 30 of the apparatus 2002 for producing RFID label.

In the apparatus 2002 for producing RFID labels of the second embodiment configured as above, the print-receiving tape 103 fed out of the second roll 104 and given the predetermined print with the print head 10 and the base tape 101 fed out of the first roll 102 are bonded together by the tape feeding roller 107 to become the tag label tape 110 with print, and the RFID label T is produced using the tag label tape 110 with print.

At this time, in the second embodiment, the recess portion 2100A1-1 is provided in the cartridge housing 2100A as mentioned above, and the loop antenna 2305 is arranged so as to face the side wall 2100A1-1a of the cartridge housing recess portion 2100A1-1 so that the loop antenna 2305 is arranged in the vicinity of the feeding path (from the feeding-out position from the roll to the tape feeding roller driving shaft 12) of the base tape 101, and using the magnetic path generated by the coil of the loop antenna 2305, information is transmitted/received with the RFID circuit element To provided at the base tape 101 by magnetic induction.

As mentioned above, by arranging the loop antenna 2305 so as to face the side wall 2100A1-1a of the cartridge housing recess portion 2100A1-1, the loop antenna 2305 can be arranged in the vicinity of the feeding path of the base tape 101, and the information can be transmitted/received between the loop antenna 2305 and the RFID circuit element To of the base tape 101 in the feeding path of the base tape 101 in the cartridge housing 2100A. As a result, as compared with a case where the loop antenna is provided in the vicinity of the feeding path of the tag label tape 110 with print after being fed out of the cartridge housing 2100A for information transmission/reception, the size of the apparatus 2002 for producing RFID labels can be reduced.

Particularly in this embodiment, the loop antenna 2305 is arranged so that the magnetic path of the magnetic flux generated at the coil of the loop antenna 2305 intersects with (substantially at a right angle in this example) the face direction of the base tape 101. With this arrangement, information can be efficiently transmitted/received between the loop antenna 2305 and the RFID circuit element To.

Particularly in this embodiment, the dimension H of the tag antenna 152 in the width direction of the base tape 101 feeding path and the dimension h of the apparatus antenna 2305 in the width direction of the tape feeding path are configured to become substantially equal. By substantially making the dimensions of the tag antenna 152 and the apparatus antenna 2305 in the width direction of the feeding path coincide with each other, bonding efficiency between the coils (CT of the tag antenna 152 and 2305a of the apparatus antenna 2305) can be improved, and reliability can be improved when information is transmitted/received in both directions.

Particularly in this embodiment, the tag antenna 152 and the apparatus antenna 2305 are disposed so that the center axes W1, W2 thereof in the width direction of the base tape 101 feeding path substantially coincide with each other. By having the center positions in the width direction coincide with each other, the tag antenna 152 and the apparatus antenna 2305 can completely face each other in the width direction of the feeding path, and handling of tag antennas with various widths can be realized easily.

Particularly in this embodiment, as shown in FIG. 24, the dimension of the tag antenna 152 in the transport direction of the base tape 101 feeding path is set such that it is larger than a value obtained by multiplying a feeding velocity v of the base tape 101 by time te required for information transmission/reception with the RFID circuit element To by the control circuit 30 and the transmission and receiving circuits 306, 307 of the apparatus main body 8 via the apparatus antenna 2305 and adding a dimension x of the apparatus antenna 2305 in the transport direction of the feeding path (that is, v×te+x). With this arrangement, the state where the tag antenna 152 faces the apparatus antenna 2305 with respect to the transport direction during feeding of the base tape 101 can be surely ensured while communicating with the tag, and thereby stable information transmission/reception can be performed without stopping the feeding of the base tape 101 and assuredness of information transmission/reception is improved.

Particularly in this embodiment, the distance from the tape feeding roller 107 to a tag access position by the loop antenna 2305 is set larger than that from the tape feeding roller 107 to the print head 10. With this arrangement, information transmission/reception timing by the loop antenna 2305 can be made earlier than print timing. As a result, the print reflecting a good or bad result of the information transmission/reception can be made such as indication of failure of the tag access due to interruption of print as in this embodiment, for example.

Particularly in this embodiment, at an attachment of the cartridge 2100 to the cartridge holder portion 2019, the guide roller 112 composed of a non-adhesive material such as fluorine resin is provided so as to regulate the position of the feeding path of the base tape 101 in order to make the distance between the base tape 101 feeding path and the loop antenna 2305 substantially constant. With this arrangement, even if a supply mode based on consumption of the base tape 101, for example, is changed or the like (change in a diameter of a roll of tape with RFID tag or the like), the feeding path position is regulated and the distance between the base tape 101 feeding path and the loop antenna 2305 can be made substantially constant, and thereby stability and reliability of information transmission/reception can be improved.

The second embodiment is not limited to the above mode but is capable of various variations in a range not departing from its gist and technical idea. The variations will be described below in order.

(2-1) When a Recess Portion is Provided on a Bottom Wall of a Cartridge Housing:

FIG. 25 is an explanatory diagram for illustrating a detailed structure of a cartridge in this variation, and FIG. 26 is a partial sectional view of the cartridge and a cartridge holder portion by a XXVI-XXVI' section in FIG. 25. In FIGS. 25 and 26, the same reference numerals are given to those similar to the second embodiment and the description will be omitted as appropriate.

In this variation, a recess portion 2100'A2-1 having a side wall 2100A2-1a (recess-portion side wall, cartridge magnetic-path forming portion) substantially in parallel with a side wall 2100'A1 is provided as if cutting therein on a bottom wall 2100'A2 of a housing 2100'A in a cartridge 2100' (cartridge for including at least a RFID tag, container for including at least a RFID tag). On the other hand, at a position corresponding to the recess portion 2100'A2-1 on the bottom face of the cartridge holder portion 2019' (cartridge holder, container holder), a projection portion 2019'a is provided. At this projection portion 2019'a, the loop antenna 2305 is provided. With this arrangement, when the cartridge 2100' is attached to the cartridge holder portion 2019', the projection portion 2019'a of the cartridge holder portion 2019' is fitted in the cartridge housing recess portion 2100'A2-1, and the loop antenna 2305 provided at this projection portion 2019'a faces the side wall 2100'A2-1a of the cartridge housing recess portion 2100'A2-1 and arranged in the vicinity of the feeding path of the base tape 101. At this time, the loop antenna 152 of the RFID circuit element To provided at the base tape 101 and the loop antenna 2305 provided at the projection portion 2019'a are arranged so that the center axes thereof (center axis U in this case) in the feeding path width direction substantially coincide with each other.

In the variation with the above configuration, too, the loop antenna 2305 can be arranged in the closest vicinity of the feeding path of the base tape 101, information can be transmitted/received between the loop antenna 2305 and the RFID circuit element To of the base tape 101 in the feeding path of the base tape 101 in the cartridge housing 2100A. With this arrangement, the same effect as the second embodiment that the size of the apparatus 2002 for producing RFID labels can be reduced is obtained.

(2-2) When a Regulating Member Regulating the Feeding Path is Provided:

FIG. 27 is an explanatory diagram for illustrating a detailed structure of the cartridge in this variation and substantially corresponds to FIG. 22 in the second embodiment. The same reference numerals are given to those similar to FIG. 22 and the description will be omitted as appropriate.

As shown in FIG. 27, a cartridge 2100" (cartridge for including at least a RFID tag, container for including at least a RFID tag) has a plurality of guide rollers 112 (three guide rollers 112A, 112B, 112C here) between the first roll 102 and the tape feeding roller 107 in the feeding path of the base tape 101. With this arrangement, the feeding path of the base tape 101 fed out of the first roll 102 is regulated so as to pass the vicinity of a side wall 2100"A1 (cartridge magnetic-path forming portion) of a housing 2100"A. On the other hand, at a cartridge holder portion 2019" (cartridge holder, container holder) provided in the apparatus main body 8 in the apparatus 2002 for producing RFID labels, a projection portion as in the second embodiment is not provided but the loop antenna 2305 is provided so as to face the housing side wall 2100"A1 at a position corresponding to the guide rollers 112A, 112B, 112C. The other configurations are the same as those in the above embodiment.

In the variation with the above configuration, too, the loop antenna 2305 can be arranged in the closest vicinity of the feeding path of the base tape 101, information can be transmitted/received between the loop antenna 2305 and the RFID circuit element To of the base tape 101 in the feeding path of the base tape 101 in the cartridge housing 2100A. With this arrangement, the same effect as the above embodiment that the size of the apparatus 2002 for producing RFID labels can be reduced is obtained.

In this variation, the feeding path of the base tape 101 is regulated so as to pass the vicinity of the side wall 2100"A1 of the housing 2100"A by providing the guide rollers 112A, 112B, 112C, but not limited to that. Like a cartridge 2100''' (cartridge for including at least a RFID tag, container for including at least a RFID tag) shown in FIG. 28, for example, an upward recess portion 2100"A2-1 (cartridge magnetic-path forming portion) may be provided at a bottom wall 2100'''A2 (not shown) of the cartridge housing 2100'''A at a position on the side of the tape (right side in FIG. 28) from a line N connecting the reel member 102a and the tape feeding roller 107 so that the recess portion 2100'''A2-1 regulates the feeding position. In this case, similarly to FIG. 25, the loop antenna 2305 is provided at the projection portion 2019'''a provided on the bottom face of the cartridge holder portion 2019''' (cartridge holder, container holder).

With the above structure, the guide roller is not needed any more but the configuration is simplified and can be opposed to the side wall 2100'''A2-1a. Moreover, by arranging the apparatus antenna 2305 at the recess portion 2100'''A2-1 as mentioned above in FIG. 25, the size of the apparatus can be reduced and the positional relation between the tag antenna 152 and the apparatus antenna 2305 can be made proximate and constant regardless of a remaining amount of the base tape 101. Also, with this configuration, since the recess portion 2100'''A2-1 is brought into contact on the side of the separation sheet 101d of the base tape 101, wrong adhesion of the adhesive layer 101a of the base tape 101 to the recess portion 2100'''A2-1 can be prevented, and there is no need to use a non-adhesive material such as a fluorine resin as in a case where the feeding position is regulated on the side of the adhesive layer 101a but an inexpensive resin can be used.

(2-3) Variation of Sizes of the Apparatus Antenna and the Tag Antenna (i) When the Width of the Tag Antenna is Larger than that of the Apparatus Antenna:

In the above embodiment, the dimension H of the tag antenna in the width direction in the base tape 101 feeding path is configured to be substantially equal to the dimension h of the apparatus antenna 2305 in the width direction of the tape feeding path, but not limited to that. For example, as shown in FIGS. 29A and 29B, the dimension H of the coil CT constituting the tag antenna 152' in the width direction in the base tape 101 feeding path may be configured to be larger than the dimension h in the width direction of the coil 2305'a constituting the apparatus antenna 2305' (third apparatus loop antenna, apparatus magnetic-path forming portion) in the width direction.

With this arrangement, it becomes possible to surely have the magnetic path having passed at least the apparatus antenna 2305' pass the tag antenna 152', and an area of an overlapping portion (shaded portion in the figure) can be made constant even if there are plural types of width as in the tag antenna 152', the communication condition can be made constant. Therefore, reliability of information transmission/reception can be improved.

(ii) When the Width of the Apparatus Antenna is Larger than that of the Tag Antenna:

In the above embodiment, the dimension H of the tag antenna in the width direction in the base tape 101 feeding path is configured to be substantially equal to the dimension h of the apparatus antenna in the width direction of the tape feeding path, but not limited to that, but as shown in FIGS. 30A to 30C, for example, the width-direction dimension h of the coil 2305" a constituting the apparatus antenna 2305" (third apparatus loop antenna, apparatus magnetic-path forming portion) may be configured to be larger than the width-direction dimension H of the coil CT constituting the tag antenna 152". With this configuration, even if the feeding of the base tape 101" is displaced in the width direction as shown in the figure, an area of the overlapping portion (shaded portion in the figure) of the apparatus antenna 2305" and the tag antenna 152" is made constant, and the communication condition can be made constant. Therefore, reliability of information transmission/reception can be improved.

(2-4) Variation in Arrangement of the Apparatus Antenna and the Tag Antenna

In the second embodiment, the tag antenna 152 and the apparatus antenna 2305 are arranged so that the center axes thereof in the feeding-path width direction substantially coincide with each other, but not limited to that. That is, they may be disposed such that the end-portion position on one side (or the other side) of the tag antenna 152 in the base tape 101 feeding-path width direction and the end-portion position on one side (or the other side) of the apparatus antenna 2305 in the width direction substantially coincide with each other. In this case, it is only necessary that by forming the cartridge projection portion of the cartridge with a corresponding thickness, the cartridge height when being attached to the cartridge holder portion can be adjusted as appropriate so that the end-portion positions of both the antennas 152, 2305 substantially coincide with each other. Also, not limited to coincidence of the center in the feeding-path width direction of the base tape 101 with the center in the feeding-path width direction of the tag antenna 152, the edge-portion position on one side in the feeding-path width direction of the base tape 101 and the edge-portion position on one side in the feeding-path width direction of the coil CT of the tag antenna 152 may be predetermined fixed values. In this case, even if various cartridges 2100 and the like with different size, type or the like of the base tape 101 is replaced and attached for use in the cartridge holder 2019, the edge-portion position on one side in the feeding-path width direction of the coil CT can be made substantially constant all the time with respect to the side of the apparatus 2002 for producing RFID label.

According to this variation, if the width-direction dimensions of the tag antenna 152 and the apparatus antenna 2305 are substantially equal to each other, for example, the tag antenna 152 and the apparatus antenna 2305 can face each other substantially completely in the width direction. On one hand, if the width of the tag antenna 152 is larger than that of the apparatus antenna 2305, for example, the tag antenna 152 can face at least the entire dimension of the apparatus antenna 2305 with respect to the feeding-path width direction. On the other hand, if the width of the apparatus antenna 2305 is larger than that of the tag antenna 152, for example, the apparatus antenna 2305 can face at least the entire dimension of the tag antenna 152 with respect to the feeding-path width direction.

A third embodiment of the present invention will be described below referring to FIGS. 31 to 44. In this embodiment, the apparatus loop antenna in which a coil is wound around a magnetic member is provided in the vicinity of a tag medium feeding path of the cartridge. The same reference numerals are given to those similar to the first and second embodiments and the description will be omitted or simplified as appropriate.

FIG. 31 is a conceptual block diagram illustrating a detailed structure of an apparatus 3002 for producing RFID label of this embodiment and corresponds to FIGS. 2 and 21.

In FIG. 31, in the apparatus main body 8 of the apparatus 3002 for producing RFID label, a cartridge holder portion 3019 (container holder, cartridge holder) as a recess portion is provided, and to this holder portion 3019, a cartridge 3100 (container for including at least a RFID tag, cartridge for including at least a RFID tag) is mounted detachably.

In the apparatus main body 8, a loop antenna 3305 (fourth apparatus loop antenna, apparatus magnetic-path forming portion) configured to transmit/receive a signal by magnetic induction (electromagnetic induction, magnetic coupling, and other contactless methods carried out through a magnetic field) with the RFID circuit element To (details will be described later) provided at the tag label tape 110 with print, an apparatus magnetic member (second apparatus magnetic member, apparatus magnetic-path forming portion) 3020 in which a coil 3305a constituting the loop antenna 3305 is wound around, and the transmission circuit 306 and the receiving circuit 307 configured to make an access (for reading or writing) to the RFID circuit element To by the magnetic induction through the loop antenna 3305 (hereinafter described as "apparatus antenna 3305" as appropriate) and the apparatus magnetic member 3020 are provided.

The apparatus magnetic member 3020 is a substantially L-shaped magnetic member composed of a magnetic member such as ferrite and is arranged to be located in the vicinity of the feeding path of the base tape 101 from the first roll 102 to an outlet of the cartridge 3100 (tape feeding roller 107, which will be described later) in the cartridge 3100 when the cartridge 3100 is attached to the cartridge holder portion 3019 (See FIGS. 33A and 33B, which will be described later).

FIG. 32 is an explanatory diagram for illustrating a detailed structure of the cartridge 3100.

In FIG. 32, the cartridge 3100 has the first roll 102, the second roll 104, the ribbon-supply-side roll 111, the ribbon take-up roller 106, the tape feeding roller 107, the guide roller 112 (feeding position regulating device) and the like in the housing 3100A.

The tape feeding roller 107 presses and bonds the base tape 101 and the print-receiving tape 103 together to have the tag label tape with print and feeds the tape in a direction shown by an arrow A (=also functioning as a tape feeding roller) as mentioned above. At this time, the loop antenna 3305 and the apparatus magnetic member 3020 are located on the upstream side in the transport direction of the base tape 101 rather than the tape feeding roller 107 after the base tape 101 has been fed out of the first roll 102, and at the upstream positions, an access (reading or writing) to the RFID circuit element To provided at the base tape 101 is carried out by magnetic induction through the loop antenna 3305 and the apparatus magnetic member 3020. The print head 10 is arranged on the upstream side in the transport direction of the print-receiving tape 103 rather than the tape feeding roller 107. A distance from the tape feeding roller 107 to a tag access position by the loop antenna 3305 and the apparatus magnetic member 3020 is set longer than that from the tape feeding roller 107 to the print head 10 and the magnetic path M (See FIGS. 33A and 33B, which will be described later) generated through the loop antenna 3305 and the apparatus magnetic member 3020 rarely reaches the first roll 102.

The operation and behavior in the cartridge 3100 with the above configuration is substantially the same as those in the cartridges 100, 2100 and the like in the first and second embodiments, in which the base tape 101 is fed out of the first roll 102 and supplied to the tape feeding roller 107, while the print-receiving tape 103 is fed out of the second roll 104, and the print R (See FIG. 9, which will be described later) corresponding to the RFID circuit element To on the base tape 101 to be bonded is printed on the back face of the print-receiving tape 103. Then, the base tape 101 and the print-receiving tape 103 having finished with the printing are bonded and integrated by the tape feeding roller 107 and the sub roller 109 and formed as the tag label tape with print and fed out of the cartridge 3100.

FIG. 33A is a partial sectional view of the cartridge and the cartridge holder portion by a XXXIII-XXXIII' section in FIG. 32 and FIG. 33B is its top view.

As shown in FIGS. 33A and 33B, a cartridge housing 3100A has a side wall 3100A1 substantially in parallel with the face direction in the feeding path of the base tape 101 and a bottom wall 3100A2 substantially perpendicular to the side wall 3100A1. On the other hand, the apparatus magnetic member 3020 is in substantially the L-shape as mentioned above, and an end portion 3020a on one side (upper side in FIG. 33A, left side in FIG. 33B) faces the side wall 3100A1 of the cartridge 3100, while an end portion 3020b on the other side (lower side in FIG. 33A, right side in FIG. 33B) faces the bottom wall 3100A2 of the cartridge 3100 in arrangement. Further between the end portions 3020a, 3020b of the apparatus magnetic member 3020, the coil 3305a constituting the loop antenna 3305 is wound. With this configuration, the magnetic path M generated from the coil 3305a of the loop antenna 3305 and between the end portions 3020a, 3020b of the apparatus magnetic member 3020 (in other words, the magnetic path M from one-side end portion 3020a of the apparatus magnetic member 3020, intersecting with the face direction of the feeding path of the base tape 101 and reaching the other-side end portion 3020b of the apparatus magnetic member 3020) is made to intersect with (substantially at a right angle in this case) the face direction of the base tape 101 so that an access (for reading or writing) can be made to the RFID circuit element To by the magnetic induction.

In the apparatus magnetic member 3020, the end portions 3020a, 3020b are disposed such that they are on substantially the same plane with the side wall 3019a and the bottom wall 3019b of the cartridge holder portion 3019, respectively, and the coil 3305a of the loop antenna 3305 wound between the end portions 3020a, 3020b of the apparatus magnetic member 3020 is provided at a portion inside the apparatus (lower side in FIG. 33A) rather than a cartridge attached face (bottom wall surface 3019b, here) of the cartridge holder portion 3019.

FIG. 34 is a diagram illustrating the size and positional relation between the loop antenna 152 of the RFID circuit element To provided at the base tape 101 fed out of the first roll 102 and the end portion 3020a of the apparatus magnetic member 3020 provided so as to face the cartridge side wall 3100A1.

As mentioned above, the RFID circuit element To is constituted by the loop antenna 152 constructed in the loop coil shape and configured to transmit/receive information and the IC circuit part 151 connected thereto and configured to store the information. The loop antenna 152 (hereinafter described as "tag antenna 152" as appropriate) of the RFID circuit element To and the end portion 3020a of the apparatus magnetic member 3020 (hereinafter described as "magnetic member end portion 3020a as appropriate) are, as shown in FIG. 34, configured such that the dimension h of the magnetic member end portion 3020a in the width direction of the tape feeding path is smaller than the dimension H of the tag antenna 152 in the width direction of the base tape 101 feeding path.

On the other hand, the dimension y of the tag antenna 152 in the transport direction of the base tape 101 feeding path is set such that it is larger than a value obtained by multiplying a feeding velocity v of the base tape 101 by time te required for information transmission/reception with the RFID circuit element To by the control circuit 30 and the transmission and receiving circuits 306, 307 of the apparatus main body 8 via the apparatus antenna 3305 and the apparatus magnetic member 3020 and adding the dimension x of the magnetic member end portion 3020a in the transport direction of the feeding path (that is, v×te+x).

The tag antenna 152 and the magnetic member end portion 3020a in such a size relation are arranged, as shown in FIG. 34, so that their center axes (center axes W1; W2 in this case) substantially coincide with each other in the width direction in the feeding path. In order that both the center axes of the antenna 152 and the magnetic member 3020a substantially coincide with each other as above, in this embodiment, though not described in illustration, a cartridge projection portion for positioning is installed at an appropriate position of the cartridge housing 3100A, and an apparatus projection portion is installed at a corresponding position of the cartridge holder portion 3019 on the apparatus main body 8. When the cartridge 3100 is attached to the cartridge holder portion 3019, the apparatus projection portion is brought into contact with the cartridge projection portion, and thereby cartridge height is adjusted. On the housing of a cartridge containing a base tape with a different width (or the base tape provided with the RFID circuit element To with the different width of the tag antenna), the cartridge projection portion formed with a corresponding thickness is provided, and when being replaced by the cartridge, the cartridge height thus attached to the cartridge holder portion 3019 is adjusted as appropriate so that the center axes of both the antenna 152 and the magnetic member 3020a substantially coincide with each other.

Though not particularly described here, the size of the other-side end portion 3020b of the apparatus magnetic member 3020 is also set substantially similarly to that of the one-side end portion 3020a.

FIG. 35 is a functional block diagram illustrating a functional configuration relating to an access (writing or reading) function to the RFID circuit element To among the functions of the apparatus 3002 for producing RFID label and corresponds to FIG. 6 in the first embodiment.

In FIG. 35, the apparatus 3002 for producing RFID label has the transmission circuit 306 configured to generate a carrier wave for making an access (for reading/writing) the RFID circuit element To through the loop antenna 3305 and the apparatus magnetic member 3020, and to modulate the carrier wave on the basis of a control signal input from the control circuit 30, the receiving circuit 307 configured to demodulate the reply signal received from the RFID circuit element To through the loop antenna 3305 and to output it to the control circuit 30, and the control circuit 30 configured to execute modulation control of the carrier wave at the transmission circuit 306 and processing of the signal demodulated by the receiving circuit 307.

Circuit configuration of a connection portion among the transmission circuit 306, the receiving circuit 307, and the loop antenna 3305 and the apparatus magnetic member 3020 is similar to that shown in FIG. 7 above and the description will be omitted.

The appearance of the RFID label T formed by completing information writing (or reading) of the RFID circuit element To and cutting of the tag label tape 110 with print by the apparatus 3002 for producing RFID labels with the above configuration is similar to that described in the above first embodiment using FIGS. 9A, 9B, 10 and the like and the description will be omitted.

At the access (reading or writing) to the RFID tag information of the IC circuit part 151 on the RFID circuit element To by the apparatus 3002 for producing RFID labels, the screen similar to FIG. 11 above is also displayed on the terminal 5 or the general-purpose computer 6. When the RFID label T is produced, that is, the print-receiving tape 103 is fed, the predetermined print is made by the print head 10, while the base tape 101 is fed and the RFID tag control information is written in and the print-receiving tape 103 and the base tape 101 are bonded together to have the tag label tape 110 with print and then, the tag label tape 110 with print is cut for each RFID circuit element To have the RFID label T, similar to the above, the control procedure equivalent to FIGS. 12 and 13 is executed by the control circuit 30 by the apparatus 3002 for producing RFID label.

In the apparatus 3002 for producing RFID labels of the third embodiment configured as above, the print-receiving tape 103 fed out of the second roll 104 and given the predetermined print by the print head 10 and the base tape 101 fed out of the first roll 102 are bonded together by the tape feeding roller 107 to become the tag label tape 110 with print, and the RFID label T is produced using the tag label tape 110 with print similarly to the first and second embodiments.

At this time, in this embodiment, the coil 3305a constituting the loop antenna 3305 is wound around the apparatus magnetic member 3020 and arranged in the vicinity of the feeding path immediately after the feeding-out of the base tape 101 in the cartridge 3100 as mentioned above, and by using the magnetic path M generated by the coil 3305a and the magnetic member 3020, information is transmitted/received with the RFID circuit element To of the base tape 101 by the magnetic coupling.

As mentioned above, by having the structure that information is transmitted/received between the apparatus magnetic member 3020 and the RFID circuit element To in the feeding path immediately after the feeding-out of the base tape 101 in the cartridge 3100, the size of the apparatus 3002 for producing RFID labels can be reduced as compared with a case where the loop antenna and the apparatus magnetic member are provided in the vicinity of the feeding path of the tag label tape 110 with print after being fed out of the cartridge housing 3100A for information transmission/reception.

Particularly in this embodiment, in the cartridge housing 3100A, the side wall 3100A1 is configured substantially in parallel with the face direction in the feeding path of the base tape 101, and the apparatus magnetic member 3020 is configured such that the magnetic path M generated from the coil 3305a of the loop antenna 3305 and generated between the end portions 3020a, 3020b of the apparatus magnetic member 3020 intersect with (substantially at a right angle in this case) the face direction of the base tape 101.

As a result, the magnetic path M generated between the end portions 3020a, 3020b of the apparatus magnetic member 3020 on the basis of the magnetic flux of the coil 3305a wound around the apparatus magnetic member 3020 is made to intersect with the face direction of the feeding path of the base tape 101, and information can be efficiently transmitted/received between the loop antenna 3305 and the apparatus magnetic member 3020 as well as the RFID circuit element To. Since the face direction of the base tape 101 in the feeding path is substantially in parallel with the side wall 3100A1 of the cartridge 3100, the base tape 101 can be brought close to the outer circumference (the side wall 3100A1 in this case) of the cartridge 3100 as much as possible and moreover, since the one-side end portion 3020a of the apparatus magnetic member 3020 faces the cartridge side wall 3100A1, the distance between the base tape 101 and the one-side end portion 3020a of the apparatus magnetic member can be made as small as possible. As result, even if the cartridge is used in the magnetic coupling method as in this embodiment, information can be transmitted/received efficiently and assuredly.

Particularly in this embodiment, the dimension h of the magnetic member end portion 3020a in the width direction of the tape feeding path is configured to be smaller than the dimension H of the tag antenna 152 in the width direction of the base tape 101 feeding path. With this arrangement, the magnetic path M passing at least the magnetic member end portion 3020a can be surely made to pass the tag antenna 152, and even if the tag antenna 152 is replaced by the one with a different width, an area of a portion where the tag antenna 152 and the magnetic member end portion 3020a are overlapped can be made constant, and therefore the communication condition can be made constant. Accordingly, reliability of information transmission/reception can be improved.

Particularly in this embodiment, the dimension y of the tag antenna 152 in the transport direction of the base tape 101 feeding path is set larger than a value obtained by multiplying a feeding velocity v of the base tape 101 by time te required for information transmission/reception with the RFID circuit element To by the control circuit 30 and the transmission and receiving circuits 306, 307 of the apparatus main body 8 via the apparatus antenna 3305 and the apparatus magnetic member 3020 and adding the dimension x of the magnetic member end portions 3020a, 3020b in the transport direction of the feeding path of the apparatus magnetic member 3020 (that is, v×te+x). With this arrangement, the state where the tag antenna 152 faces the apparatus magnetic member end portions 3020a, 3020b with respect to the transport direction during feeding of the base tape 101 can be surely ensured during a communication with the tag. Thereby, information transmission/reception can be performed without stopping the feeding of the base tape 101, reliability of the information transmission/reception can be improved, and the time for producing tag can be reduced.

Particularly in this embodiment, the coil 3305a of the loop antenna 3305 wound between the end portions 3020a, 3020b of the apparatus magnetic member 3020 is provided at a portion inside the apparatus (lower side in FIG. 33) rather than the cartridge attached face (side wall 3019a and the bottom wall 3019b) of the cartridge holder portion 3019. By providing the coil 3305a inside rather than the cartridge attached face as above, a space inside the apparatus can be effectively used, and the size of the entire apparatus 3002 for producing RFID labels can be surely reduced.

Particularly in this embodiment, the distance from the tape feeding roller 107 to the tag access position by the loop antenna 3305 and the apparatus magnetic member 3020 is set at a distance that the magnetic path M (See FIG. 33, which will be described later) generated through the loop antenna 3305 and the apparatus magnetic member 3020 rarely reaches the first roll 102. With this arrangement, when information is transmitted/received by the loop antenna 3305 and the apparatus magnetic member 3020 in the feeding path of the base tape 101 to the RFID circuit element To provided at the base tape 101, wrong information reading or writing with respect to the RFID circuit element To in the first roll 102 which is not a target of information reading/writing can be prevented.

Particularly in this embodiment, the distance from the tape feeding roller 107 to the tag access position by the loop antenna 3305 is set larger than that from the tape feeding roller 107 to the print head 10. With this arrangement, the information transmission/reception timing by the loop antenna 3305 can be made earlier than print timing. As a result, the print reflecting a good or bad result of the information transmission/reception can be made such as indication of failure of the tag access due to interruption of print as in this embodiment, for example.

Particularly in this embodiment, at an attachment of the cartridge 3100 to the cartridge holder portion 3019, the guide roller 112 composed of a non-adhesive material (fluorine resin, for example) is provided so as to regulate the position of the feeding path of the base tape 101 in order to make the distance between the base tape 101 feeding path and the loop antenna 3305 substantially constant. With this arrangement, even if a supply mode based on consumption of the base tape 101 is changed or the like (change in a diameter of roll of tape with RFID tag or the like), for example, the feeding path position is regulated and the distance between the feeding path of the base tape 101 and the loop antenna 3305 is made substantially constant so that the path can pass the vicinity of the cartridge side wall 3100A1, and thereby stability and reliability of information transmission/reception can be improved.

The third embodiment is not limited to the above mode but is capable of various variations in a range not departing from its gist and technical idea. The variations will be described below in order.

(3-1) Variation of the Cartridge Housing Shape (i) When a Recess Portion is Provided on the Side Wall of the Cartridge Housing:

FIG. 36 is an explanatory diagram for illustrating a detailed structure of the cartridge in this variation and substantially corresponds to FIG. 32 in the third embodiment. In FIG. 36, the same reference numerals are given to those similar to FIG. 32 and the description will be omitted.

In this variation, an end portion 3020″a on one side (left side in FIG. 36) of an apparatus magnetic member 3020″ (second apparatus magnetic member, apparatus magnetic-path forming portion) is provided at the distal end portion of a projection portion 3019″a1 projecting from a side wall 3019″a of a cartridge holder portion 3019″ (container holder). An end portion 3020″b on the other side (right side in FIG. 36) of an apparatus magnetic member 3020″ is provided on a bottom wall 3019″b of a cartridge holder portion 3019″ similarly to the third embodiment. On the other hand, at a position corresponding to the apparatus magnetic member end portion 3020″a in a side wall 3100-1A1 of a housing 3100-1A of the cartridge 3100-1 (cartridge for including at least a RFID tag, container for including at least a RFID tag), a recess portion 3100-1A1-1 is provided. With this arrangement, when the cartridge 3100-1 is attached to the cartridge holder portion 3019″, the projection portion 3019″a1 of the cartridge holder portion 3019″ is fitted in the cartridge housing recess portion 3100-1A1-1, and the apparatus magnetic member end portion 3020″a provided at the projection portion 3019″a1 faces the side wall 3100-1A1-1a (first recess-portion side wall) of the cartridge housing recess portion 3100-1A1-1. As a result, the apparatus magnetic member end portion 3020″a is arranged in the vicinity of the feeding path of the base tape 101 (from the feeding-out position from the roll to the tape feeding roller driving shaft 12) so that the magnetic path of the magnetic flux generated at the coil 3305a of the loop antenna 3305 intersects with (substantially at a right angle in this example) the face direction of the base tape 101.

The inside of the recess portion 3100-1A1-1 provided at the side wall 3100-1A of the cartridge housing 3100-1A is brought into contact with the separation sheet 101d of the base tape 101. With this arrangement, when the cartridge 3100-1 is attached to the cartridge holder 19″, it plays a role of a regulating device configured to regulate the position of the feeding path of the base tape 101 in order to make the distance between the feeding path of the base tape 101 and the apparatus magnetic member end-portion 3020″a constant. As a result, even if a supply mode based on consumption of the base tape 101, for example, is changed or the like (change in a diameter of a roll of tape with RFID tag or the like), the feeding path position is regulated and the distance between the feeding path of the base tape 101 and the apparatus magnetic member end portion 3020″a can be made substantially constant.

In this variation, too, information can be transmitted/received between the apparatus magnetic member 3020″ and the RFID circuit element To in the feeding path immediately after the feeding-out of the base tape 101 in the cartridge housing 3100-1A, and the same effect as the above embodiment is obtained that the size of the apparatus 3002 for producing RFID labels can be reduced. Also, since the position of the feeding path of the base tape 101 is regulated by the recess portion 3100-1A1-1 of the cartridge housing 3100-1A so as to make the distance between the feeding path and the apparatus magnetic member end portion 3020″a substantially constant, stability and reliability of the information transmission/receiving can be improved. Moreover, by providing the recess portion 3100-1A1-1 on the side of the separation sheet 101d opposite the side of the adhesive layer 101a in the base tape 101, wrong adhesion of the adhesive layer 101a of the base tape 101 to the inside of the recess portion 3100-1A1-1 can be prevented.

(ii) When a Recess Portion is Provided on the Bottom Wall of the Cartridge Housing:

FIG. 37 is a partial sectional view in the vicinity of the installation position of the apparatus magnetic member of the cartridge and the cartridge holder portion in this variation and corresponds to FIG. 33 in the third embodiment. In FIG. 37, the same reference numerals are given to those similar to FIG. 33 in the third embodiment, and the description will be omitted.

In this variation, a recess portion 3100′A2-1 having a side wall 3100′A2-1a (second recess-portion side wall) substantially in parallel with a side wall 3100′A1 is provided as if cutting therein on a bottom wall 3100′A2 of a housing 3100′A in a cartridge 3100′ (cartridge for including at least a RFID tag, container for including at least a RFID tag, not shown). On the other hand, the apparatus magnetic member 3020′ (second apparatus magnetic member, apparatus magnetic-path forming portion) in this variation is substantially in the U-shape and is configured such that the end portion 3020′a on one side (left side in FIG. 37) and the end portion 3020′b on the other side (right side in FIG. 37) face each other in the arrangement and the magnetic path M is formed between the both end portions 3020′a, 3020′b. When the cartridge 3100′ is attached to the cartridge holder portion 3019, the end portion 3020′a on one side faces the side wall 3100′A1 of the cartridge housing 3100′A similarly to the above embodiment, while the end portion 3020′b on the other side faces the side wall 3100′A2-1a of the bottom wall 3100′A2 in the cartridge housing. Also, the coil 3305a constituting the loop antenna 3305 is wound between the end portions 3020′a, 3020′b of the device-side magnetic member 3020′. With this arrangement, when the cartridge 3100′ is attached to the cartridge holder portion 3019, the end portion 3020′b of the apparatus magnetic member 3020′ is fitted in the cartridge housing recess portion 3100′A2-1, and the end portion 3020′b is arranged in the vicinity of the feeding path of the base tape 101. At this time, the loop antenna 152 of the RFID circuit element To provided at the base tape 101 and the both end portions 3020′a, 3020′b of the apparatus magnetic member 3020′ are arranged so that their center axes in the feeding-path width direction substantially coincide with each other.

In the variation with the above configuration, since the end portions 3020′a, 3020′b of the apparatus magnetic member 3020′ can be arranged in the closest vicinity of the feeding path of the base tape 101 immediately after the feeding-out of the first roll 102, information can be transmitted/received between the apparatus magnetic member 3020′ and the RFID circuit element To in the feeding path of the base tape 101 in the cartridge housing 3100′A. With this arrangement, the same effect as the above embodiment is obtained that the size of the apparatus 3002 for producing RFID labels can be reduced.

Also, since the magnetic path M generated between the end portions 3020′a, 3020′b of the apparatus magnetic member 3020′ can be made to intersect with the face direction of the feeding path of the base tape 101 substantially at a right angle, information can be efficiently transmitted/received between the loop antenna 3305 as well as the apparatus magnetic member 3020 and the RFID circuit element To.

(iii) When a Recess Portion is Provided on a Cartridge Housing Bottom Wall and a Side Wall:

FIG. 38 is a partial sectional view in the vicinity of the installation position of the apparatus magnetic member of the cartridge and the cartridge holder portion in this variation and corresponds to FIGS. 33 and 37. In FIG. 38, the same reference numerals are given to those similar to FIGS. 33 and 37 in the third embodiment, and the description will be omitted.

As shown in FIG. 38, in a cartridge 3100″ (cartridge for including at least a RFID tag, container for including at least a RFID tag, not shown), a recess portion 3100″A2-1 having a side wall 3100″A2-1a (second recess-portion side wall) substantially in parallel with a side wall 3100"A1 is provided as if cutting therein on a bottom wall 3100"A2 of a housing 3100"A similarly to the variation (ii), and a recess portion 3100"A2-2 having a side wall 3100"A2-2a (first recess-portion side wall) substantially in parallel with the side wall 3100"A1 is also provided as if cutting therein on the side wall 3100"A1. Also, a stepped portion is provided on a side wall 3019'a of the cartridge holder portion 3019' (container holder) in correspondence with the recess portion 3100"A2-2. The apparatus magnetic member 3020' in this variation has the same configuration as the variation (ii). With this arrangement, when the cartridge 3100" is attached to the cartridge holder portion 3019', the end portion 3020'a on one side faces the side wall 3100"A2-2a of the recess portion 3100"A2-2 provided at the cartridge housing side wall 3100"A1, and the end portion 3020'b on the other side faces the side wall 3100"A2-1a of the recess portion 3100"A2-1 provided at the cartridge housing bottom wall 3100"A2.

In the variation with the above configuration, too, information can be transmitted/received between the apparatus magnetic member 3020' and the RFID circuit element To in the feeding path of the base tape 101 in the cartridge housing 3100"A, and the same effect as the third embodiment is obtained that the size of the apparatus 3002 for producing RFID labels can be reduced. Also, since the magnetic path M generated between the end portions 3020'a, 3020'b of the apparatus magnetic member 3020' can be made to intersect with the face direction of the feeding path of the base tape 101 substantially at a right angle, information can be efficiently transmitted/received between the loop antenna 3305 as well as the apparatus magnetic member 3020 and the RFID circuit element To.

(3-2) When a Magnetic Member is Provided in the Cartridge:

(i) When the Magnetic Member is Provided on One Side of the Base Tape:

In the third embodiment, the loop antenna coil 3305a is wound around the apparatus magnetic member 3020 provided outside the housing 3100A of the cartridge 3100 and the apparatus magnetic member 3020 is arranged in the vicinity of the cartridge housing 3100A in the configuration, but not limited to that, the magnetic member may be provided inside the housing 3100A of the cartridge 3100, for example.

FIG. 39 is an explanatory diagram for illustrating a detailed structure of the cartridge in this variation, and FIG. 40 is a partial sectional view of the cartridge and the cartridge holder portion by a XXXX-XXXX' section in FIG. 39. The same reference numerals are given to those similar to FIG. 32 in the above embodiment, and the description will be omitted as appropriate.

As shown in FIGS. 39 and 40, a cartridge 3100''' in this variation has a cartridge magnetic member 3021 (second cartridge magnetic member, cartridge magnetic-path forming portion) provided in the vicinity of the feeding path on the side of the separation sheet 101d of the base tape 101 in a housing 3100'''A substantially in parallel with the face direction. The cartridge magnetic member 3021 is provided so as to be located in the magnetic path M of the magnetic flux generated by a loop antenna 3305' (fourth apparatus-side loop antenna) provided at a portion inside the apparatus (lower side in FIG. 40) rather than the cartridge attached face (bottom wall 3019b here) of the cartridge holder portion 3019 (See FIG. 40).

The cartridge magnetic member 3021 is configured both with the height and width of the tag antenna 152 small and disposed so that the center axes thereof (center axis Q in this case) in the width direction of the base tape feeding path substantially coincide with each other, and a dimension of the cartridge magnetic member 3021 in the width direction in the base tape 101 feeding path is, similarly to the end portions 3020a, 3020b of the apparatus magnetic member 3020 in the third embodiment, configured smaller than the dimension H of the tag antenna 152. The dimension of the tag antenna 152 in the transport direction of the base tape 101 feeding path is, similarly to the third embodiment, set larger than a value obtained by multiplying a feeding velocity v of the base tape 101 by time te required for information transmission/reception with the RFID circuit element To by the control circuit 30 and the transmission and receiving circuits 306, 307 of the apparatus main body 8 via the apparatus antenna 3305' and the cartridge magnetic member 3021 and adding the dimension of the cartridge magnetic member 3021 in the transport direction of the feeding path.

In the variation with the above configuration, too, information can be transmitted/received between the apparatus antenna 3305' and the RFID circuit element To in the feeding path of the base tape 101 through the cartridge magnetic member 3021 in the cartridge housing 3100'''A, and the same effect as the above embodiment is obtained that the size of the apparatus 3002 for producing RFID labels can be reduced. Also, by providing a magnetic member on the side of the cartridge, the magnetic path M can be efficiently formed so as to improve reliability of information transmission/reception by optimizing the size, shape, position and the like of the cartridge magnetic member 3021 according to the characteristics such as size, type, position and the like of the loop antenna 152 of the RFID circuit element To provided at the base tape 101. Moreover, by providing the cartridge magnetic member 3021 in the vicinity of the feeding path on the side of the separation sheet 101d opposite the side of the adhesive layer 101a in the base tape 101, when the base tape 101 passes through the feeding path in the vicinity of the cartridge magnetic member 3021, wrong adhesion of the adhesive layer 101a of the base tape 101 to the cartridge magnetic member 3021 can be prevented.

As shown in FIGS. 41A and 41B, the loop antenna 3305' (fourth apparatus-side loop antenna) may be provided beside the cartridge housing 3100'''A, that is, on the side wall 3019a of the cartridge holder portion 3019. FIG. 41A shows a case where the cartridge magnetic members 3021 is arranged on the side opposite the loop antenna 3305' with respect to the feeding path of the base tape 101, while FIG. 41B shows a case where the cartridge magnetic member 3021 is arranged on the same side as the loop antenna 3305' with respect to the feeding path of the base tape 101. From the viewpoint of the arrangement, that shown in FIG. 41A is more preferable. In these cases, too, the same effect as the third embodiment is obtained.

(ii) When a Magnetic Member is Provided on Both Sides of the Base Tape:

In the variation (i), the magnetic member is provided on one side of the base tape 101, but not limited to that, the magnetic member may be provided on both sides of the base tape 101 in the configuration.

FIG. 42 is an explanatory diagram for illustrating a detailed structure of the cartridge in this variation, and FIG. 43 is a partial sectional view of the cartridge and the cartridge holder portion by a XXXXIII-XXXXIII' section in FIG. 42. In FIGS. 42 and 43, the same reference numerals are given to those similar to FIG. 32 in the third embodiment and FIGS. 39, 40 in the variation (i) and the description will be omitted as appropriate.

As shown in FIGS. 42 and 43, a cartridge 3100'''' of this variation has the cartridge magnetic members 3021, 3021 provided in the vicinity of the feeding path of the side of the adhesive layer 101*a* and the side of the separation sheet 101*d* of the base tape 101 in a housing 3100""A, respectively, substantially in parallel with the face direction thereof. The cartridge magnetic members 3021, 3021 are provided so as to be located in the magnetic path M of the magnetic flux generated by a loop antenna 3305" (fourth apparatus loop antenna, apparatus magnetic-path forming portion) provided at a portion inside the apparatus (lower side in FIG. 43) rather than the cartridge attached face (bottom wall 3019*b* here) of the cartridge holder portion 3019 (See FIG. 43).

In the variation with the above configuration, too, information can be transmitted/received between the apparatus antenna 3305" and the RFID circuit element To in the feeding path of the base tape 101 through the cartridge magnetic member 3021 in the cartridge housing 3100""A, and the same effect as the third embodiment is obtained that the size of the apparatus 3002 for producing RFID labels can be reduced.

(3-3) When the Magnetic Member is Provided Inside and Outside the Cartridge:

In the third embodiment, the loop antenna coil 3305*a* is wound around the apparatus magnetic member 3020 provided outside the cartridge in the configuration, and in the above variation (3-2), the magnetic member is provided inside the cartridge. However, configuration in which the both are combined, that is, in which the apparatus magnetic member with the coil wound around is provided outside the cartridge and the cartridge magnetic member is provided also inside the cartridge.

FIG. 44 is a partial sectional view in the vicinity of the magnetic member installation position of the cartridge and the cartridge holder portion in this variation.

In FIG. 44, in the bottom wall 3019*b* of the cartridge holder portion 3019, an apparatus magnetic member 3022 (second apparatus magnetic member, apparatus magnetic-path forming portion) around which a coil 3305"*a* of the loop antenna 3305" is wound is provided, and on both sides of the base tape 101 in a housing 3100-A2 of a cartridge 3100-2, cartridge magnetic members 3023, 3023 (second cartridge magnetic member, cartridge magnetic-path forming portion) are disposed facing each other. The cartridge magnetic members 3023, 3023 are arranged so that their lower-side end portions face the both end portions of the apparatus magnetic members 3022, and as a result, between the both end portions of the apparatus magnetic members 3022 and the cartridge magnetic members 3023, 3023, and between the cartridge magnetic members 3023, 3023 located on both sides of the base tape 101, the magnetic paths M are formed, respectively.

In the variation with the above configuration, too, information can be transmitted/received between the apparatus antenna 3305" and the RFID circuit element To in the feeding path of the base tape 101 through the apparatus magnetic member 3022 and the cartridge magnetic members 3023, 23 in the cartridge housing 3100-2A, and the same effect as the third embodiment is obtained that the size of the apparatus 3002 for producing RFID labels can be reduced.

In the above, a case where writing/reading of RFID tag information and print are carried out on the base tape 101 being moved inside the cartridges 1100, 2100, 3100 and the like is described, but not limited to that, the print and reading/writing may be conducted while the base tape 101 and the like are stopped at a predetermined position (moreover, while it is held by a predetermined feeding guide for reading/writing).

In the above, a case where the tag label tape 110 with print finished with print and an access (reading or writing) to the RFID circuit element To is cut by the cutter 15 so as to produce the RFID label T is described as an example, but not limited to that. That is, if a label mount (so-called die-cut label) separated in advance to a predetermined size corresponding to the label is continuously arranged on a tape fed out of the roll, it is not necessary to cut it by the cutter 15 but after the tape is discharged from the carry-out exit 16, only the label mount (provided with the accessed RFID circuit element To and corresponding print) may be peeled off the tape so as to produce the RFID label T, and the present invention may be also applied to this kind of label.

In the above, the print is applied on the cover film 103 separately from the base tape 101 provided with the RFID circuit element To and they are bonded together, but not limited to that, and the present invention may be applied to a method that the print is made on the cover film provided at the tag tape (type that bonding is not carried out). Moreover, the present invention is not limited to those in which the RFID tag information is read out or written in from the IC circuit part 151 of the RFID circuit element To and the print is made by the print head 10 in order to identify the RFID circuit element To. The print does not necessarily have to be made but the present invention may be applied to those in which RFID tag information is read out or written in.

Moreover, in the above, a case where the base tape 101 as the tag tape is wound around the reel member so as to constitute a roll, and the roll is arranged in the cartridge 1100, 2100, 3100 and the like and the tag tape is fed out is described as an example, but not limited to that. For example, it may be so configured that a flat-paper state or strip-like tape or sheet on which at least one RFID circuit element To is arranged (including those formed by cutting into an appropriate length after the tape wound around the roll is fed out) is stacked in a predetermined containing portion (flatly stacked in a tray-like container, for example) and made into a cartridge, and the cartridge is attached to the cartridge holder on the side of the apparatuses 1002, 2002, 3002 for producing RFID labels and is transferred and transported from the container portion for print and writing so as to have the RFID label.

Moreover, there may be a configuration that the roll is directly and detachably attached to the side of the apparatus 1002, 2002, 3002 for producing RFID labels or configuration that the flat-paper state or strip-like tape or sheet is transferred by a predetermined feeder mechanism one by one from outside the apparatus 1002, 2002, 3002 for producing RFID labels and supplied into the apparatus 2 for producing RFID labels, and moreover, not limited to those detachably attached to the side of the main body of the apparatus 2 for producing RFID labels such as the cartridge 1100, 2100, 3100 and the like, the first roll 102 may be provided as a so-called installed type or integral type that is not detachable to the side of the apparatus main body. In this case, too, the same effect is obtained.

The "Erase" signal, the "Verify" signal, the "Program" signal and the like used above shall comply with the specification formulated by EPC global. The EPC global is a non-profit corporation jointly established by International EAN Association, which is an international organization of distribution codes, and UCC (Uniformed Code Council), which is the U.S. distribution code organization. Signals complying with other standards will do as long as they serve the same functions.

Other than those mentioned above, methods of the embodiments and their variations may be combined as appropriate for use.

Though not specifically exemplified, the present invention should be put into practice with various changes made in a range not departing from its gist.

What is claimed is:

1. An apparatus for communicating with a RFID tag comprising:
a container holder configured to detachably attach a container for including at least the RFID tag which contains a tag medium on which a RFID circuit element provided with an IC circuit part storing information and a tag loop antenna connected to said IC circuit part is arranged, capable of continuous supply of said tag medium; and
an apparatus magnetic-path forming portion configured to form a magnetic path for a communication magnetic flux in a feeding path of said tag medium in said container for including at least the RFID tag when said container for including at least the RFID tag is attached to said container holder.

2. The apparatus for communicating with the RFID tag according to claim 1, wherein:
said container holder is a cartridge holder configured to detachably attach a cartridge for including at least the RFID tag as said container for including at least the RFID tag which contains said tag medium substantially in a sheet state or a tape state on which said RFID circuit element is arranged, capable of continuous supply of said tag medium; and
said apparatus magnetic-path forming portion includes a first apparatus loop antenna and a second apparatus loop antenna configured to be provided on one side and the other side respectively on a face of said cartridge holder substantially perpendicular to a face direction in the feeding path at an attachment of said cartridge for including at least the RFID tag to said cartridge holder, for sandwiching said feeding path therebetween and to be excited and driven in phases opposite to each other so as to transmit/receive information with said IC circuit part by a magnetic induction.

3. The apparatus for communicating with the RFID tag according to claim 2, wherein:
said first and second apparatus loop antennas are arranged such that each of apparatus coil faces respectively provided at the apparatus loop antennas is located substantially on a same plane with each other.

4. The apparatus for communicating with the RFID tag according to claim 2, wherein:
said first and second apparatus loop antennas are provided such that a magnetic flux generated by an apparatus coil provided at each of the apparatus loop antennas intersects with a face direction of said tag medium in the feeding path of said tag medium.

5. The apparatus for communicating with the RFID tag according to claim 2, wherein:
at least one of said first and second apparatus loop antennas is provided at an apparatus projection portion arranged so as to project toward the side of said cartridge for including at least the RFID tag in said cartridge holder.

6. The apparatus for communicating with the RFID tag according to claim 2, wherein:
said cartridge for including at least the RFID tag has said feeding path of said tag medium at a cartridge projection portion provided so as to project toward the side of said cartridge holder; and
said cartridge holder has a recess portion so as to arrange said cartridge projection portion to be inserted between said first apparatus loop antenna and said second apparatus loop antenna.

7. The apparatus for communicating with the RFID tag according to claim 2, wherein:
said cartridge holder and said cartridge for including at least the RFID tag are configured such that an end face of said feeding path of said tag medium on the side of said cartridge holder is located close to or substantially on the same plane with respect to a face connecting end portions of said first and second apparatus loop antennas on the side of said cartridge for including at least the RFID tag.

8. The apparatus for communicating with the RFID tag according to claim 2, wherein:
each of said first apparatus loop antenna and said second apparatus loop antenna is arranged obliquely such that an axis line of the apparatus coil provided at each of the antennas respectively has an outward angle $\theta$ with respect to the face direction of the feeding path of said tag medium.

9. The apparatus for communicating with the RFID tag according to claim 8, wherein:
said angle $\theta$ is in a range of 15 to 45 degrees.

10. The apparatus for communicating with the RFID tag according to claim 2, wherein:
each of said first apparatus loop antenna and said second apparatus loop antenna has a non-circular cross-sectional profile shape such that a dimension in the transport direction of the cross-sectional shape of the magnetic path is smaller than that a dimension in a direction perpendicular to the transport direction of said cross-sectional shape of said magnetic path.

11. The apparatus for communicating with the RFID tag according to claim 10, wherein:
each of said first apparatus loop antenna and second apparatus loop antenna has a flat or triangular cross-sectional profile shape.

12. The apparatus for communicating with the RFID tag according to claim 2, further comprising a first apparatus magnetic member composed of a magnetic material, provided at a inner side of the apparatus from said cartridge holder so as to be located on the side opposite to said feeding path in said magnetic path generated by said apparatus coils of said first apparatus loop antenna and said second apparatus loop antenna.

13. The apparatus for communicating with the RFID tag according to claim 2, wherein:
said cartridge holder is configured to be able to detachably attach said cartridge for including at least the RFID tag which contains a roll of tape with RFID tags around which a tag tape where a plurality of said RFID circuit elements are continuously arranged in the longitudinal direction is wound as said tag medium.

14. The apparatus for communicating with the RFID tag according to claim 13, wherein:
each of said first apparatus loop antenna and said second apparatus loop antenna is arranged such that a magnetic flux generated by the apparatus loop antenna intersects with said tag medium at a feeding-out position of said roll of tape with RFID tags.

15. The apparatus for communicating with the RFID tag according to claim 2, further comprising a printing device configured to make a print on said tag medium fed or a print-receiving medium to be bonded to said tag medium.

16. The apparatus for communicating with the RFID tag according to claim 1, wherein:
said container holder is a cartridge holder configured to detachably attach a cartridge for including at least the RFID tag as said container for including at least the RFID tag which contains said tag medium substantially in a sheet state or a tape state on which said RFID circuit element is arranged, capable of continuous supply of said tag medium; and said apparatus magnetic-path forming portion is a third apparatus loop antenna configured to be provided so as to face a side wall of said cartridge for including at least the RFID tag or a recess-portion side wall provided in said cartridge for including at least the RFID tag substantially in parallel with said side wall of said cartridge at an attachment of the cartridge for including at least the RFID tag to said cartridge holder and to transmit/receive information with said IC circuit part by a magnetic induction.

17. The apparatus for communicating with the RFID tag according to claim 16, wherein:

said third apparatus loop antenna is provided such that a magnetic path generated by an apparatus coil provided at said third apparatus loop antenna intersects with a face direction of said tag medium in the feeding path of the tag medium.

18. The apparatus for communicating with the RFID tag according to claim 17, wherein:

said third apparatus loop antenna is provided so as to face a side wall of said cartridge for including at least the RFID tag at an attachment of the cartridge for including at least the RFID tag to said cartridge holder.

19. The apparatus for communicating with the RFID tag according to claim 17, wherein:

said third apparatus loop antenna is provided so as to face a first recess-portion side wall provided as if cutting into a side wall of said cartridge for including at least the RFID tag, substantially in parallel with said side wall at an attachment of said cartridge for including at least the RFID tag to said cartridge holder.

20. The apparatus for communicating with the RFID tag according to claim 17, wherein:

said third apparatus loop antenna is provided so as to face a second recess-portion side wall provided as if cutting into a bottom wall substantially perpendicular to a side wall of said cartridge for including at least the RFID tag, substantially in parallel with said side wall at an attachment of said cartridge for including at least the RFID tag to said cartridge holder.

21. The apparatus for communicating with the RFID tag according to claim 18, wherein:

said third apparatus loop antenna is configured such that a dimension of a tag coil constituting said tag loop antenna in a width direction of the feeding-path of said tag medium is substantially equal to that of said apparatus coil in said feeding-path width direction.

22. The apparatus for communicating with the RFID tag according to claim 21, wherein:

said third apparatus loop antenna is disposed such that a center axis of said tag coil in said width direction of the feeding-path and a center axis of said apparatus coil in said width direction of the feeding-path substantially coincide with each other.

23. The apparatus for communicating with the RFID tag according to claim 18, wherein:

said third apparatus loop antenna is configured such that a dimension H of said tag coil constituting said tag loop antenna in said width direction of the feeding-path is larger than a dimension h of said apparatus coil in said width direction of the feeding-path.

24. The apparatus for communicating with the RFID tag according to claim 23, wherein:

said third apparatus loop antenna is disposed such that a center axis of said tag coil in said width direction of the feeding-path and a center axis of said apparatus coil in said width direction of the feeding-path substantially coincide with each other.

25. The apparatus for communicating with the RFID tag according to claim 23, wherein:

said third apparatus loop antenna is disposed such that an end-portion position of said tag coil on one side in said width direction of the feeding-path and an end-portion position of said apparatus coil on one side in said width direction of the feeding-path substantially coincide with each other.

26. The apparatus for communicating with the RFID tag according to claim 18, wherein:

said third apparatus loop antenna is configured such that a dimension H of said tag coil constituting said tag loop antenna in said width direction of the feeding-path is smaller than a dimension h of said apparatus coil in said width direction of the feeding-path.

27. The apparatus for communicating with the RFID tag according to claim 26, wherein:

said third apparatus loop antenna is disposed such that a center axis of said tag coil in said width direction of the feeding-path and a center axis of said apparatus coil in said width direction of the feeding-path substantially coincide with each other.

28. The apparatus for communicating with the RFID tag according to claim 26, wherein:

said third apparatus loop antenna is disposed such that an end-portion position of said tag coil on the other side in said width direction of the feeding-path and an end-portion position of said apparatus coil on the other side in said width direction of the feeding-path substantially coincide with each other.

29. The apparatus for communicating with the RFID tag according to claim 21, wherein:

said third apparatus loop antenna is configured such that a dimension x of said apparatus coil in a transport direction of said feeding path is smaller than a dimension y of said tag coil in the transport direction of said feeding path.

30. The apparatus for communicating with the RFID tag according to claim 29, wherein:

said dimension y of said tag coil in the transport direction of said feeding path is set larger than a value obtained by multiplying a feeding velocity of said tag medium by a time te required for information transmission and reception with said RFID circuit element and adding said dimension x of said apparatus coil in the transport direction of said feeding path.

31. The apparatus for communicating with the RFID tag according to claim 16, wherein:

said cartridge holder is configured to be able to detachably attach said cartridge for including at least a RFID tag which contains a roll of tape with RFID tags around which a tag tape where a plurality of said RFID circuit elements as said tag medium are continuously arranged in the longitudinal direction is wound.

32. The apparatus for communicating with the RFID tag according to claim 16, further comprising a printing device configured to make a print on said tag medium fed or a print-receiving medium to be bonded to said tag medium.

33. The apparatus for communicating with the RFID tag according to claim 1, wherein:
said apparatus magnetic-path forming portion includes:
a fourth apparatus loop antenna configured to be located in the vicinity of said feeding path in said container for including at least the RFID tag at an attachment of the container for including at least the RFID tag to said container holder and to transmit/receive information with said IC circuit part by a magnetic induction; and
a second apparatus magnetic member around which a coil constituting said fourth apparatus loop antenna is wound and composed of a magnetic material.

34. The apparatus for communicating with the RFID tag according to claim 33, wherein:
said container holder is a cartridge holder configured to be able to detachably attach a cartridge for including at least the RFID tag which contains said tag medium substantially in a sheet state or a tape state.

35. The apparatus for communicating with the RFID tag according to claim 33, wherein:
said container holder or said cartridge holder is configured such that a side wall or a bottom wall of said container for including at least the RFID tag or a cartridge for including at least the RFID tag is substantially in parallel with a face direction of said tag medium in said feeding path at an attachment; and
said second apparatus magnetic member is arranged such that an end portion on at least one side faces said cartridge for including at least the RFID tag so that a magnetic path generated by said coil intersects with said face direction of said feeding path.

36. The apparatus for communicating with the RFID tag according to claim 35, wherein:
said second apparatus magnetic member is arranged such that an end portion on said one side faces said side wall of said cartridge for including at least the RFID tag; and
an end portion on the other side faces said bottom wall of said cartridge for including at least the RFID tag.

37. The apparatus for communicating with the RFID tag according to claim 35, wherein:
said second apparatus magnetic member is arranged such that an end portion on said one side faces said side wall of said cartridge for including at least the RFID tag or a first recess-portion side wall provided at said cartridge for including at least the RFID tag substantially in parallel with the side wall; and
an end portion on the other side faces a second recess-portion side wall provided at said cartridge for including at least the RFID tag so as to face said side wall or said first recess-portion side wall with said feeding path between them.

38. The apparatus for communicating with the RFID tag according to claim 36, wherein:
said second apparatus magnetic member is configured such that a dimension x of each of said end portion on said one side and said end portion on said other side in a transport direction of said feeding path is smaller than a dimension y of said tag loop antenna in the transport direction of said feeding path.

39. The apparatus for communicating with the RFID tag according to claim 38, wherein:
said dimension y of said tag loop antenna in the transport direction of said feeding path is set larger than a value obtained by multiplying a feeding velocity v of said tag medium by a time te required for information transmission and reception with said RFID circuit element and adding said dimension x of said end portion of said second apparatus magnetic member in the transport direction of said feeding path.

40. The apparatus for communicating with the RFID tag according to claim 36, wherein:
said second apparatus magnetic member is configured such that a dimension h of said second apparatus magnetic member in a width direction perpendicular to the direction of said feeding-path is smaller than a dimension H of said tag loop antenna in said width direction.

41. The apparatus for communicating with the RFID tag according to claim 35, wherein:
said coil is provided at a portion of said second apparatus magnetic member, said portion being inner side of the apparatus from an attached face of said cartridge for including at least the RFID tag in said cartridge holder.

42. The apparatus for communicating with the RFID tag according to claim 34, wherein:
said cartridge holder is configured to be able to detachably attach said cartridge for including at least the RFID tag containing a roll of tape with RFID tags around which a tag tape where a plurality of said RFID circuit elements are continuously arranged in the longitudinal direction is wound as said tag medium.

43. The apparatus for communicating with the RFID tag according to claim 42, wherein:
said fourth apparatus loop antenna and said second apparatus magnetic member are arranged so that a magnetic path generated by said coil does not reach said roll of tape with RFID tags.

44. The apparatus for communicating with the RFID tag according to claim 33, further comprising a printing device configured to make a print on said tag medium fed or a print-receiving medium to be bonded to said tag medium.

45. A cartridge for including at least the RFID tag configured to be detachably attached to a cartridge holder of an apparatus for communicating with the RFID tag, comprising:
a tag medium on which the RFID circuit element provided with an IC circuit part storing information and a tag loop antenna connected to said IC circuit part are arranged; and
a cartridge magnetic-path forming portion configured to form a magnetic path for a communication magnetic flux in a feeding path of said tag medium in said cartridge for including at least the RFID tag at an attachment to said cartridge holder.

46. The cartridge for including at least the RFID tag according to claim 45, wherein:
said cartridge magnetic-path forming portion is a first cartridge magnetic member provided at least on one side of in a face direction of a feeding path of said tag medium so as to be located in a magnetic flux generated by an apparatus coil of each of first apparatus loop antennas and said second apparatus loop antenna provided in said apparatus for communicating with the RFID tag at an attachment to said cartridge holder, said first cartridge magnetic member being composed of a magnetic material.

47. The cartridge for including at least the RFID tag according to claim 45, wherein:
said cartridge magnetic-path forming portion is provided in a housing containing said tag medium capable of continuous supply to said apparatus for communicating with the RFID tag, and is a side wall of said housing disposed so as to face a third apparatus loop antenna provided at said apparatus for communicating with the RFID tag or a recess-portion side wall provided substantially in parallel with said side wall, at mounting on said cartridge holder.

48. The cartridge for including at least the RFID tag according to claim 47, further comprising a feeding-position regulating portion configured to regulate a position of said feeding path so that a distance between said feeding path of said tag medium and said third apparatus loop antenna is substantially constant at mounting to said cartridge holder.

49. The cartridge for including at least the RFID tag according to claim 48, wherein:
    said recess-portion side wall is disposed so as to face said third apparatus loop antenna and regulates the position of said feeding path as said feeding-position regulating portion.

50. The cartridge for including at least the RFID tag according to claim 47, wherein:
    said tag loop antenna is disposed such that a center axis of said tag medium in a width direction of said feeding-path substantially coincides with a center axis of said tag coil in said width direction of said feeding-path.

51. The cartridge for including at least the RFID tag according to claim 47, wherein:
    said tag loop antenna is disposed such that a distance between an edge-portion position of said tag medium on one side in a width direction of said feeding-path and an edge-portion position of said tag coil on said one side in said width direction of said feeding-path becomes a predetermined fixed value.

52. The cartridge for including at least the RFID tag according to claim 45, wherein:
    said cartridge magnetic-path forming portion is a second cartridge magnetic member provided so as to be located in a magnetic path of a magnetic flux generated by a coil constituting a fourth apparatus loop antenna provided at said apparatus for communicating with the RFID tag at an attachment to said cartridge holder, said second cartridge magnetic member being composed of a magnetic material.

53. The cartridge for including at least the RFID tag according to claim 52, wherein:
    a dimension of said second cartridge magnetic member in a width direction perpendicular to a transport direction of said tag medium is smaller a dimension of said tag loop antenna in a width direction.

54. The cartridge for including at least the RFID tag according to claim 52, wherein:
    said second cartridge magnetic member is arranged on the side opposite said fourth apparatus loop antenna with respect to said feeding path of said tag medium.

55. The cartridge for including at least the RFID tag according to claim 52, wherein:
    said second cartridge magnetic member is arranged on the same side as said fourth apparatus loop antenna with respect to said feeding path of said tag medium.

56. The cartridge for including at least the RFID tag according to claim 52, wherein:
    said tag medium includes an adhesive layer configured to bond a print-receiving medium; and
    said second cartridge magnetic member is arranged on the side opposite said adhesive layer with respect to said feeding path of said tag medium.

57. The cartridge for including at least the RFID tag according to claim 52, wherein:
    said second cartridge magnetic member is respectively arranged on both sides of said feeding path of said tag medium.

* * * * *